US009738025B2

(12) United States Patent
König et al.

(10) Patent No.: US 9,738,025 B2
(45) Date of Patent: Aug. 22, 2017

(54) METHOD FOR EXTRUDING PLASTIC MASSES

(75) Inventors: Thomas König, Leverkusen (DE); Michael Bierdel, Leverkusen (DE); Carsten Conzen, Leverkusen (DE); Ulrich Liesenfelder, Bergisch Gladbach (DE); Klemens Kohlgrüber, Kürten (DE); Reiner Rudolf, Leverkusen (DE); Johann Rechner, Kempen (DE)

(73) Assignee: Covestro Deutschland AG, Leverkusen (DE)

( * ) Notice: Subject to any disclaimer, the term of this patent is extended or adjusted under 35 U.S.C. 154(b) by 1438 days.

(21) Appl. No.: 13/000,057

(22) PCT Filed: May 30, 2009

(86) PCT No.: PCT/EP2009/003889
§ 371 (c)(1),
(2), (4) Date: Mar. 4, 2011

(87) PCT Pub. No.: WO2009/152947
PCT Pub. Date: Dec. 23, 2009

(65) Prior Publication Data
US 2011/0160381 A1  Jun. 30, 2011

(30) Foreign Application Priority Data

Jun. 20, 2008  (DE) .................. 10 2008 029 306

(51) Int. Cl.
*B29C 47/08* (2006.01)
*B29B 7/48* (2006.01)
(Continued)

(52) U.S. Cl.
CPC .......... *B29C 47/0861* (2013.01); *B29B 7/481* (2013.01); *B29C 47/0881* (2013.01);
(Continued)

(58) Field of Classification Search
CPC ............ B29C 47/6043; B29C 47/6056; B29C 47/6062; B29C 47/0861; B29C 47/38;
(Continued)

(56) References Cited

U.S. PATENT DOCUMENTS 3,912,687 A * 10/1975 Haupt et al. .................. 528/199
4,131,371 A    12/1978 Tynan
(Continued)

FOREIGN PATENT DOCUMENTS

DE      813154 C   9/1951
DE      862668 C   1/1953
(Continued)

*Primary Examiner* — Charles Cooley
*Assistant Examiner* — Marc C Howell
(74) *Attorney, Agent, or Firm* — K&L Gates LLP

(57) ABSTRACT

The invention relates to a process for extruding plastic compositions. The process in particular relates to the conveying, kneading and/or mixing of plastic compositions, in particular of polymer melts and mixtures of polymer melts, above all thermoplastics and elastomers, particularly preferably polycarbonate and polycarbonate blends, also with the incorporation of other substances such as for example solids, liquids, gases or other polymers or other polymer blends.

17 Claims, 23 Drawing Sheets

Figure 8A:
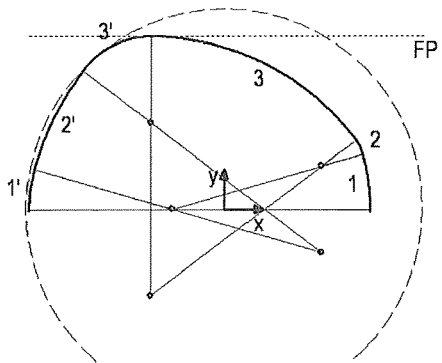

(51) Int. Cl.
  *B29C 47/38* (2006.01)
  *B29C 47/40* (2006.01)
  *B29C 47/64* (2006.01)
  *B29C 47/62* (2006.01)
  *B29C 47/60* (2006.01)
  *B29C 47/00* (2006.01)

(52) U.S. Cl.
  CPC ............ *B29C 47/38* (2013.01); *B29C 47/402* (2013.01); *B29C 47/6056* (2013.01); *B29C 47/6075* (2013.01); *B29C 47/625* (2013.01); *B29C 47/627* (2013.01); *B29C 47/64* (2013.01); *B29C 47/0009* (2013.01); *Y02P 70/263* (2015.11)

(58) Field of Classification Search
  CPC ... B29C 47/402; B29C 47/64; B29C 47/0881; B29C 47/625; B29C 47/627; B29B 7/481
  USPC ............ 366/82, 85, 301; 425/204, 208, 209
  See application file for complete search history.

(56) References Cited

U.S. PATENT DOCUMENTS

| | | | |
|---|---|---|---|
| 4,205,140 A * | 5/1980 | Liebig et al. | 525/67 |
| 4,824,256 A | 4/1989 | Haring et al. | |
| 4,982,014 A | 1/1991 | Freitag et al. | |
| 5,126,428 A | 6/1992 | Freitag et al. | |
| 5,227,458 A | 7/1993 | Freitag et al. | |
| 5,947,887 A * | 9/1999 | White et al. | 588/11 |
| 6,179,460 B1 * | 1/2001 | Burkhardt et al. | 366/82 |
| 6,447,156 B2 * | 9/2002 | Maris | 366/82 |
| 6,783,270 B1 * | 8/2004 | Padmanabhan | 366/82 |
| 6,974,620 B1 * | 12/2005 | Tsunekawa et al. | 428/141 |
| 2001/0019729 A1 * | 9/2001 | Inoue | B29B 7/482 425/204 |
| 2002/0161137 A1 * | 10/2002 | Wilkinson | 525/453 |
| 2004/0106703 A1 * | 6/2004 | Etzrodt et al. | 523/330 |
| 2007/0209744 A1 * | 9/2007 | Matsumura | 152/510 |
| 2008/0004426 A1 * | 1/2008 | Brack et al. | 528/503 |
| 2008/0033092 A1 * | 2/2008 | Santos et al. | 524/445 |

FOREIGN PATENT DOCUMENTS

| | | |
|---|---|---|
| DE | 3412258 A1 | 10/1985 |
| DE | 3832396 A1 | 2/1990 |
| DE | 4239220 A1 | 5/1994 |
| EP | 2131 A1 | 5/1979 |
| EP | 0160124 A2 | 11/1985 |
| FR | 1561518 A | 3/1969 |
| GB | 1229482 A | 4/1971 |

* cited by examiner

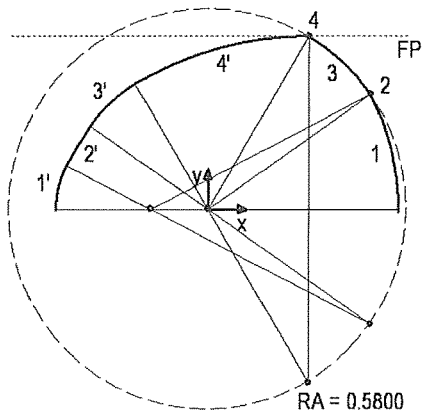

Figure 1a

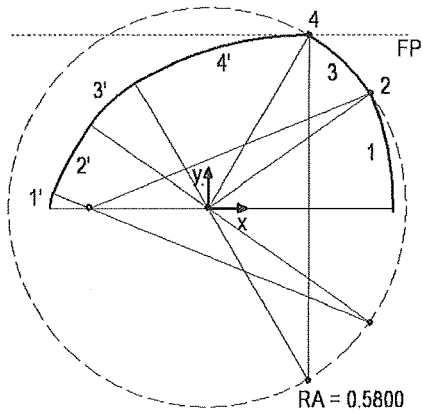

Figure 1b

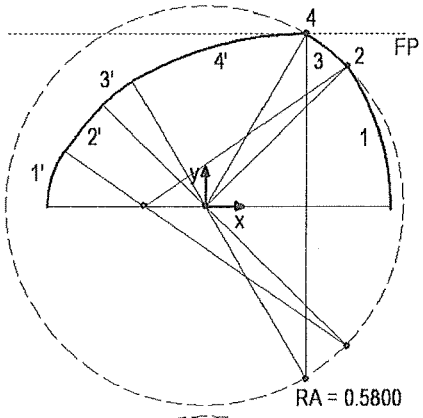

Figure 1c

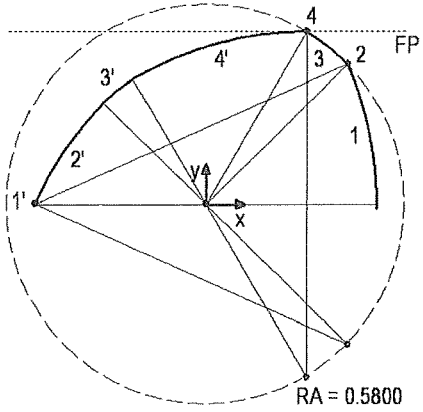

Figure 1d

1) R = 0.7245   Mx = -0.1685
   α = 0.4771   My = 0.0000
2) R = 0.0000   Mx = 0.4751
   α = 0.1338   My = 0.3327
3) R = 0.5800   Mx = 0.0000
   α = 0.4285   My = 0.0000
4) R = 0.0000   Mx = 0.2939
   α = 0.5315   My = 0.5000
4') R = 1.0000  Mx = 0.2939
   α = 0.5315   My = -0.5000
3') R = 0.4200  Mx = 0.0000
   α = 0.4285   My = 0.0000
2') R = 1.0000  Mx = 0.4751
   α = 0.1338   My = -0.3327
1') R = 0.2755  Mx = -0.1685
   α = 0.4771   My = 0.0000

1) R = 0.8852   Mx = -0.3452
   α = 0.3853   My = 0.0000
2) R = 0.0000   Mx = 0.4751
   α = 0.2256   My = 0.3327
3) R = 0.5800   Mx = 0.0000
   α = 0.4285   My = 0.0000
4) R = 0.0000   Mx = 0.2939
   α = 0.5315   My = 0.5000
4') R = 1.0000  Mx = 0.2939
   α = 0.5315   My = -0.5000
3') R = 0.4200  Mx = 0.0000
   α = 0.4285   My = 0.0000
2') R = 1.0000  Mx = 0.4751
   α = 0.2256   My = -0.3327
1') R = 0.1148  Mx = -0.3452
   α = 0.3853   My = 0.0000

1) R = 0.7173   Mx = -0.1773
   α = 0.6025   My = 0.0000
2) R = 0.0000   Mx = 0.4137
   α = 0.1742   My = 0.4065
3) R = 0.5800   Mx = 0.0000
   α = 0.2627   My = 0.0000
4) R = 0.0000   Mx = 0.2939
   α = 0.5315   My = 0.5000
4') R = 1.0000  Mx = 0.2939
   α = 0.5315   My = -0.5000
3') R = 0.4200  Mx = 0.0000
   α = 0.2627   My = 0.0000
2') R = 1.0000  Mx = 0.4137
   α = 0.1742   My = -0.4065
1') R = 0.2827  Mx = -0.1773
   α = 0.6025   My = 0.0000

1) R = 0.9999   Mx = -0.4998
   α = 0.4187   My = 0.0000
2) R = 0.0000   Mx = 0.4137
   α = 0.3580   My = 0.4065
3) R = 0.5800   Mx = 0.0000
   α = 0.2627   My = 0.0000
4) R = 0.0000   Mx = 0.2939
   α = 0.5315   My = 0.5000
4') R = 1.0000  Mx = 0.2939
   α = 0.5315   My = -0.5000
3') R = 0.4200  Mx = 0.0000
   α = 0.2627   My = 0.0000
2') R = 1.0000  Mx = 0.4137
   α = 0.3580   My = -0.4065
1') R = 0.0001  Mx = -0.4998
   α = 0.4187   My = 0.0000

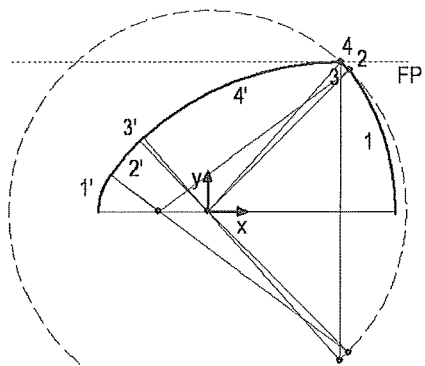

Figure 2a    RA = 0.6700

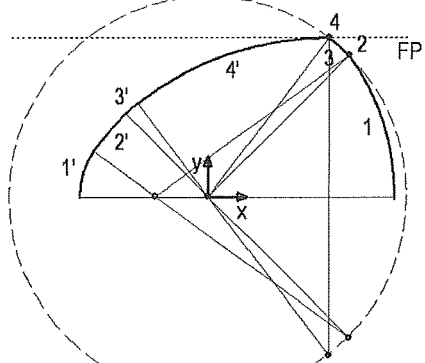

Figure 2b    RA = 0.6300

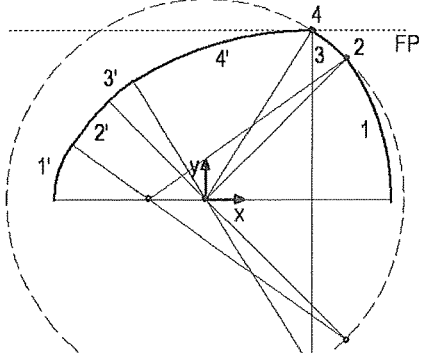

Figure 2c    RA = 0.5900

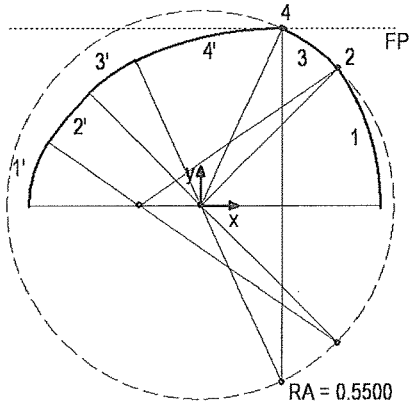

Figure 2d    RA = 0.5500

1) R = 0.7964  Mx = -0.1664
   α = 0.6371  My = 0.0000
2) R = 0.0000  Mx = 0.4738
   α = 0.1483  My = 0.4738
3) R = 0.6700  Mx = 0.0000
   α = 0.0570  My = 0.0000
4) R = 0.0000  Mx = 0.4460
   α = 0.7284  My = 0.5000
4') R = 1.0000  Mx = 0.4460
   α = 0.7284  My = -0.5000
3') R = 0.3300  Mx = 0.0000
   α = 0.0570  My = 0.0000
2') R = 1.0000  Mx = 0.4738
   α = 0.1483  My = -0.4738
1') R = 0.2036  Mx = -0.1664
   α = 0.6371  My = 0.0000

1) R = 0.7588  Mx = -0.1688
   α = 0.6274  My = 0.0000
2) R = 0.0000  Mx = 0.4455
   α = 0.1580  My = 0.4455
3) R = 0.6300  Mx = 0.0000
   α = 0.1314  My = 0.0000
4) R = 0.0000  Mx = 0.3833
   α = 0.6540  My = 0.5000
4') R = 1.0000  Mx = 0.3833
   α = 0.6540  My = -0.5000
3') R = 0.3700  Mx = 0.0000
   α = 0.1314  My = 0.0000
2') R = 1.0000  Mx = 0.4455
   α = 0.1580  My = -0.4455
1') R = 0.2412  Mx = -0.1688
   α = 0.6274  My = 0.0000

1) R = 0.7217  Mx = -0.1717
   α = 0.6164  My = 0.0000
2) R = 0.0000  Mx = 0.4172
   α = 0.1690  My = 0.4172
3) R = 0.5900  Mx = 0.0000
   α = 0.2258  My = 0.0000
4) R = 0.0000  Mx = 0.3132
   α = 0.5596  My = 0.5000
4') R = 1.0000  Mx = 0.3132
   α = 0.5596  My = -0.5000
3') R = 0.4100  Mx = 0.0000
   α = 0.2258  My = 0.0000
2') R = 1.0000  Mx = 0.4172
   α = 0.1690  My = -0.4172
1') R = 0.2783  Mx = -0.1717
   α = 0.6164  My = 0.0000

1) R = 0.6851  Mx = -0.1751
   α = 0.6037  My = 0.0000
2) R = 0.0000  Mx = 0.3889
   α = 0.1817  My = 0.3889
3) R = 0.5500  Mx = 0.0000
   α = 0.3557  My = 0.0000
4) R = 0.0000  Mx = 0.2291
   α = 0.4297  My = 0.5000
4') R = 1.0000  Mx = 0.2291
   α = 0.4297  My = -0.5000
3') R = 0.4500  Mx = 0.0000
   α = 0.3557  My = 0.0000
2') R = 1.0000  Mx = 0.3889
   α = 0.1817  My = -0.3889
1') R = 0.3149  Mx = -0.1751
   α = 0.6037  My = 0.0000

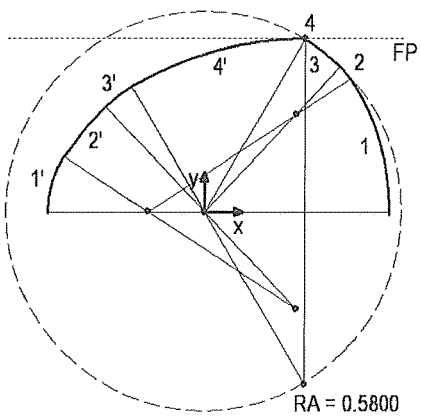

Figure 3a

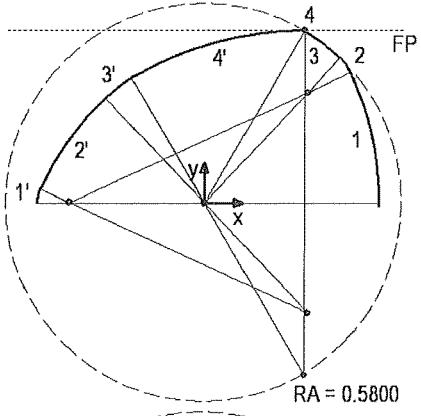

Figure 3b

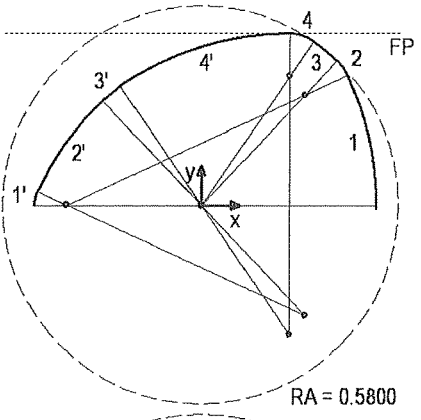

Figure 4a

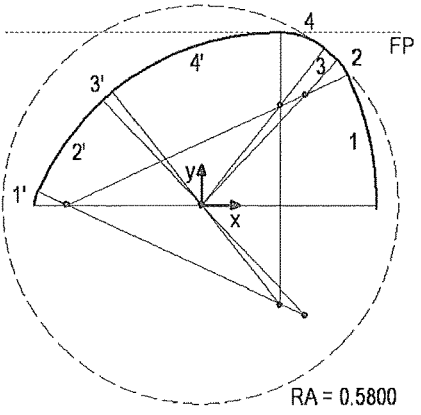

Figure 4b

1) R = 0.7081   Mx = -0.1655
   α = 0.5766   My = 0.0000
2) R = 0.1924   Mx = 0.2668
   α = 0.2350   My = 0.2812
3) R = 0.5800   Mx = 0.0000
   α = 0.2278   My = -0.0000
4) R = 0.0000   Mx = 0.2940
   α = 0.5315   My = 0.5000
4') R = 1.0000   Mx = 0.2940
    α = 0.5315   My = -0.5000
3') R = 0.4200   Mx = 0.0000
    α = 0.2278   My = 0.0000
2') R = 0.8076   Mx = 0.2668
    α = 0.2350   My = -0.2812
1') R = 0.2919   Mx = -0.1655
    α = 0.5766   My = 0.0000

1) R = 0.9061   Mx = -0.3937
   α = 0.4304   My = 0.0000
2) R = 0.1385   Mx = 0.3039
   α = 0.3812   My = 0.3202
3) R = 0.5800   Mx = -0.0000
   α = 0.2278   My = -0.0000
4) R = 0.0000   Mx = 0.2939
   α = 0.5315   My = 0.5000
4') R = 1.0000   Mx = 0.2939
    α = 0.5315   My = -0.5000
3') R = 0.4200   Mx = -0.0000
    α = 0.2278   My = 0.0000
2') R = 0.8615   Mx = 0.3039
    α = 0.3812   My = -0.3202
1') R = 0.0939   Mx = -0.3937
    α = 0.4304   My = 0.0000

1) R = 0.9061   Mx = -0.3937
   α = 0.4304   My = 0.0000
2) R = 0.1385   Mx = 0.3039
   α = 0.3812   My = 0.3202
3) R = 0.5800   Mx = -0.0000
   α = 0.1580   My = -0.0000
4) R = 0.1239   Mx = 0.2580
   α = 0.6013   My = 0.3761
4') R = 0.8761   Mx = 0.2580
    α = 0.6013   My = -0.3761
3') R = 0.4200   Mx = -0.0000
    α = 0.1580   My = 0.0000
2') R = 0.8615   Mx = 0.3039
    α = 0.3812   My = -0.3202
1') R = 0.0939   Mx = -0.3937
    α = 0.4304   My = 0.0000

1) R = 0.9061   Mx = -0.3937
   α = 0.4304   My = 0.0000
2) R = 0.1385   Mx = 0.3039
   α = 0.3812   My = 0.3202
3) R = 0.5800   Mx = -0.0000
   α = 0.0881   My = -0.0000
4) R = 0.2111   Mx = 0.2294
   α = 0.6711   My = 0.2889
4') R = 0.7889   Mx = 0.2294
    α = 0.6711   My = -0.2889
3') R = 0.4200   Mx = -0.0000
    α = 0.0881   My = 0.0000
2') R = 0.8615   Mx = 0.3039
    α = 0.3812   My = -0.3202
1') R = 0.0939   Mx = -0.3937
    α = 0.4304   My = 0.0000

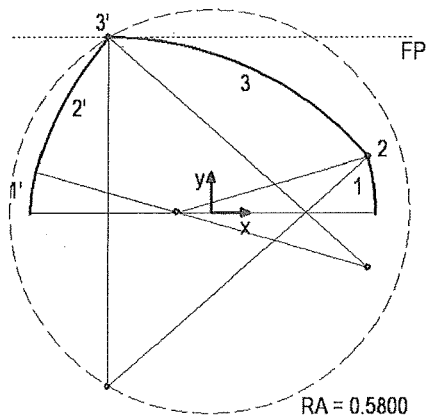

Figure 5   RA = 0.5800

1) R = 0.5800  Mx = −0.1001
   α = 0.2793  My = 0.0000
2) R = 0.0000  Mx = 0.4574
   α = 0.4414  My = 0.1599
3) R = 1.0000  Mx = −0.2940
   α = 0.8501  My = −0.5000
3') R = 0.0000  Mx = −0.2940
   α = 0.8501  My = 0.5000
2') R = 1.0000  Mx = 0.4574
   α = 0.4414  My = −0.1599
1') R = 0.4200  Mx = −0.1001
   α = 0.2793  My = 0.0000

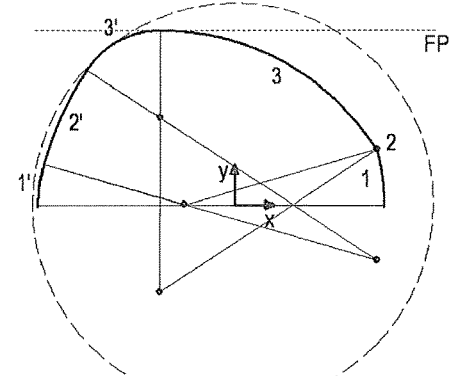

Figure 6a   RA = 0.5800

1) R = 0.5800  Mx = −0.1448
   α = 0.2793  My = 0.0000
2) R = 0.0000  Mx = 0.4127
   α = 0.2989  My = 0.1599
3) R = 0.7500  Mx = −0.2154
   α = 0.9926  My = −0.2500
3') R = 0.2500  Mx = −0.2154
   α = 0.9926  My = 0.2500
2') R = 1.0000  Mx = 0.4127
   α = 0.2989  My = −0.1599
1') R = 0.4200  Mx = −0.1448
   α = 0.2793  My = 0.0000

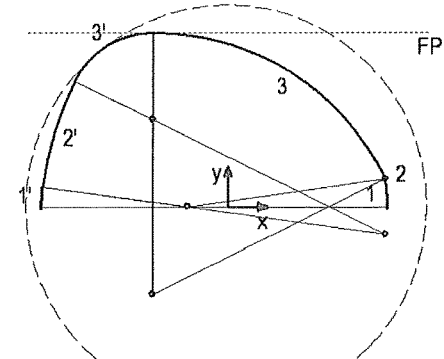

Figure 6b   RA = 0.5800

1) R = 0.5800  Mx = −0.1166
   α = 0.1396  My = 0.0000
2) R = 0.0000  Mx = 0.4577
   α = 0.3171  My = 0.0807
3) R = 0.7500  Mx = −0.2154
   α = 1.1141  My = −0.2500
3') R = 0.2500  Mx = −0.2154
   α = 1.1141  My = 0.2500
2') R = 1.0000  Mx = 0.4577
   α = 0.3171  My = −0.0807
1') R = 0.4200  Mx = −0.1166
   α = 0.1396  My = 0.0000

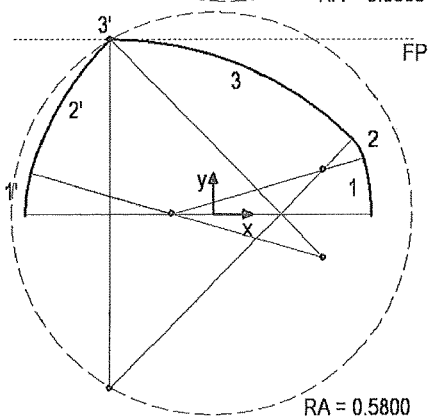

Figure 7   RA = 0.5800

1) R = 0.5800  Mx = −0.1194
   α = 0.2793  My = 0.0000
2) R = 0.1250  Mx = 0.3180
   α = 0.5170  My = 0.1254
3) R = 1.0000  Mx = −0.2940
   α = 0.7745  My = −0.5000
3') R = 0.0000  Mx = −0.2940
   α = 0.7745  My = 0.5000
2') R = 0.8750  Mx = 0.3180
   α = 0.5170  My = −0.1254
1') R = 0.4200  Mx = −0.1194
   α = 0.2793  My = 0.0000

1) R = 0.5800  Mx = -0.1531
   α = 0.2793  My = 0.0000
2) R = 0.1250  Mx = 0.2843
   α = 0.3651  My = 0.1254
3) R = 0.7500  Mx = -0.2154
   α = 0.9265  My = -0.2500
3') R = 0.2500  Mx = -0.2154
   α = 0.9265  My = 0.2500
2') R = 0.8750  Mx = 0.2843
   α = 0.3651  My = -0.1254
1') R = 0.4200  Mx = -0.1531
   α = 0.2793  My = 0.0000

1) R = 0.5800  Mx = -0.1252
   α = 0.1396  My = 0.0000
2) R = 0.1250  Mx = 0.3254
   α = 0.3855  My = 0.0633
3) R = 0.7500  Mx = -0.2154
   α = 1.0457  My = -0.2500
3') R = 0.2500  Mx = -0.2154
   α = 1.0457  My = 0.2500
2') R = 0.8750  Mx = 0.3254
   α = 0.3855  My = -0.0633
1') R = 0.4200  Mx = -0.1252
   α = 0.1396  My = 0.0000

1) R = 0.0000  Mx = 0.4827
   α = 0.5236  My = 0.0000
2) R = 1.0000  Mx = -0.3833
   α = 1.0472  My = -0.5000
2') R = 0.0000  Mx = -0.3833
   α = 1.0472  My = 0.5000
1') R = 1.0000  Mx = 0.4827
   α = 0.5236  My = 0.0000

1) R = 0.1000  Mx = 0.3650
   α = 0.5890  My = 0.0000
2) R = 1.0000  Mx = -0.3833
   α = 0.9818  My = -0.5000
2') R = 0.0000  Mx = -0.3833
   α = 0.9818  My = 0.5000
1') R = 0.9000  Mx = 0.3650
   α = 0.5890  My = 0.0000

1) R = 0.2000  Mx = 0.2412
   α = 0.6751  My = 0.0000
2) R = 1.0000  Mx = -0.3833
   α = 0.8957  My = -0.5000
2') R = 0.0000  Mx = -0.3833
   α = 0.8957  My = 0.5000
1') R = 0.8000  Mx = 0.2412
   α = 0.6751  My = 0.0000

RA = 0.6300

1) R = 0.0000  Mx = 0.4443
   α = 0.4189  My = 0.0000
2) R = 0.8428  Mx = -0.3256
   α = 1.1519  My = -0.3428
2') R = 0.1572  Mx = -0.3256
   α = 1.1519  My = 0.3428
1') R = 1.0000  Mx = 0.4443
   α = 0.4189  My = 0.0000

RA = 0.6300

1) R = 0.0000  Mx = 0.4142
   α = 0.3142  My = 0.0000
2) R = 0.7236  Mx = -0.2739
   α = 1.2566  My = -0.2236
2') R = 0.2764  Mx = -0.2739
   α = 1.2566  My = 0.2236
1') R = 1.0000  Mx = 0.4142
   α = 0.3142  My = 0.0000

RA = 0.6300

1) R = 0.1000  Mx = 0.3451
   α = 0.5236  My = 0.0000
2) R = 0.9000  Mx = -0.3477
   α = 1.0472  My = -0.4000
2') R = 0.1000  Mx = -0.3477
   α = 1.0472  My = 0.4000
1') R = 0.9000  Mx = 0.3451
   α = 0.5236  My = 0.0000

RA = 0.6300

1) R = 0.2000  Mx = 0.2116
   α = 0.5236  My = 0.0000
2) R = 0.8000  Mx = -0.3081
   α = 1.0472  My = -0.3000
2') R = 0.2000  Mx = -0.3081
   α = 1.0472  My = 0.3000
1') R = 0.8000  Mx = 0.2116
   α = 0.5236  My = 0.0000

RA = 0.6300

1) R = 0.8681  Mx = -0.3281
   α = 0.4603  My = 0.0000
2) R = 0.0000  Mx = 0.4496
   α = 0.2378  My = 0.3857
3) R = 0.6000  Mx = -0.0100
   α = 0.2870  My = 0.0000
4) R = 0.0000  Mx = 0.3216
   α = 0.5856  My = 0.5000
4') R = 1.0000  Mx = 0.3216
   α = 0.5856  My = -0.5000
3') R = 0.4000  Mx = -0.0100
   α = 0.2870  My = 0.0000
2') R = 1.0000  Mx = 0.4496
   α = 0.2378  My = -0.3857
1') R = 0.1319  Mx = -0.3281
   α = 0.4603  My = 0.0000

RA = 0.6000

1) R = 0.8681  Mx = -0.3481
   α = 0.4603  My = 0.0000
2) R = 0.0000  Mx = 0.4296
   α = 0.2378  My = 0.3857
3) R = 0.6000  Mx = -0.0300
   α = 0.2870  My = 0.0000
4) R = 0.0000  Mx = 0.3016
   α = 0.5856  My = 0.5000
4') R = 1.0000  Mx = 0.3016
   α = 0.5856  My = -0.5000
3') R = 0.4000  Mx = -0.0300
   α = 0.2870  My = 0.0000
2') R = 1.0000  Mx = 0.4296
   α = 0.2378  My = -0.3857
1') R = 0.1319  Mx = -0.3481
   α = 0.4603  My = 0.0000

RA = 0.6000

RG = 0.6300
RV = 0.5800
RA = 0.5800
RF = 0.5800
S  = 0.0000
D  = 0.0000
T  = 2.0000

VPR = 0.0635
VPW = 0.0000
VLR = 0.0000
VLW = 0.0000
VRR = 0.0000
VRW = 0.0000

1) R = 0.5300  Mx = 0.0000
   α = 0.1855  My = 0.0000
2) R = 0.0000  Mx = 0.5209
   α = 0.3381  My = 0.0978
2') R = 1.0000  Mx = -0.3451
    α = 0.3381  My = -0.4022
1') R = 0.4700  Mx = 0.0000
    α = 0.1855  My = 0.0000

RA = 0.5300

1) R = 0.5433  Mx = 0.0000
   α = 0.1215  My = 0.0000
2) R = 0.0000  Mx = 0.5393
   α = 0.4021  My = 0.0659
2') R = 1.0000  Mx = -0.3267
    α = 0.4021  My = -0.4341
1') R = 0.4567  Mx = 0.0000
    α = 0.1215  My = 0.0000

RA = 0.5433

1) R = 0.5567  Mx = 0.0000
   α = 0.0685  My = 0.0000
2) R = 0.0000  Mx = 0.5554
   α = 0.4551  My = 0.0381
2') R = 1.0000  Mx = -0.3107
    α = 0.4551  My = -0.4619
1') R = 0.4433  Mx = 0.0000
    α = 0.0685  My = 0.0000

RA = 0.5567

1) R = 0.5700  Mx = 0.0000
   α = 0.0228  My = 0.0000
2) R = 0.0000  Mx = 0.5699
   α = 0.5008  My = 0.0130
2') R = 1.0000  Mx = -0.2962
    α = 0.5008  My = -0.4870
1') R = 0.4300  Mx = 0.0000
    α = 0.0228  My = 0.0000

RA = 0.5700

METHOD FOR EXTRUDING PLASTIC MASSES

PRIORITY

Priority is claimed as a national stage application, under 35 U.S.C. §371, to PCT/EP2009/003889, filed May 30, 2009, which claims priority to German application 102008029306.7, filed Jun. 20, 2008. The disclosures of the aforementioned priority applications are incorporated herein by reference in their entirety.

The invention relates to a process for extruding plastic compositions. The process in particular relates to the conveying, kneading and/or mixing of plastic compositions, in particular of polymer melts and mixtures of polymer melts, above all thermoplastics and elastomers, particularly preferably polycarbonate and polycarbonate blends, also with the incorporation of other substances such as for example solids, liquids, gases or other polymers or other polymer blends.

The extrusion of plastic compositions plays a major role in particular in the production, compounding and processing of polymers. Extrusion is here and hereinafter taken to mean the treatment of a substance or substance mixture in a co-rotating twin- or multi-screw extruder, as is comprehensively described in [1] ([1]=Kohlgrüber. Der gleichläufige Doppelschneckenextruder [The co-rotating twin-screw extruder], Hanser Verlag Munich 2007).

In the present application, the term multi-screw extruder also includes for example a ring extruder or a twin-screw extruder.

Co-rotating twin- or optionally multi-screw extruders, the rotors of which are fully self-wiping, have long been known (see for example DE 862 668). Extruders which are based on the principle of fully self-wiping profiles have been put to many different uses in polymer production and polymer processing. This is primarily a consequence of the fact that polymer melts adhere to surfaces and degrade over time at conventional processing temperatures, which is prevented by the self-cleaning action of fully self-wiping screws. Rules for producing fully self-wiping screw profiles are given for example in publication [1] on pages 96-109. It is also described therein how a predetermined screw profile of the 1st screw of a twin-screw extruder determines the screw profile of the 2nd screw of a twin-screw extruder. The screw profile of the 1st screw of the twin-screw extruder is therefore known as the generating screw profile. The screw profile of the 2nd screw of the twin-screw extruder follows from the screw profile of the 1st screw of the twin-screw extruder and is therefore known as the generated screw profile. In the case of a multi-screw extruder, neighboring screws are always arranged alternately with a generating screw profile and a generated screw profile.

Modern twin-screw extruders have a building-block system, in which various screw elements may be mounted on a core shaft. In this way, a person skilled in the art may adapt the twin-screw extruder to the particular task in hand.

As is known to a person skilled in the art and may be found for example in [1] on pages 96-109, the known closely intermeshing, self-cleaning, co-rotating screw profile according to the prior art, hereinafter designated the Erdmenger screw profile after its principal inventor, is unambiguously defined by stating the three variables: number of flights z, outer screw radius ra and centerline distance a. The number of flights z is an integer, which is greater than or equal to 1. A further important characteristic parameter of a screw profile is the core radius ri. A further important characteristic parameter of a screw profile is the flight depth h.

The zones of a screw profile which are equal to the outer screw radius are known as tip zones. The zones of a screw profile which are equal to the core radius are known as grooved zones. The zones of a screw profile which are smaller than the outer screw radius and larger than the core radius are known as flank zones. The zone of a multi-screw extruder at which two barrel bores interpenetrate is known as the intermesh zone. The two points of intersection of two barrel bores are known as barrel intermeshes.

The tip angle $\delta\_kw$ of an Erdmenger screw profile with z flights is calculated as $\delta\_kw=\pi/z-2*\arccos(0.5*a/ra)$, wherein $\pi$ should be taken to mean the circle constant ($\pi \approx 3.14159$) [1]. On the basis of the formula for calculating the tip angle, it may be concluded that, at an identical centerline distance and an identical outer screw radius, the tip angles of a single-flighted and of a double-flighted Erdmenger screw profile will differ by $\pi/2$. If the barrel radius rg is equal to the outer radius ra, the aperture angle $\delta\_gz$ between the two barrel intermeshes is calculated as $\delta\_gz=2*\arccos(0.5*a/ra)$. For single-flighted Erdmenger screw profiles, it follows that, at a ratio of outer screw radius to centerline distance of less than approx. 0.707, the intermesh zone is sealed by the tip zone of the screw profile.

The barrel zones in the vicinity of the two barrel intermeshes are known as the barrel intermesh zone. For the purposes of the following explanations, in each barrel bore this zone, starting from each of the two barrel intermeshes, has an angle $\delta\_gb$ relative to the center point of the barrel bores which is calculated from the difference of the tip angle of a single-flighted Erdmenger screw profile minus the aperture angle between the two barrel intermeshes: $\delta\_gb=\pi-4*\arccos(0.5*a/ra)$.

In addition, [1] explains in detail the structure, function and operation of twin- and multi-screw extruders. A whole chapter (pages 227-248) is devoted to the screw elements and their mode of action. Here the structure and function of conveying, kneading and mixing elements is explained in detail. To enable a transition between screw elements with different numbers of flights, washers are often used as spacers. In special cases, "transition elements" are used, which enable a continuous transition between two screw profiles with different numbers of flights, a self-cleaning pair of screw profiles being provided at each point of the transition.

A plastic composition is taken here and hereinafter to mean a deformable composition. Examples of plastic compositions are polymer melts, especially of thermoplastics and elastomers, particularly preferably polycarbonate and polycarbonate blends, mixtures of polymer melts or dispersions of polymer melts with solids, liquids or gases.

During polymer production, extrusion is performed, for example, to degas the polymers (see for example [1] pages 191 to 212).

During polymer compounding, extrusion is performed, for example to incorporate additives (see for example [1] pages 59 to 93). Compounding involves the conversion of a polymer into a finished plastics moulding composition (or compound) using plastics raw materials, and adding fillers and/or reinforcing materials, plasticizers, bonding agents, slip agents, stabilizers etc.

The treatment of plastic compositions during extrusion includes one or more of the operations: conveying, melting, dispersion, mixing, degassing and pressure build-up.

During polymer compounding, extrusion is above all used to produce mixtures of polymers with additives and auxiliaries and reinforcing materials and colors and to produce mixtures of different polymers which differ, for example, in chemical composition, molecular weight or molecular structure (see for example [1], pages 59 to 93). Compounding involves the conversion of a polymer into a finished plastics molding composition (or compound) using plastics raw materials, which are conventionally melted, and adding and incorporating and mixing fillers and/or reinforcing materials, plasticizers, bonding agents, slip agents, stabilizers, colors etc. with the polymer. Compounding often also includes the removal of volatile constituents such as for example air and water. Compounding may also a chemical reaction such as for example grafting, modification of functional groups or molecular weight modifications by deliberately increasing or decreasing molecular weight.

As is generally known and described, for example, in [1] on pages 169 to 190, mixing may be differentiated into distributive and dispersive mixing. Distributive mixing is taken to mean the uniform distribution of various components in a given volume. Distributive mixing occurs, for example, when similar polymers are mixed. In dispersive mixing, solid particles, fluid droplets or gas bubbles are firstly subdivided. Subdivision entails applying sufficiently large shear forces in order, for example, to overcome the surface tension at the interface between the polymer melt and an additive. Mixing is always understood below to mean distributive and dispersive mixing.

Melt conveying and pressure build-up are described on pages 73 et seq. of publication [1]. The melt conveying zones serve to transport the product from one processing zone to the next and to draw in fillers. Melt conveying zones are generally partially filled, such as for example during the transport of the product from one processing zone to the next, during degassing and in holding zones. Upstream of pressure consumers such as for example extruder dies, backward conveying elements, mixing elements and melt filters, there is formed a back pressure zone, in which conveying is carried out in a completely full state and in which the pressure for overcoming the pressure consumer must be built up. The energy introduced into the polymer melt is divided into effective power for conveying the melt and dissipation power which is disadvantageously manifested by an increase in the temperature of the melt. The least possible energy should thus be dissipated in the melt conveying zones. Thread elements having pitches of 1× the internal extruder diameter (1 D) are conventional for simple melt conveying [1].

During polymer processing, the polymers are preferably converted into the form of a semi-finished product, a ready-to-use product or a component. Processing may, for example, by injection molding, extrusion, film blowing, calendering or spinning. Processing may also involve mixing polymers with fillers and auxiliary substances and additives as well as chemical modifications such as for example vulcanization.

As a person skilled in the art is aware, polymer extrusion is advantageously performed on extruders with two or optionally more screws.

Pressure build-up zones are located in the extruder in the metering zone upstream of the die plate and/or the melt filter and upstream of any pressure consuming, "flow restricting" screw element, such as for example mixing elements or backward conveying or neutral conveying kneading blocks. The pressure required to overcome the flow restricting elements must accordingly be built up in the pressure build-up zones. The pressure consumed by the die plate, the tool and any downstream units, such as for example filters, must be generated in the metering zone. In the pressure build-up zone, strong reflux of the melt occurs over the screw tips, so resulting in elevated energy input [1].

It is known to a person skilled in the art that in the region of the screw tips a particularly large amount of energy is dissipated in the melt, which leads locally to severe overheating in the product. This is explained, for example, in [1] on pages 160 et seq. This local overheating may result in harm to the product such as for example a change in odor, color, chemical composition or molecular weight or in the formation of non-uniformities in the product such as gel particles or specks. A large tip angle, in particular, is harmful in this respect.

A person skilled in the art likewise knows [1] that, when using conventional screw elements, the necessary pressure can be built up in the fully filled state over the majority of the operating range of a co-rotating twin-screw extruder in the case of single-flighted conveying elements with a lower energy input and shorter back-pressure length than in the case of double-flighted elements.

It should, however, be noted that single-flighted conveying elements have a greater tendency to pulsate, i.e. they are largely incapable of damping fluctuations in throughput, for example due to fluctuating apportioning. The reason for this is that there is only one product stream in single-flighted conveying elements, in comparison with three product streams in double-flighted elements. Fluctuations in apportioning may therefore lead more rapidly to fluctuations in throughput at the extruder outlet than in the case of double- or triple-flighted conveying elements. Since there is only one product stream, the mixing action of single-flighted elements is likewise poorer in comparison with double- or triple-flighted conveying elements.

A person skilled in the art furthermore knows that known single-flighted screw elements have a very high energy input in partially filled zones as a result of their wide tip. This is detrimental to product quality. Known single-flighted elements are therefore rarely used.

It is known to a person skilled in the art that directly self-wiping screw profiles cannot be inserted directly into a twin-screw extruder, but rather clearances are necessary between the screw elements and the barrel and/or between the screw elements themselves. A person skilled in the art obtains the geometric data for the stated screw geometries on the basis of the contour of fully self-wiping screws using known methods, as are for example explained in [1]. Various possible strategies for conveying elements are described in [1] on page 28 et seq. When using the longitudinal section or three-dimensional offset methods stated therein, the tip angles KWA0 of the screws actually manufactured are reduced relative to the angle KW0, as is for example explained in [1], page 100. A large clearance between the screws in particular leads to a reduction in KWA0. A large clearance between the screws for reducing the tip angle is, however, unfavorable because this reduces the mutual self-cleaning effect of the screws and long residence times on the surface of the screw elements occur, which lead to local product damage and thus to impairment of product quality. It is also known to a person skilled in the art that enlarging the clearances has a negative impact on the efficiency of screw elements with regard to conveying action and pressure build-up, such that, if a given process engineering objective is to be achieved, excessively large clearances should not be selected.

DE 813 154 shows a single-flighted, closely intermeshing, self-cleaning, co-rotating screw profile. Such screw profiles have the advantage that the tip zone seals the intermesh zone, whereby conveying elements based on this screw profile have an elevated pressure build-up capacity. Such screw profiles have the disadvantage that the tip zone is very large, whereby the viscous fluids to be processed are exposed to unwanted thermal and mechanical stresses.

U.S. Pat. Nos. 4,131,371 A and DE 3,412,258 A1 show eccentric, triple-flighted, closely intermeshing, self-cleaning and co-rotating screw profiles. Eccentricity is always such that only one tip scrapes the barrel. Such screw profiles have the disadvantage that the intermesh zone is not sealed, whereby the pressure build-up capacity of a conveying element based on such screw profiles is low.

U.S. Pat. No. DE 4,239,220 A1 describes a 3-flighted self-cleaning screw profile in which the tip angles of the 3 tips are of different magnitudes. Only the tip with the largest tip angle touches the barrel. Such screw profiles have the disadvantage that the intermesh zone is not sealed, whereby the pressure build-up capacity of a conveying element based on such screw profiles is low.

Patent EP 2 131 A1 inter alia shows closely intermeshing, self-cleaning, co-rotating screw profiles in which two tip zones scrape the barrel and the distance of a flank zone located between two grooved zones from the barrel is less than or equal to half the flight depth. Such screw profiles have the disadvantage that the distance of said flank zone from the barrel is so small that said flank zone acts as an obstruction to flow which inhibits the pressure build-up of a conveying element based on such screw profiles.

Pressure build-up and melt conveying in hitherto known co-rotating twin screw extruders and multi-screw extruders are accordingly accompanied, due to poor extruder efficiency, by product heating and exposure to thermal stress which are thus detrimental to product quality.

When extruding polyethylene and polyethylene copolymers, an excessively high temperature results in an increase in molecular weight, branching and crosslinking. Polyethylene and polyethylene copolymers furthermore react with atmospheric oxygen in the autoxidation cycle known to a person skilled in the art ([2] Hepperle, J.: Schädigungsmechanismen bei Polymeren [Damage mechanisms in polymers], Polymeraufbereitung [Polymer compounding] 2002, VDI-K, VDI-Verlag GmbH, [3] Zweifel, H.: Stabilization of Polymeric Materials, Berlin, Springer 1997, [4] Schwarzenbach, K. et al.: Antioxidants, in Zweifel, H. (ed.): Plastics Additives Handbook, Munich, Hanser 2001, [5] Cheng, H. N., Schilling, F. C., Bovey, F. A.: $^{13}$C Nuclear Magnetic Resonance Observation of the Oxidation of Polyethylene, Macromolecules 9 (1976) pp. 363-365) to form strong-smelling and thus disruptive low molecular weight components such as for example ketones, aldehydes, carboxylic acids, hydroperoxides, esters, lactones and alcohols.

When extruding copolymers based on polyethylene and vinyl acetate, an excessively high temperature additionally results in the formation of strong-smelling and corrosive acetic acid.

When extruding polypropylene and polypropylene copolymers, a high temperature results in molecular weight degradation. Polypropylene and polypropylene copolymers furthermore react with atmospheric oxygen in the autoxidation cycle to form strong-smelling and thus disruptive low molecular weight components such as for example ketones, aldehydes, carboxylic acids, hydroperoxides, esters, lactones and alcohols.

When extruding polyvinyl chloride, an excessively high temperature results in polyvinyl chloride discoloration and the elimination of corrosive gaseous hydrochloric acid, wherein the hydrochloric acid in turn catalyzes further elimination of hydrochloric acid.

When extruding polystyrene, an excessively high temperature results in the formation of harmful styrene as well as dimeric and trimeric styrene, with molecular weight degradation and corresponding impairment of mechanical properties.

When extruding polystyrene-acrylonitrile copolymer (SAN), the product turns a yellowish color on exposure to thermal stress, resulting in reduced transparency, and forms the carcinogenic monomer acrylonitrile as well as styrene, with molecular weight degradation and impairment of mechanical properties.

When extruding aromatic polycarbonates, the product turns a yellowish color on exposure to excessive thermal stress, in particular due to the action of oxygen, resulting in reduced transparency, and exhibits molecular weight degradation, in particular due to the action of water. Monomers such as for example bisphenol A are also dissociated on exposure to elevated temperature.

When extruding polyesters such as for example polyethylene terephthalate, polybutylene terephthalate, polytrimethylene terephthalate and polylactide, an excessive temperature and the action of water result in a reduction in molecular weight and displacement of the end groups in the molecule. This is problematic especially when recycling polyethylene terephthalate. Polyethylene terephthalate eliminates acetaldehyde at elevated temperature, which may for example result in changes to the flavor of the contents of beverage bottles.

When extruding thermoplastics impact-modified with diene rubbers, in particular with butadiene rubber, in particular impact-modified grades of polystyrene (HIPS) and impact-modified SAN (acrylonitrile-butadiene-styrene, ABS), an excessive temperature results in the elimination of carcinogenic butadiene and toxic vinylcyclohexene. Furthermore the diene rubber crosslinks, resulting in impaired mechanical properties of the product.

When extruding polyoxymethylene, an excessive temperature results in the elimination of toxic formaldehyde.

When extruding polyamides such as polyamide 6, polyamide 6,6, polyamide 4,6, polyamide 11 and polyamide 12, an excessively high temperature results in product discoloration and molecular weight degradation and in the reformation of monomers and dimers, so resulting in impairment of mechanical properties, especially in the presence of water.

When extruding thermoplastic polyurethanes, an excessively high temperature results in changes to the molecular structure by transurethanization and, in the presence of water, in molecular weight degradation. Both of these undesirably influence the properties of the thermoplastic polyurethane.

When extruding polymethyl methacrylate, methyl methacrylate is eliminated and molecular weight degraded on exposure to excessive thermal stress, resulting in an odor nuisance and impaired mechanical properties.

When extruding polyphenylene sulfide, an excessively high temperature results in the elimination of sulfur-containing organic and inorganic compounds, which result in an odor nuisance and may lead to corrosion of the extrusion dies. Low molecular weight oligomers and monomers are also formed and the molecular weight degraded, so impairing the mechanical properties of polyphenylene sulfide.

When extruding polyphenylsulfone, an excessively high temperature results in the elimination of organic compounds, especially in the presence of water. The molecular weight also declines, resulting in impaired mechanical properties.

When extruding polyphenylene ether, excessively high temperatures result in the elimination of low molecular weight organic compounds, wherein the molecular weight declines. This results in impairment of the mechanical properties of the product.

When extruding diene rubbers such as for example polybutadiene (BR), natural rubber (NR) and synthetic polyisoprene (IR), butyl rubber (ER), chlorobutyl rubber (CIIR), bromobutyl rubber (BIIR), styrene-butadiene rubber (SBR), polychloroprene (CR), butadiene-acrylonitrile rubber (NBR), partially hydrogenated butadiene-acrylonitrile rubber (HNBR) and ethylene-propylene-diene copolymers (EPDM), an excessively high temperature results in gel formation by crosslinking, which leads to the impairment of mechanical properties of components produced therefrom. In the case of chloro- and bromobutyl rubber, an elevated temperature may result in the elimination of corrosive gaseous hydrochloric or hydrobromic acid, which in turn catalyzes further decomposition of the polymer.

When extruding rubber compounds which contain vulcanizing agents, such as for example sulfur or peroxides, excessively high temperatures result in premature vulcanization. This results in its no longer being possible to produce any products from these rubber compounds.

When extruding mixtures of one or more polymers at excessively high temperatures, the disadvantages of extruding the individual polymers occur in each case.

The object therefore arose of providing a process for extruding, in particular for melt conveying, for kneading and/or mixing, plastic compositions in particular polymer melts and mixtures of polymer melts, above all thermoplastics and elastomers, particularly preferably polycarbonate and polycarbonate blends, which is as efficient as possible, i.e. requires a low energy input while simultaneously ensuring high pressure build-up, and treats plastic compositions gently. One particular object was to provide a process for extruding polycarbonate melts in which elevated melt temperatures combined with relatively long residence times are avoided.

It has surprisingly been found that plastic compositions may successfully be extruded with elevated pressure build-up and good conveying action together with a low energy input when screw elements with screws co-rotating in pairs and being fully self-wiping in pairs are used, which are characterized in that generating and generated screw profiles comprise a sequence of sealing zone—transition zone—channel zone—transition zone, wherein a sealing zone is a sequence of tip zone—flank zone—tip zone, a channel zone is a sequence of grooved zone—flank zone—grooved zone and a transition zone is a sequence of screw profile zones which starts with a flank zone and ends with a flank zone.

The present invention accordingly provides a process for extruding plastic compositions in a twin- or multi-screw extruder using screw elements with screws co-rotating in pairs and being fully self-wiping in pairs, characterized in that generating and generated screw profiles comprise a sequence of sealing zone—transition zone—channel zone—transition zone, wherein a sealing zone is a sequence of tip zone—flank zone—tip zone, a channel zone is a sequence of grooved zone—flank zone—grooved zone and a transition zone is a sequence of screw profile zones which starts with a flank zone and ends with a flank zone.

A sealing zone is taken to mean a sequence of tip zone—flank zone—tip zone. A channel zone is taken to mean a sequence of grooved zone—flank zone—grooved zone. A transition zone is taken to mean a sequence of screw profile zones which starts with a flank zone and ends with a flank zone.

The sealing zone of the screw elements to be used according to the invention is preferably distinguished in that
relative to the point of rotation of the screw profile, the flank zone has an angle $\delta\_fb1$ which is greater than or equal to half the aperture angle between the two barrel intermeshes ($\delta\_fb1 \geq \arccos(0.5*a/ra)$) and is preferably greater than or equal to the aperture angle between the two barrel intermeshes ($\delta\_fb1 \geq 2*\arccos(0.5*a/ra)$),
relative to the point of rotation of the screw profile, one tip zone has an angle $\delta\_kb1$ which is less than or equal to the difference of the tip angle of a single-flighted Erdmenger screw profile minus the aperture angle between the two barrel intermeshes ($\delta\_kb1 \leq \pi - 4*\arccos(0.5*a/ra)$) and which is preferably less than or equal to the tip angle of a double-flighted Erdmenger screw profile ($\delta\_kb1 \leq \pi/2 - 2*\arccos(0.5*a/ra)$),
relative to the point of rotation of the screw profile, the other tip zone has an angle $\delta\_kb2$ which is less than or equal to the difference of the tip angle of a single-flighted Erdmenger screw profile minus the aperture angle between the two barrel intermeshes ($\delta\_kb2 \leq \pi - 4*\arccos(0.5*a/ra)$) and which is preferably less than or equal to the tip angle of a double-flighted Erdmenger screw profile ($\delta\_kb2 \leq \pi/2 - 2*\arccos(0.5*a/ra)$).

The sum of the angles of tip and flank zones $\delta\_kb1$, $\delta\_kb2$ and $\delta\_fb1$ of the sealing zone is preferably in the range from $0.75*\delta\_gz$ to $2*\delta\_gb+\delta\_gz$. In one particularly preferred embodiment, the sum of the angles of the tip and flank zones $\delta\_kb1$, $\delta\_kb2$ and $\delta\_fb1$ of the sealing zone is in the range from $\delta\_gz$ to $\delta\_gb+\delta\_gz$.

The channel zone of the screw elements to be used according to the invention is preferably distinguished in that
relative to the point of rotation of the screw profile, the flank zone has an angle $\delta\_fb2$ which is greater than or equal to half the aperture angle between the two barrel intermeshes ($\delta\_fb2 \geq \arccos(0.5*a/ra)$) and which is preferably greater than or equal to the aperture angle between the two barrel intermeshes ($\delta\_fb2 \geq 2*\arccos(0.5*a/ra)$), and the minimum distance of the flank zone from the screw radius ra is greater than half the flight depth h,
relative to the point of rotation of the screw profile, one grooved zone has an angle $\delta\_fb1$ which is less than or equal to the difference of the tip angle of a single-flighted Erdmenger screw profile minus the aperture angle between the two barrel intermeshes ($\delta\_nb1 \leq \pi - 4*\arccos(0.5*a/ra)$) and which is preferably less than or equal to the tip angle of a double-flighted Erdmenger screw profile ($\delta\_nb1 \leq \pi/2 - 2*\arccos(0.5*a/ra)$),
relative to the point of rotation of the screw profile, the other grooved zone has an angle $\delta\_nb2$ which is less than or equal to the difference of the tip angle of a single-flighted Erdmenger screw profile minus the aperture angle between the two barrel intermeshes ($\delta\_nb2 \leq \pi - 4*\arccos(0.5*a/ra)$) and which is preferably less than or equal to the tip angle of a double-flighted Erdmenger screw profile ($\delta\_nb2 \leq \pi/2 - 2*\arccos(0.5*a/ra)$).

The sum of the angles of the grooved and flank zones $\delta\_nb1$, $\delta\_nb2$ and $\delta\_fb2$ of the channel zone is preferably in the range from $0.75*\delta\_gz$ to $2*\delta\_gb+\delta\_gz$. In one particularly preferred embodiment, the sum of the angles of the grooved and flank zones $\delta\_nb1$, $\delta\_nb2$ and $\delta\_fb2$ of the channel zone is in the range from $\delta\_gz$ to $\delta\_gb+\delta\_gz$.

The transition zone is distinguished in that it starts with a flank zone and ends with a flank zone. The transition zone preferably consists of a sequence of flank zone—tip zone—flank zone or of a sequence of flank zone—grooved zone—flank zone or of a sequence of flank zone—tip zone—flank zone—grooved zone—flank zone or of a sequence of flank zone—grooved zone—flank zone—tip zone—flank zone. In one particularly preferred embodiment the transition zone consists of a flank zone. In this case, the transition zone begins and ends with this one said flank zone.

The screw elements are not here limited to the currently conventional modular construction consisting of a screw with screw elements and core shafts, but also to screws of solid construction. The term "screw elements" should thus also be taken to mean screws of solid construction.

The screw elements to be used according to the invention may be used as conveying elements, kneading elements and/or mixing elements.

A conveying element is known to be distinguished in that (see for example [1], pages 227-248) the screw profile is rotated and extended continuously helically in the axial direction. The conveying element may have right- or left-handed flights. The pitch of the conveying element is preferably in the range from 0.1 to 10 times the centerline distance, the pitch being taken to mean the axial length which is necessary for one complete rotation of the screw profile, and the axial length of a conveying element is preferably in the range from 0.1 to 10 times the centerline distance.

A kneading element is known to be distinguished in that (see for example [1], pages 227-248) the screw profile extends discontinuously in the axial direction in the form of kneading disks. The kneading disks may be arranged in right- or left-handed manner or neutrally. The axial length of the kneading disks is preferably in the range from 0.05 to 10 times the centerline distance. The axial distance between two neighboring kneading disks is preferably in the range from 0.002 to 0.1 times the centerline distance.

As is known, mixing elements are formed (see for example [1], pages 227-248) by constructing conveying elements with openings in the screw tips. The mixing elements may be right- or left-handed. Their pitch is preferably in the range from 0.1 to 10 times the centerline distance and the axial length of the elements is preferably in the range from 0.1 times to 10 times the centerline distance. The openings preferably take the form of a U- or V-shaped groove, which are preferably arranged in a counter-conveying or axially parallel manner.

It is known to a person skilled in the art that directly self-wiping screw profiles cannot be inserted directly into a twin-screw extruder, but rather clearances are necessary between the screws. Various possible strategies for this purpose are described in [1] on page 28 et seq. For screw profiles of screw elements according to the invention, clearances in the range from 0.001 to 0.1, relative to the diameter of the screw profile, are used, preferably from 0.002 to 0.05 and particularly preferably from 0.004 to 0.02. The clearances may, as is known to a person skilled in the art, be of different dimensions or identical between screw and barrel and between screw and screw. The clearances may also be constant or, within the stated limits, variable. It is also possible to displace a screw profile within the clearances. Possible clearance strategies are the possibilities, described in [1] on page 28 et seq., of centerline distance enlargement, longitudinal section offsets and three-dimensional offsets, all of which are known to a person skilled in the art. In the case of centerline distance enlargement, a screw profile of a relatively small diameter is constructed and spaced further apart by the amount of clearance between the screws. In the longitudinal section offset method, the longitudinal section profile curve (parallel to the axis) is displaced inwards by half the screw-screw clearance. In the three-dimensional offset method, starting from the three-dimensional curve on which the screw elements clean one another, the screw element is reduced in size in the direction perpendicular to the faces of the fully self-wiping profile by half the clearance between screw and screw. The longitudinal section and three-dimensional offset methods are preferred, the three-dimensional offset method being particularly preferred.

The present invention furthermore provides a process for producing plastic compositions, in particular polymer melts and mixtures of polymer melts, above all thermoplastics and elastomers, particularly preferably polycarbonate and polycarbonate blends, characterized in that screw elements according to the invention are used in multi-screw extruders. The screw elements according to the invention are preferably used in twin-screw extruders. The screw elements may be present in the multi-screw extruders in the form of kneading or conveying elements. It is likewise possible to combine kneading and conveying elements with one another in one extruder. The screw elements according to the invention may also be combined with other screw elements, which are known according to the prior art.

The novel screw elements according to the invention are distinguished in that they do not exhibit the above-stated disadvantages of screw elements known according to the prior art. In particular, the screw elements according to the invention enable sealing of the intermesh zone by a tip zone being located in each case in a barrel intermesh zone, whereby the pressure build-up capacity of conveying elements based on such screw profiles is large. In particular, the present invention provides screw elements, the tip zones of which are small, whereby exposure of the product to thermal and mechanical stress is minimized. In particular, the present invention provides screw elements in which the flank zone located between two grooved zones is at a distance from the barrel which is greater than half the flight depth, whereby flow resistance is kept low. In particular, the present invention provides screw elements which have an identical screw profile for all the screws of a multi-screw extruder or the two screws of a twin-screw extruder.

Preferred materials for producing the screw elements are steels, in particular nitriding steels and special steels.

Plastic compositions which may be extruded highly efficiently according to the invention while gentle treatment of the product is simultaneously ensured, are for example suspensions, pastes, glass, ceramic compositions, metals in the form of a melt, plastics, plastics melts, polymer solutions, elastomer and rubber compositions.

Plastics and polymer solutions are preferably used, particularly preferably thermoplastic polymers. Preferred thermoplastic polymers are preferably at least one of the series of polycarbonate, polyamide, polyester, in particular polybutylene terephthalate and polyethylene terephthalate, polylactide, polyether, thermoplastic polyurethane, polyacetal, fluoropolymer, in particular polyvinylidene fluoride, polyether sulfones, polyolefin, in particular polyethylene and polypropylene, polyimide, polyacrylate, in particular poly(methyl)methacrylate, polyphenylene oxide, polyphenylene sulfide, polyether ketone, polyarylether ketone, styrene polymers, in particular polystyrene, styrene copolymers, in particular styrene-acrylonitrile copolymer, acrylonitrile-butadiene-styrene block copolymers and polyvinyl chloride. Blends of the listed plastics are likewise preferably used, these being understood by a person skilled in the art to be a combination of two or more plastics. Particular preference is given to polycarbonate and mixtures containing polycarbonate, polycarbonate being very particularly preferred, it being obtained for example using the phase boundary process or the melt transesterification process.

Further preferred feed materials are rubbers. Preferred rubbers are preferably at least one from the series of styrene-butadiene rubber, natural rubber, butadiene rubber, isoprene rubber, ethylene-propylene-diene rubber, ethylene-propylene rubber, butadiene-acrylonitrile rubber, hydrogenated nitrile rubber, butyl rubber, halobutyl rubber, chloroprene rubber, ethylene-vinyl acetate rubber, polyurethane rubber, thermoplastic polyurethane, gutta percha, acrylate rubber, fluororubber, silicone rubber, sulfide rubber, chlorosulfonyl-polyethylene rubber. A combination of two or more of the listed rubbers, or a combination of one or more rubbers with one or more plastics is of course also possible.

These thermoplastics and elastomers may be used in pure form or as mixtures with fillers and reinforcing materials, such as in particular glass fibers, as mixtures with one another or with other polymers or as mixtures with conventional polymer additives.

In one preferred embodiment the plastics compositions, in particular the polymer melts and mixtures of polymer melts, have additives admixed with them. These may be placed as solids, liquids or solutions in the extruder together with the polymer or at least some of the additives or all the additives are supplied to the extruder via a side stream.

Additives may impart many different characteristics to a polymer. They may for example colorants, pigments, processing auxiliaries, fillers, antioxidants, reinforcing materials, UV absorbers and light stabilizers, metal deactivators, peroxide scavengers, basic stabilizers, nucleating agents, benzofurans and indolinones active as stabilizers or antioxidants, mold release agents, flame-retardant additives, antistatic agents, dye preparations and melt stabilizers. Examples of these are carbon black, glass fibers, clay, mica, graphite fibers, titanium dioxide, carbon fibers, carbon nanotubes, ionic liquids and natural fibers.

In the process according to the invention, the extruder may be fed with product in various ways depending on the form assumed by the polymer. In a preferred variant, the extruder is fed with a liquid phase which, in addition to the polymer, may still contain solvent and optionally residual monomers. The form in which polymers are obtained after the reaction and optionally preliminary evaporation is known to a person skilled in the art. Examples are:
  polystyrene with residual styrene and possibly ethylbenzene, toluene, xylene, butanone or another solvent
  styrene and acrylonitrile copolymer with residual styrene, residual acrylonitrile, and possibly ethylbenzene, toluene, xylene, butanone or another solvent
  linear low- or high-density polyethylene, branched polyethylene with solvent such as hexane, technical hexane, propane, isobutane and monomers such as propylene, butene-1, hexene-1,4-methylpentene-1, octene-1 (processes involving suspensions are: CX process, Mitsui Chemicals (hexane), Hostalen process Basell (hexane), Chevron Philips USA (isobutane), Borstar process, Borealis (propane) Belgium, and DSM uses hexane in a solvent process). Details in this connection are described in [6] (Comparative Analysis of Various Polyethylene Production Technologies, Chem. & Petroleum Eng. vol. 44, nos. 7-8, 2008)
  polycarbonate with solvent, for example chlorobenzene and methylene chloride
  polymethyl methacrylate with monomer, i.e. methyl methacrylate.

In the process according to the invention, the extruder may for example also be fed with particles. In this case, an extruder according to the invention above all serves for melting, for conversion and for mixing with additives. The form in which the polymers are obtained after the reaction and optionally preliminary evaporation or precipitation is known to a person skilled in the art. Examples are:
  polypropylene, in which the polymer is obtained in the form of powder after the final reaction
  high-density polyethylene from a gas phase or slurry process
  emulsion polymers such as for example acrylonitrile-butadiene-styrene after precipitation and optionally drying During compounding, a twin- or multi-screw extruder according to the invention is particularly suitable for tasks involving degassing. Particular advantages are here achieved during direct compounding of recycled polyethylene terephthalate from bottle material, which comprises degassing with minimal exposure to thermal stress.

The process according to the invention is particularly preferably used in the production and compounding of polycarbonate. It has advantages here above all with regard to the color of the polycarbonate, which, in uncolored polycarbonate, is measured with the yellowness index (YI). The screw elements according to the invention are here particularly preferably used in the degassing zone.

Polycarbonates for the purposes of the present invention are both homopolycarbonates and copolycarbonates; the polycarbonates may in known manner be linear or branched.

Preferred methods of production of the polycarbonates to be used according to the invention, including the polyester carbonates, are the known phase boundary process and the known melt transesterification process.

In the first case, the carbonic acid derivative used is preferably phosgene, in the latter case preferably diphenyl carbonate. Catalysts, solvents, working up, reaction conditions etc. for polycarbonate production have in both cases been adequately described and are adequately known.

Some, up to 80 mol %, preferably from 20 mol % to 50 mol %, of the carbonate groups in the polycarbonates suitable according to the invention may be replaced by aromatic dicarboxylic acid ester groups. Such polycarbonates, which contain both acid residues of carbonic acid and acid residues of aromatic dicarboxylic acids incorporated into the molecule chain, are, precisely stated, aromatic polyester carbonates. For simplicity's sake, in the present application they are subsumed under the generic term "thermoplastic, aromatic polycarbonates".

The process according to the invention is in particular used in the production of polycarbonates. The present invention accordingly also provides a process for producing polycarbonates, characterized in that at least one step of the manufacturing process comprises an extrusion process according to the invention.

Production of the polycarbonates using the process according to the invention proceeds in known manner from diphenols, carbonic acid derivatives, optionally chain terminators and optionally branching agents, wherein for production of the polyester carbonates some of the carbonic acid derivatives are replaced by aromatic dicarboxylic acids or derivatives of the dicarboxylic acids, specifically, in accordance with the carbonate structural units to be replaced in the aromatic polycarbonates, by aromatic dicarboxylic acid ester structural units.

By way of example of the production of polycarbonates, reference may here be made to Schnell, "Chemistry and Physics of Polycarbonates", Polymer Reviews, volume 9, Interscience Publishers, New York, London, Sydney 1964.

The thermoplastic polycarbonates, which are preferably used in the process according to the invention, including the thermoplastic, aromatic polyester carbonates, have an average molecular weight $M_W$ (determined by measurement of the relative viscosity at 25° C. in $CH_2Cl_2$ and a concentration of 0.5 g per 100 ml $CH_2Cl_2$) of 12,000 to 120,000, preferably of 15,000 to 80,000 and in particular of 15,000 to 60,000.

Diphenols suitable for the process according to the invention for producing polycarbonate have often been described in the prior art.

Suitable diphenols are for example hydroquinone, resorcinol, dihydroxydiphenyl, bis(hydroxyphenyl)alkanes, bis(hydroxyphenyl)cycloalkanes, bis(hydroxyphenyl) sulfides, bis(hydroxyphenyl)ethers, bis(hydroxyphenyl) ketones, bis (hydroxyphenyl) sulfones, bis(hydroxyphenyl) sulfoxides, α,α'-bis-(hydroxyphenyl)-diisopropylbenzenes, and the alkylated, ring-alkylated and ring-halogenated compounds thereof.

Preferred diphenols are 4,4'-dihydroxydiphenyl, 2,2-bis-(4-hydroxyphenyl)-1-phenylpropane, 1,1-bis-(4-hydroxyphenyl)-phenylethane, 2,2-bis-(4-hydroxyphenyl)propane, 2,4-bis-(4-hydroxy-phenyl)-2-methylbutane, 1,3-bis-[2-(4-hydroxyphenyl)-2-propyl]benzene (bisphenol M), 2,2-bis-(3-methyl-4-hydroxyphenyl)-propane, bis-(3,5-dimethyl-4-hydroxyphenyl)-methane, 2,2-bis-(3,5-dimethyl-4-hydroxyphenyl)-propane, bis-(3,5-dimethyl-4-hydroxyphenyl) sulfone, 2,4-bis-(3,5-dimethyl-4-hydroxyphenyl)-2-methylbutane, 1,3-bis-[2-(3,5-dimethyl-4-hydroxyphenyl)-2-propyl]-benzene and 1,1-bis-(4-hydroxyphenyl)-3,3,5-trimethylcyclohexane (bisphenol TMC).

Particularly preferred diphenols are 4,4'-dihydroxydiphenyl, 1,1-bis(4-hydroxyphenyl)phenylethane, 2,2-bis(4-hydroxyphenyl)propane, 2,2-bis(3,5-dimethyl-4-hydroxy-phenyl)propane, 1,1-bis(4-hydroxyphenyl)cyclohexane and 1,1-bis(4-hydroxyphenyl)-3,3,5-trimethylcyclohexane (bisphenol TMC).

These and further suitable other dihydroxyaryl compounds are described, for example, in DE-A 3 832 396, FR-A 1 561 518, in H. Schnell, Chemistry and Physics of Polycarbonates, Interscience Publishers, New York 1964, p. 28 et seq.; p. 102 et seq. and in D. G. Legrand, J. T. Bendier, Handbook of Polycarbonate Science and Technology, Marcel Dekker New York 2000, p. 72 et seq.

In the case of homopolycarbonates, only one diphenol is used, while in the case of copolycarbonates two or more diphenols are used, wherein the diphenols used, like all the other chemicals and auxiliaries added to the synthesis, may obviously be contaminated with impurities originating from the synthesis, handling and storage thereof, although it is desirable to use the cleanest possible raw materials.

The diaiyl carbonates suitable for the reaction with the dihydroxyaryl compounds suitable in the melt transesterification are those of the general formula (II)

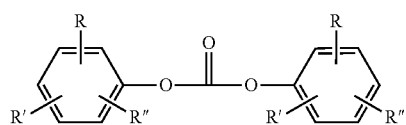

in which

R, R' and R" mutually independently identically or differently denote hydrogen, linear or branched $C_1$-$C_{34}$ alkyl, $C_7$-$C_{34}$ alkylaryl or $C_6$-$C_{34}$ aryl, R may furthermore also mean —COO—R'", wherein R'" denotes hydrogen, linear or branched $C_1$-$C_{34}$ alkyl, $C_7$-$C_{34}$ alkylaryl or $C_6$-$C_{34}$ aryl.

Preferred diaryl carbonates are for example diphenyl carbonate, methylphenyl phenyl carbonates and di-(methylphenyl) carbonates, 4-ethylphenyl phenyl carbonate, di-(4-ethylphenyl) carbonate, 4-n-propylphenyl phenyl carbonate, di-(4-n-propylphenyl) carbonate, 4-iso-propylphenyl phenyl carbonate, di-(4-iso-propylphenyl) carbonate, 4-n-butylphenyl phenyl carbonate, di-(4-n-butylphenyl) carbonate, 4-iso-butylphenyl phenyl carbonate, di-(4-iso-butylphenyl) carbonate, 4-tert-butylphenyl phenyl carbonate, di-(4-tert-butylphenyl) carbonate, 4-n-pentylphenyl phenyl carbonate, di-(4-n-pentylphenyl) carbonate, 4-n-hexylphenyl phenyl carbonate, di-(4-n-hexylphenyl) carbonate, 4-iso-octylphenyl phenyl carbonate, di-(4-iso-octylphenol) carbonate, 4-n-nonylphenyl phenyl carbonate, di-(4-n-nonylphenyl) carbonate, 4-cyclohexylphenyl phenyl carbonate, di-(4-cyclohexylphenyl) carbonate, 4-(1-methyl-1-phenylethyl)-phenyl phenyl carbonate, di-[4-(1-methyl-1-phenylethyl)-phenyl]carbonate, biphenyl-4-yl-phenyl carbonate, di-(biphenyl-4-yl) carbonate, 4-(1-naphthyl)-phenyl phenyl carbonate, 4-(2-naphthyl)-phenyl phenyl carbonate, di-[4-(1-naphthyl)-phenyl]carbonate, di-[4-(2-naphthyl)phenyl] carbonate, 4-phenoxyphenyl phenyl carbonate, di-(4-phenoxyphenyl) carbonate, 3-pentadecylphenyl phenyl carbonate, di-(3-pentadecylphenyl) carbonate, 4-tritylphenyl phenyl carbonate, di-(4-tritylphenyl) carbonate, methyl salicylate phenyl carbonate, di-(methyl salicylate) carbonate, ethyl salicylate phenyl carbonate, di-(ethyl salicylate) carbonate, n-propyl salicylate phenyl carbonate, di-(n-propyl salicylate) carbonate, iso-propyl salicylate phenyl carbonate, di-(iso-propyl salicylate) carbonate, n-butyl salicylate phenyl carbonate, di-(n-butyl salicylate) carbonate, iso-butyl salicylate phenyl carbonate, di-(iso-butyl salicylate) carbonate, tert-butyl salicylate phenyl carbonate, di-(tert-butyl salicylate) carbonate, di-(phenyl salicylate) carbonate and di-(benzyl salicylate) carbonate.

Particularly preferred diaryl compounds are diphenyl carbonate, 4-text-butylphenyl phenyl carbonate, di-(4-tert-butylphenyl) carbonate, biphenyl-4-yl-phenyl carbonate, di-(biphenyl-4-yl) carbonate, 4-(1-methyl-1-phenylethyl)-phenyl phenyl carbonate, di-[4-(1-methyl-1-phenylethyl)-phenyl]carbonate and di-(methyl salicylate) carbonate.

Diphenyl carbonate is very particularly preferred.

Not just one diaryl carbonate, but also various diaryl carbonates may be used.

The diaryl carbonates may also be used if they have a residual content of the monohydroxyaryl compounds from which they have been produced. Residual contents of monohydroxyaryl compounds may amount to up to 20 wt. %, preferably up to 10 wt. %, particularly preferably up to 5 wt. % and very particularly preferably up to 2 wt. %.

Relative to the dihydroxyaryl compound(s), the diaiyl carbonate(s) are in general used in an amount of 1.02 to 1.30 mol, preferably of 1.04 to 1.25 mol, particularly preferably of 1.045 to 1.22 mol, very particularly preferably of 1.05 to 1.20 mol per mol of dihydroxyaryl compound. Mixtures of the above-stated diaiyl carbonates may also be used, in which case the above-listed molar quantities per mol of dihydroxyaryl compound then relate to the total molar quantity of the diaryl carbonate mixture.

The monofunctional chain terminators required to control molecular weight, such as for example phenol or alkylphenols, in particular phenol, p-tert-butylphenol, iso-octylphenol, cumylphenol, the chloroformic acid esters thereof or acid chlorides of monocarboxylic acids or mixtures of these chain terminators, are either introduced into the reaction with the bisphenolate or bisphenolates or alternatively added at any desired time during synthesis, providing that phosgene or chloroformic acid end groups are present in the reaction mixture or, in the case of acid chlorides and chloroformic acid esters as chain terminators, providing that sufficient phenolic end groups of the polymer being formed are available. Preferably, however, the chain terminator(s) are added after phosgenation at a location or time at which no phosgene is any longer present, but the catalyst has not yet been apportioned. Alternatively, they may also be apportioned before the catalyst, together with the catalyst or in parallel.

Branching agents or branching agent mixtures are optionally added to the synthesis in the same manner. Conventionally, however, branching agents are added before the chain terminators. As a rule trisphenols, quaterphenols or acid chlorides of tri- or tetracarboxylic acids or mixtures of the polyphenols or acid chlorides are used. Some of the compounds suitable as branching agents with three or more than three phenolic hydroxyl groups are for example phloroglucinol, 4,6-dimethyl-2,4,6-tri-(4-hydroxyphenyl)-heptene-2,4,6-dimethyl-2,4,6-tri-(4-hydroxyphenyl)-heptane, 1,3,5-tri(4-hydroxyphenyl)benzene, 1,1,1-tri(4-hydroxyphenyl)ethane, tri-(4-hydroxyphenyl)-phenylmethane, 2,2-bis(4,4-bis(4-hydroxyphenyl)cyclohexyl)propane, 2,4-bis-(4-hydroxyphenyl-isopropyl)-phenol, tetra-(4-hydroxyphenyl) methane.

Some other trifunctional compounds are 2,4-dihydroxybenzoic acid, trimesic acid, cyanuric chloride and 3,3-bis(3-methyl-4-hydroxyphenyl)-2-oxo-2,3-dihydroindole.

Preferred branching agents are 3,3-bis(3-methyl-4-hydroxyphenyl)-2-oxo-2,3-dihydroindole and 1,1,1-tri-(4-hydroxyphenyl)ethane.

The catalysts preferably used in the phase boundary synthesis of polycarbonate are tertiary amines, in particular triethylamine, tributylamine, trioctylamine, N-ethylpiperidine, N-methylpiperidine, N-i/n-propylpiperidine, quaternary ammonium salts such as tetrabutylammonium, tributylbenzylammonium, tetraethylammonium hydroxide, chloride, bromide, hydrogensulfate, tetrafluoroborate, and the phosphonium compounds corresponding to the ammonium compounds. These compounds are described in the literature as typical phase boundary catalysts, are commercially obtainable and are familiar to a person skilled in the art. The catalysts may be added to the synthesis individually, as a mixture or also in parallel and in succession, optionally also before phosgenation, but they are preferably apportioned after introduction of phosgene, unless an onium compound or a mixture of onium compounds are used as catalysts. In this case, addition preferably proceeds before the phosgene is apportioned. The catalyst or catalysts may be apportioned without solvent, in an inert solvent, preferably the polycarbonate synthesis solvent, or also as an aqueous solution, in the case of tert-amines then as the ammonium salts thereof with acids, preferably mineral acids, in particular hydrochloric acid. When a plurality of catalysts are used or the total amount of catalyst is apportioned in proportions, different methods of apportionment may of course be used at different points or at different times. The total quantity of catalysts used amounts to 0.001 to 10 mol % relative to introduced moles of bisphenols, preferably 0.01 to 8 mol %, particularly preferably 0.05 to 5 mol %.

Catalysts which may be used in the melt transesterification process for the production of polycarbonates are the basic catalysts known from the literature, such as for example alkali metal and alkaline earth metal hydroxides and oxides and/or onium salts, such as for example ammonium or phosphonium salts. Onium salts, particularly preferably phosphonium salts, are preferably used in the synthesis. Such phosphonium salts are for example those of the general formula (IV)

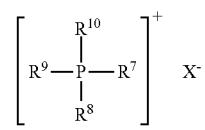

in which $R^{7-10}$ denote identical or different optionally substituted $C_1$-$C_{10}$ alkyl, $C_6$-$C_{14}$ aryl, $C_7$-$C_{15}$ arylalkyl or $C_5$-$C_6$ cycloalkyl residues, preferably methyl or $C_6$-$C_{14}$ aryl, particularly preferably methyl or phenyl and $X^-$ denotes an anion selected from the group hydroxide, sulfate, hydrogensulfate, hydrogencarbonate, carbonate, halide, preferably chloride, and alkylate or arylate of the formula
—$OR^{11}$, wherein $R^{11}$ denotes an optionally substituted $C_6$-$C_{14}$ aryl, $C_7$-$C_{15}$ arylalkyl or $C_5$-$C_6$ cycloalkyl residue, $C_1$-$C_{20}$ alkyl, preferably phenyl.

Particularly preferred catalysts are tetraphenylphosphonium chloride, tetraphenylphosphonium hydroxide and tetraphenylphosphonium phenolate, with tetraphenylphosphonium phenolate being very particularly preferred.

The catalysts are preferably used in quantities of $10^{-8}$ to $10^{-3}$ mol, particularly preferably in quantities of $10^{-7}$ to $10^{-4}$ mol, relative to one mol of dihydroxyaryl compound.

Cocatalysts may optionally also be used in order to increase the rate of polycondensation.

These may be, for example, salts with an alkaline action of alkali metals and alkaline earth metals, such as hydroxides, optionally substituted $C_1$-$C_{10}$ alkoxides and $C_6$-$C_{14}$ aryloxides of lithium, sodium and potassium, preferably hydroxides, optionally substituted $C_1$-$C_{10}$ alkoxides or $C_6$-$C_{14}$ aryloxides of sodium. Sodium hydroxide, sodium phenolate or the disodium salt of 2,2-bis-(4-hydroxyphenyl)-propane are preferred.

If alkali metal or alkaline earth metal ions are introduced in the form of the salts thereof, the quantity of alkali metal or alkaline earth ions, determined for example by atomic absorption spectroscopy, amounts to 1 to 500 ppb, preferably 5 to 300 ppb and most preferably 5 to 200 ppb, relative to the polycarbonate to be formed. In preferred embodiments of the process according to the invention, however, no alkali metal salts are used.

Polycarbonate synthesis may be carried out continuously or discontinuously. The reaction may therefore proceed in stirred-tank reactors, tubular reactors, pumped circulation reactors or cascades of stirred-tank reactors or combinations thereof. It must here be ensured by using the above-mentioned mixing elements that aqueous and organic phases as far as possible do not segregate until the synthesis mixture has reacted to completion, i.e. it no longer contains any saponifiable chlorine of phosgene or chloroformic acid esters.

After introduction of the phosgene into the phase boundary process, it may be advantageous to mix the organic phase and the aqueous phase thoroughly for a certain time, before optionally adding branching agent, if the latter has not been apportioned together with the bisphenolate, chain terminator and catalyst. Such a post-reaction time may be advantageous after each apportionment. These post-stirring times amount to 10 seconds to 60 minutes, preferably 30 seconds to 40 minutes, particularly preferably 1 to 15 minutes.

The organic phase may consist of one solvent or mixtures of a plurality of solvents. Suitable solvents are chlorinated hydrocarbons (aliphatic and/or aromatic), preferably dichloromethane, trichloroethylene, 1,1,1-trichloroethane, 1,1,2-trichloroethane and chlorobenzene and mixtures thereof. Aromatic hydrocarbons such as benzene, toluene, m/p/o-xylene or aromatic ethers such as anisole may, however, also be used alone, as a mixture with or in addition to chlorinated hydrocarbons. Another embodiment of the synthesis uses solvents which do not dissolve polycarbonate, but instead only cause it to swell. It is therefore also possible to use nonsolvents for polycarbonate in combination with solvents. Solvents such as tetrahydrofuran, 1,3/1,4-dioxane or 1,3-dioxolane soluble in the aqueous phase may here also be used as the solvents, if the solvent partner forms the second organic phase.

The at least biphasic reaction mixture, which has reacted to completion and still contains at most traces (<2 ppm) of chloroformic acid esters, is left to stand for phase separation. The aqueous alkaline phase may possibly be entirely or partially returned to the polycarbonate synthesis as the aqueous phase or alternatively sent for wastewater treatment in which the solvent and catalyst fractions are separated and recirculated. In another variant of working up, once the organic impurities, in particular solvents and polymer residues, have been separated out and optionally after a specific pH value has been established, for example by addition of sodium hydroxide, the salt is separated, which can for example be sent to chlor-alkali electrolysis, while the aqueous phase is optionally returned to the synthesis.

The organic phase containing the polycarbonate may now be purified of any contaminants of an alkaline, ionic or catalytic nature. Even after one or more settling operations, the organic phase still contains proportions of the aqueous alkaline phase in fine droplets and the catalyst, as a rule a tert-amine. The settling operations may optionally be assisted by the organic phase passing through settling tanks, stirred-tank reactors, coalescers or separators or combinations thereof, wherein water may optionally be apportioned in each or individual separation steps, under certain circumstances using active or passive mixing elements.

After this coarse separation of the alkaline, aqueous phase, the organic phase is washed once or more with dilute acids, mineral acids, carboxylic, hydroxycarboxylic and/or sulfonic acids. Aqueous mineral acids are preferred, in particular hydrochloric acid, phosphorous acid and phosphoric acid or mixtures of these acids. The concentration of these acids should be in the range from 0.001 to 50 wt. %, preferably from 0.01 to 5 wt. %.

The organic phase is furthermore repeatedly washed with deionized or distilled water. Separation of the organic phase, optionally dispersed with proportions of the aqueous phase, after the individual washing steps proceeds by means of settling tanks, stirred-tank reactors, coalescers or separators or combinations thereof, wherein the washing water may be apportioned between the washing steps optionally using active or passive mixing elements.

Between these washing steps or also after washing, acids may optionally be added, preferably dissolved in solvent on which the polymer solution is based. Gaseous hydrogen chloride and phosphoric acid or phosphorous acid, which may optionally also be used as mixtures, are preferably used here.

Aromatic dicarboxylic acids suitable for the production of polyester carbonates are for example phthalic acid, terephthalic acid, isophthalic acid, tert-butylisophthalic acid, 3,3'-diphenyldicarboxylic acid, 4,4'-diphenyldicarboxylic acid, 4,4-benzophenone dicarboxylic acid, 3,4'-benzophenone dicarboxylic acid, 4,4'-diphenyl ether dicarboxylic acid, 4,4'-diphenylsulfonic dicarboxylic acid, 2,2-bis-(4-carboxyphenyl)propane, trimethyl-3-phenylindane 4,5'-dicarboxylic acid Of the aromatic dicarboxylic acids, it is terephthalic acid and/or isophthalic acid which are particularly preferably used.

Dicarboxylic acid derivatives are dicarboxylic acid dihalides and dicarboxylic acid dialkyl esters, in particular dicarboxylic acid dichlorides and dicarboxylic acid dimethyl esters.

Replacement of the carbonate groups by the aromatic dicarboxylic acid ester groups proceeds substantially stoichiometrically and also quantitatively, such that the molar ratio of the reaction partners is also repeated in the finished polyester carbonate. Incorporation of the aromatic dicarboxylic acid ester groups may proceed both randomly and in blocks.

For the purposes of the invention, $C_1$-$C_4$ alkyl denotes for example methyl, ethyl, n-propyl, iso-propyl, n-butyl, sec-butyl, tert-butyl, $C_1$-$C_6$ alkyl furthermore denotes for example n-pentyl, 1-methylbutyl, 2-methylbutyl, 3-methylbutyl, neopentyl, 1-ethylpropyl, cyclohexyl, cyclopentyl, n-hexyl, 1,1-dimethylpropyl, 1,2-dimethylpropyl, 1,2-dimethylpropyl, 1-methylpentyl, 2-methylpentyl, 3-methylpentyl, 4-methylpentyl, 1,1-dimethylbutyl, 1,2-dimethylbutyl, 1,3-dimethylbutyl, 2,2-dimethylbutyl, 2,3-dimethylbutyl, 3,3-dimethylbutyl, 1-ethylbutyl, 2-ethylbutyl, 1,1,2-trimethylpropyl, 1,2,2-trimethylpropyl, 1-ethyl-1-methylpropyl, 1-ethyl-2-methylpropyl or 1-ethyl-2-methylpropyl, $C_1$-$C_{10}$ alkyl furthermore denotes for example n-heptyl and n-octyl, pinacyl, adamantyl, isomeric menthyls, n-nonyl, n-decyl, $C_1$-$C_{34}$ alkyl furthermore denotes for example n-dodecyl, n-tridecyl, n-tetradecyl, n-hexadecyl or n-octadecyl. The same applies to the corresponding alkyl residue for example in aralkyl or alkylaryl, alkylphenol or alkylcarbonyl residues. Alkylene residues in the corresponding hydroxyalkyl or aralkyl or alkylaryl residues denote for example the alkylene residues corresponding to the preceding alkyl residues.

Aryl denotes a carbocyclic aromatic residue with 6 to 34 skeleton carbon atoms. The same applies to the aromatic moiety of an arylalkyl residue, also known as an aralkyl residue, and to the aryl components of more complex groups, such as for example arylcarbonyl residues.

Examples of $C_6$-$C_{34}$ aryl are phenyl, o-, p-, m-tolyl, naphthyl, phenanthrenyl, anthracenyl or fluorenyl.

Arylalkyl or aralkyl in each case independently means a straight-chain, cyclic, branched or unbranched alkyl residue according to the above definition, which may be monosubstituted, polysubstituted or completely substituted by aryl residues according to the above definition.

The preceding lists should be regarded as being non-limiting examples.

For the purposes of the present invention, ppb and ppm should, unless stated otherwise, be taken to mean parts by weight.

The invention is explained in greater detail below by way of example with reference to the Figures without however being restricted thereto. With the exception of FIGS. 28 to 33, all the figures were produced with the assistance of a computer software package.

To generate and/or describe screw profiles and elements, dimensionless characteristic values are preferably used, so as to simplify transferability to different extruder sizes. An appropriate reference variable for geometric variables such as for example lengths or radii is the centerline distance a, since this variable cannot be modified in an extruder. The dimensionless centerline distance obeys A=a/a=1. The dimensionless outer screw radius of a screw profile obeys RA=ra/a. The dimensionless core radius of a screw profile is calculated as RI=ri/a. The dimensionless flight depth of a screw profile is calculated as H=h/a=RA−RI.

In the figures all the geometric variables are used in their dimensionless form. All angles are stated in radians.

Figure 25:
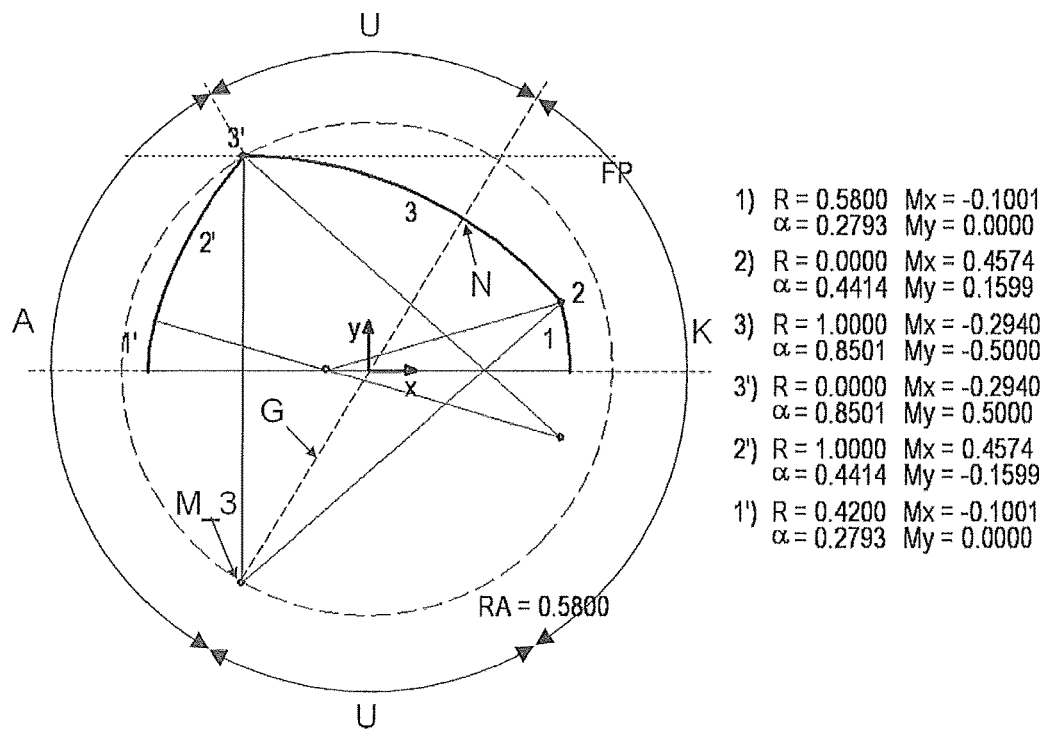

FIG. 25 shows in cross-section half of a screw profile of a screw element used according to the invention. In the middle of the figure is located the xy system of coordinates, at the origin of which is located the point of rotation of the screw profile. The circular arcs of the screw profile are distinguished by thick, continuous lines, which are provided with the respective numbers of the circular arcs. The center points of the circular arcs are illustrated by small circles. The center points of the circular arcs are connected by thin, continuous lines both with the starting point and with the end point of the associated circular arc. The straight line FP is illustrated by a thin, dotted line. The outer screw radius RA is distinguished by a thin, dashed line, the numerical value of which is indicated bottom right in the figure to four significant digits. On the right next to the figures the radius R, the angle α and the x and y coordinates of the circular arc center point Mx and My are stated for each circular arc in each case to four significant digits. These details unambiguously define the screw profile. The screw profile is mirror-symmetrical relative to the x axis, such that the entire screw profile would be obtained by mirroring the half shown at the x axis.

The zones of a screw profile which are equal to the outer screw radius are known as tip zones. In the example of FIG. 25, this is only the circular arc 3' which touches the outer screw radius. It has a radius of R_3'=0, i.e. the profile has a kink at this location. The center point of the circular arc 3' coincides with the kink. The "magnitude of the kink" is determined by the angle α_3' (α_3'=0.8501), i.e. the transition from the circular arc 3 to the circular arc 2' is brought about by rotation about the angle α_3'. Or in other words: a tangent to the circular arc 3 in the center point of the circular arc 3' intersects a tangent to the circular arc 2' likewise in the center point of the circular arc 3' at an angle of α_3'. Taking account of the circular arc 3', however, all neighbouring circular arcs 3→3', 3'→2' merge tangentially into one another.

The zones of a screw profile which are equal to the core radius are known as grooved zones. In the example of FIG. 25, this is only a point N on the circular arc 3. Point N is obtained by plotting a straight line G through the center point M_3 of the circular arc 3 and the point of rotation of the profile. This straight line G intersects the circular arc 3 at the point N.

The zones of a screw profile which are smaller than the outer screw radius and larger than the core radius are known as flank zones. In the example of FIG. 25, these are the circular arc 1, the circular arc 2, the circular arc 2', the circular arc 1' and the circular arc 3 with the exception of the point N. In this respect, the following sequence of zones may be read off for the profile portion shown starting with the circular arc 1' and ending with the circular arc 1: flank—flank—tip—flank—groove—flank—flank—flank. Due to the axial symmetry of the profile, the zones are copied by mirroring at the x axis, so giving rise to the complete profile with the sequence according to the invention:

According to the invention, the profile shown has a sequence A—U—K—U, wherein A denotes a sealing zone, U a transition zone and K a channel zone. The sealing zone has a sequence of tip zone—flank zone—tip zone. The channel zone has a sequence of grooved zone—flank zone—grooved zone. The transition zone comprises a flank zone.

The sealing zone is characterized in that the screw profile comprises a kink at the transition from the flank zone to the tip zone. The screw profile of this figure is furthermore distinguished in that the transition from the sealing zone to the transition zone comprises a kink. The smallest dimensionless distance of the flank zone of the channel zone from the dimensionless outer screw radius RA amounts to 0.1001 and is thus greater than half the dimensionless flight depth H/2=0.08.

Further screw elements used according to the invention are illustrated below. For reasons of clarity, the zones (flank zone, tip zone, grooved zone, sealing zone, channel zone, transition zone) are not stated in the Figures. The figures do however contain all the details which may be used as the basis for determining the zones. In addition, variables such as the aperture angle between the two barrel intermeshes and the tip angle may be readily calculated with reference to the details in the figures.

FIGS. 1 to 13 show in each case in cross-section half of a screw profile of a screw element used according to the invention. All these figures have the same structure, which is described in detail below. In the middle of the figures is located the xy system of coordinates, at the origin of which is located the point of rotation of the screw profile. The circular arcs of the screw profile are distinguished by thick, continuous lines, which are provided with the respective numbers of the circular arcs. The center points of the circular arcs are illustrated by small circles. The center points of the circular arcs are connected by thin, continuous lines both with the starting point and with the end point of the associated circular arc. The straight line FP is illustrated by a thin, dotted line. The outer screw radius RA is distinguished by a thin, dashed line, the numerical value of which is indicated bottom right in the figure to four significant digits. On the right next to the figures the radius R, the angle α and the x and y coordinates of the circular arc center point Mx and My are stated for each circular arc in each case to four significant digits. These details unambiguously define the screw profile. The screw profiles are in each case mirror-symmetrical relative to the x axis, such that the entire screw profiles are obtained by mirroring of the illustrated half at the x axis.

Screw profiles, in which the half of the screw profile consists of a total of 2 circular arcs, are hereinafter designated 2-circle screw profiles. Screw profiles, in which the half of the screw profile consists of a total of 4 circular arcs, are hereinafter designated 4-circle screw profiles. Screw profiles, in which the half of the screw profile consists of a total of 6 circular arcs, are hereinafter designated 6-circle screw profiles. Screw profiles, in which the half of the screw profile consists of a total of 8 circular arcs, are hereinafter designated 8-circle screw profiles.

FIG. 1: FIGS. 1a to 1d show in each case half of a preferred screw profile of a screw element used according to the invention, which is in each case made up of 8 circular arcs. In FIGS. 1a to 1d, the dimensionless outer screw radius in each case amounts to RA=0.58. In FIGS. 1a to 1d, the dimensionless flight depth in each case amounts to H=0.16. The further geometric variables, which exactly describe the screw profiles, may be obtained from the figures. A characteristic feature of the screw profiles in FIGS. 1a to 1d is that the sealing zone comprises the circular arcs 1 to 4, wherein the flank zone comprises the circular arc 1 and the tip zone the circular arcs 2 to 4, wherein the dimensionless radius of circular arcs 2 and 4 is in each case equal to 0 and the dimensionless radius of circular arc 3 is equal to the dimensionless outer screw radius RA and wherein the circular arcs of the tip zone lie completely on the dimensionless outer screw radius RA and linear sealing of the intermesh zone is thus obtained. A further characteristic feature of these screw profiles is that the transition zone comprises the circular arc 4', the dimensionless radius of which is equal to the dimensionless centerline distance A. These screw profiles are furthermore characterized in that the channel zone comprises the circular arcs 1' to 3', wherein the flank zone comprises the circular arcs 1' and 2' and the grooved zone the circular arc 3', wherein the dimensionless radius of circular arc 2' is equal to the dimensionless centerline distance A and the dimensionless radius of circular arc 3' is equal to the dimensionless core radius RI and wherein the circular arc of the grooved zone lies completely on the dimensionless core radius RI. In FIGS. 1a to 1d, the sealing zones are characterized in that the screw profiles in each case comprise a kink at the transition from the flank zone to the tip zone. In addition, the screw profiles of these figures are distinguished in that the transition from the sealing zone to the transition zone in each case comprises a kink. FIG. 1d has the smallest dimensionless distance of the flank zone of the channel zone from the dimensionless outer screw radius RA. In FIG. 1d, said distance amounts to 0.0801 and is thus greater than half the dimensionless flight depth H/2=0.08.

It is clear from FIGS. 1a to 1d that the size of the tip zone of the sealing zone may be adjusted. It is furthermore clear from these figures that the maximum distance of the flank zone of the sealing zone from the outer screw radius may be adjusted.

FIGS. 1b and 1c are furthermore characterized in that the position of the starting point of the circular arc 1 and the position of the end point of the circular arc 1' are in each case identical. Mirroring FIG. 1b or FIG. 1c at the x axis and putting together the screw profile from the screw profile of FIG. 1b and the mirrored screw profile of FIG. 1c or from the screw profile of FIG. 1e and the mirrored screw profile of FIG. 1b gives rise to screw profiles of a screw element used according to the invention in which the tip zones of the sealing zone are of different size.

FIG. 2: FIGS. 2a to 2d show in each case half of a preferred screw profile of a screw element used according to the invention, which is in each case made up of 8 circular arcs. In FIGS. 2a to 2d, the dimensionless outer screw radius varies in the range from RA=0.55 to RA=0.67. In FIGS. 2a to 2d, the dimensionless flight depth varies in the range from H=0.10 to H=0.34. The further geometric variables, which exactly describe the screw profiles, may be obtained from the figures. A characteristic feature of the screw profiles in FIGS. 2a to 2d is that the sealing zone comprises the circular arcs 1 to 4, wherein the flank zone comprises the circular arc 1 and the tip zone the circular arcs 2 to 4, wherein the dimensionless radius of circular arcs 2 and 4 is in each case equal to 0 and the dimensionless radius of circular arc 3 is equal to the dimensionless outer screw radius RA and wherein the circular arcs of the tip zone lie completely on the dimensionless outer screw radius RA and linear sealing of the intermesh zone is thus obtained. A further characteristic feature of these screw profiles is that the transition zone comprises the circular arc 4', the dimensionless radius of which is equal to the dimensionless centerline distance A. These screw profiles are furthermore characterized in that the channel zone comprises the circular arcs 1' to 3', wherein the flank zone comprises the circular arcs 1' and 2' and the grooved zone the circular arc 3', wherein the dimensionless radius of circular arc 2' is equal to the dimensionless centerline distance A and the dimensionless radius of circular arc 3' is equal to the dimensionless core radius RI and wherein the circular arc of the grooved zone lies completely on the dimensionless core radius RI. In FIGS. 2a to 2d, the sealing zones are characterized in that the screw profiles in each case comprise a kink at the transition from the flank zone to the tip zone. In addition, the screw profiles of these figures are distinguished in that the transition from the sealing zone to the transition zone in each case comprises a kink FIG. 2d has the smallest dimensionless distance of the flank zone of the channel zone from the dimensionless outer screw radius RA. In FIG. 2d, said distance amounts to 0.06 and is thus greater than half the dimensionless flight depth H/2=0.05.

FIG. 3: FIGS. 3a and 3b show in each case half of a preferred screw profile of a screw element used according to the invention, which is in each case made up of 8 circular arcs. In FIGS. 3a and 3b, the dimensionless outer screw radius in each case amounts to RA=0.58. In FIGS. 3a to 3d, the dimensionless flight depth in each case amounts to H=0.16. The further geometric variables, which exactly describe the screw profiles, may be obtained from the figures. A characteristic feature of the screw profiles in FIGS. 3a and 3b is that the sealing zone comprises the circular arcs 1 to 4, wherein the flank zone comprises circular arcs 1 and 2 and the tip zone comprises circular arcs 3 and 4, wherein the dimensionless radius of circular arc 3 is equal to the dimensionless outer screw radius RA and the dimensionless radius of circular arc 4 is equal to 0 and wherein the circular arcs of the tip zone lie completely on the dimensionless outer screw radius RA and linear sealing of the intermesh zone is thus obtained. A further characteristic feature of these screw profiles is that the transition zone comprises the circular arc 4', the dimensionless radius of which is equal to the dimensionless centerline distance A. These screw profiles are furthermore characterized in that the channel zone comprises the circular arcs 1' to 3', wherein the flank zone comprises the circular arcs 1' and 2' and the grooved zone the circular arc 3', wherein the dimensionless radius of the circular arc 3' is equal to the dimensionless core radius RI and wherein the circular arc of the grooved zone lies completely on the dimensionless core radius RI. In FIGS. 3a and 3b, the sealing zones are characterized in that the screw profiles in each case do not comprise a kink at the transition from the flank zone to the tip zone. In addition, the screw profiles of these figures are distinguished in that the transition from the sealing zone to the transition zone in each case comprises a kink. FIG. 3b has the smallest dimensionless distance of the flank zone of the channel zone from the dimensionless outer screw radius RA. In FIG. 3*b*, said distance amounts to 0.0924 and is thus greater than half the dimensionless flight depth H/2=0.08.

FIG. 4: FIGS. 4*a* and 4*b* show in each case half of a preferred screw profile of a screw element used according to the invention, which is in each case made up of 8 circular arcs. In FIGS. 4*a* and 4*b*, the dimensionless outer screw radius in each case amounts to RA=0.58. In FIGS. 4*a* to 4*d*, the dimensionless flight depth in each case amounts to H=0.16. The further geometric variables, which exactly describe the screw profiles, may be obtained from the figures. A characteristic feature of the screw profiles in FIGS. 4*a* and 4*b* is that the sealing zone comprises the circular arcs 1 to 3, wherein the flank zone comprises circular arcs 1 and 2 and the tip zone comprises circular arc 3, wherein the dimensionless radius of circular arc 3 is equal to the dimensionless outer screw radius RA and wherein the circular arc of the tip zone lies completely on the dimensionless outer screw radius RA and linear sealing of the intermesh zone is thus obtained. It is also characteristic of these screw profiles that the transition zone comprises circular arcs 4 and 4'. These screw profiles are furthermore characterized in that the channel zone comprises the circular arcs 1' to 3', wherein the flank zone comprises the circular arcs 1' and 2' and the grooved zone the circular arc 3', wherein the dimensionless radius of the circular arc 3' is equal to the dimensionless core radius RI and wherein the circular arc of the grooved zone lies completely on the dimensionless core radius RI. In FIGS. 4*a* and 4*b*, the sealing zones are characterized in that the screw profiles in each case do not comprise a kink at the transition from the flank zone to the tip zone. In addition, the screw profiles of these figures are distinguished in that the transition from the sealing zone to the transition zone in each case does not comprise a kink. The smallest dimensionless distance the flank zone of the channel zone from the dimensionless outer screw radius RA is of equal magnitude in FIGS. 4*a* and 4*b*. Said distance amounts to 0.0924 and is thus greater than half the dimensionless flight depth H/2=0.08.

In addition to the screw profiles shown in FIGS. 3*a*, 3*b*, 4*a* and 4*b*, it is possible, as is known to a person skilled in the art, to form screw profiles in which the radius of circular arc 2 is equal to 0 and the radius of circular arc 4 is greater than 0. In this way screw profiles are obtained which are characterized in that the sealing zone of a screw profile at the transition from flank zone to tip zone comprises a kink and the transition from the sealing zone to the transition zone of a screw profile does not comprise a kink.

FIGS. 1 to 4 show screw profiles of screw elements with linear sealing of the intermesh zone. As is apparent from the figures, the length of the linear seal may be adjusted by selection of the parameters of the circular arcs. It is additionally possible to configure the transition between tip and flank zone or between the sealing and the transition zone with or without a kink in the screw profile.

The following figures show screw profiles of screw elements with punctiform sealing of the intermesh zone. It is possible here too to configure the transition between tip and flank zone or between the sealing and the transition zone with or without a kink in the screw profile.

FIG. 5: FIG. 5 shows half of a preferred screw profile of a screw element used according to the invention which is made up of 6 circular arcs. In FIG. 5, the dimensionless outer screw radius amounts to RA=0.58. In FIG. 5 the dimensionless flight depth amounts to H=0.16. The further geometric variables, which exactly describe the screw profile, may be inferred from the figure. The screw profile is identical to that shown in FIG. 25. The radius of the circular arc 3' is equal to 0. The circular arc 3' lies on the outer screw radius RA and forms the tip zone of the sealing zone. The intermesh zone is provided with a punctiform seal, wherein the screw profile comprises a kink at the sealing point. The channel zone is characterized in that the radius of the circular arc 2 is equal to 0. The screw profile therefore comprises a kink at this location. In FIG. 5 the minimum dimensionless distance of the flank zone of the channel zone from the outer screw radius RA is, at 0.1001, greater than half the dimensionless flight depth H/2=0.08.

FIG. 6: FIGS. 6*a* to 6*b* show in each case half of a preferred screw profile of a screw element used according to the invention, which is in each case made up of 6 circular arcs. The dimensionless outer screw radius amounts to RA=0.58. In FIGS. 6*a* and 6*b*, the dimensionless flight depth in each case amounts to H=0.16. The further geometric variables, which exactly describe the screw profiles, may be obtained from the figures. The radius of the circular arc 3' is equal to 0.25 in both figures. A characteristic feature of the screw profiles in FIGS. 6*a* and 6*b* is that the circular arc 3' is tangent to the screw radius RA at one point. The tangent point forms the tip zone of the sealing zone. The intermesh zone is provided with a punctiform seal, wherein the screw profile does not comprise a kink at the sealing point. The tangent point divides the circular arc 3' into two parts. One part belongs with the circular arcs 1' and 2' to the sealing zone. The other part belongs with part of the circular arc 3 to the transition zone. The channel zone is characterized in that the radius of the circular arc 2 is equal to 0. The screw profile therefore comprises a kink at this location. In FIGS. 6*a* and 6*b* the minimum dimensionless distance of the flank zone of the channel zone from the outer screw radius RA is, at 0.1448 or 0.1166 respectively, greater than half the dimensionless flight depth H/2=0.08.

FIG. 7: FIG. 7 shows half of a preferred screw profile of a screw element used according to the invention which is made up of 6 circular arcs. The dimensionless outer screw radius amounts to RA=0.58. In FIG. 7 the dimensionless flight depth amounts to H=0.16. The further geometric variables, which exactly describe the screw profile, may be inferred from the figure. The intermesh zone is sealed as in FIG. 5 by way of the circular arc 3'. In comparison to FIG. 5 the channel zone in FIG. 7 is characterized in that the radius of the circular arc 2 is greater than 0. The screw profile therefore does not comprise a kink at this location. In FIG. 7 the minimum dimensionless distance of the flank zone of the channel zone from the outer screw radius RA is, at 0.1194, greater than half the dimensionless flight depth H/2=0.08.

Figure 8B:
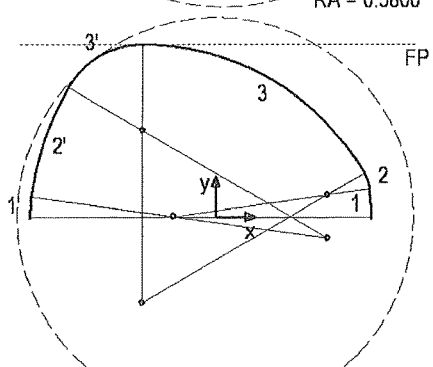

FIG. 8: FIGS. 8*a* to 8*b* show in each case half of a preferred screw profile of a screw element used according to the invention, which is in each case made up of 6 circular arcs. The dimensionless outer screw radius amounts to RA=0.58. In FIGS. 8*a* and 8*b*, the dimensionless flight depth in each case amounts to H=0.16. The further geometric variables, which exactly describe the screw profiles, may be obtained from the figures. The intermesh zone is sealed as in FIG. 6 by way of the circular arc 3', which is tangent to the outer screw radius RA at one point. In comparison to FIG. 6 the channel zone in FIG. 8 is characterized in that the radius of the circular arc 2 is greater than 0. The screw profile therefore does not comprise a kink at this location. In FIGS. 8*a* and 8*b* the minimum dimensionless distance of the flank zone of the channel zone from the outer screw radius RA is, at 0.1531 or 0.1252 respectively, greater than half the dimensionless flight depth H/2=0.08.

Figure 9:
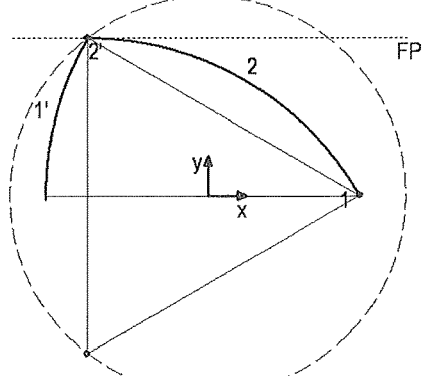

FIG. 9: FIG. 9 shows half of a preferred screw profile of a screw element used according to the invention which is made up of 4 circular arcs. The dimensionless outer screw radius amounts to RA=0.63. In FIG. 9 the dimensionless flight depth amounts to H=0.26. The further geometric variables, which exactly describe the screw profile, may be inferred from the figure. The radius of the circular arc 2' is equal to 0. The circular arc 2' lies on the outer screw radius RA and forms the tip zone of the sealing zone. The intermesh zone is provided with a punctiform seal, wherein the screw profile comprises a kink at the sealing point. The channel zone is characterized in that the radius of the circular arc 1 is equal to 0. The screw profile therefore comprises a kink at this location. In FIG. 9 the minimum dimensionless distance of the flank zone of the channel zone from the outer screw radius RA is, at 0.1473, greater than half the dimensionless flight depth Hi/2=0.13.

Figure 10A:
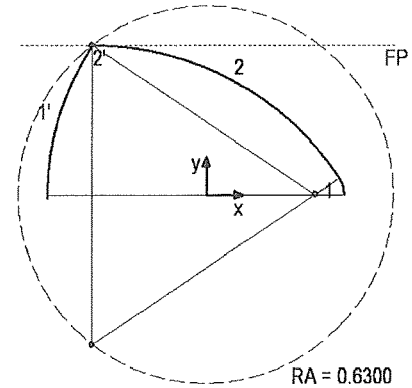
Figure 10B:
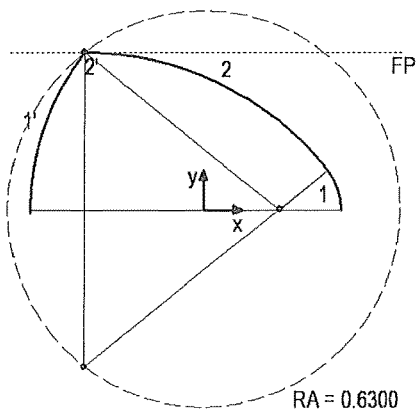

FIG. 10: FIGS. 10a to 10b show in each case half of a preferred screw profile of a screw element according to the invention, which is in each case made up of 4 circular arcs. The dimensionless outer screw radius amounts to RA=0.63. In FIGS. 10a and 10b, the dimensionless flight depth in each case amounts to H=0.26. The further geometric variables, which exactly describe the screw profiles, may be obtained from the figures. The intermesh zone is sealed as in FIG. 9 by way of the circular arc 2'. In comparison to FIG. 9 the channel zone in FIG. 10 is characterized in that the radius of the circular arc 1 is greater than 0. The screw profile therefore does not comprise a kink at this location. In FIGS. 10a and 10b the minimum dimensionless distance of the flank zone of the channel zone from the outer screw radius RA is, at 0.1650 or 0.1888 respectively, greater than half the dimensionless flight depth H/2=0.13.

Figure 11A:
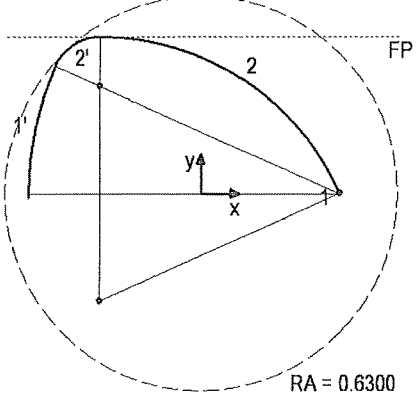
Figure 11B:
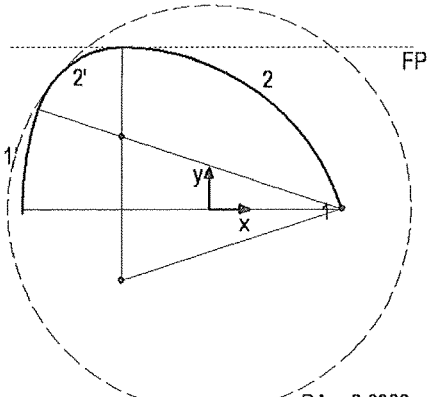

FIG. 11: FIGS. 11a to 11b show in each case half of a preferred screw profile of a screw element used according to the invention, which is in each case made up of 4 circular arcs. The dimensionless outer screw radius amounts to RA=0.63. In FIGS. 11a and 11b, the dimensionless flight depth in each case amounts to H=0.26. The further geometric variables, which exactly describe the screw profiles, may be obtained from the figures. The radius of the circular arc 2' is equal to 0.1572 or 0.2764 in FIGS. 11a and 11b. A characteristic feature of the screw profiles in FIGS. 11a and 11b is that the circular arc 2' is tangent to the screw radius RA at one point. The tangent point forms the tip zone of the sealing zone. The intermesh zone is provided with a punctiform seal, wherein the screw profile does not comprise a kink at the sealing point. The tangent point divides the circular arc 2' into two parts. One part belongs with the circular arcs 1' to the sealing zone. The other part belongs with part of the circular arc 2 to the transition zone. The channel zone is characterized in that the radius of the circular arc 1 is equal to 0. The screw profile therefore comprises a kink at this location. In FIGS. 11a and 11b the minimum dimensionless distance of the flank zone of the channel zone from the outer screw radius RA is, at 0.1857 or 0.2158 respectively, greater than half the dimensionless flight depth H/2=0.13.

Figure 12A:
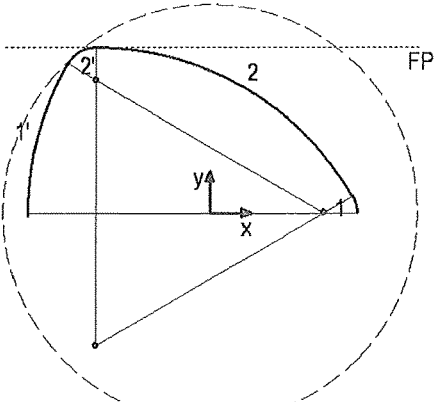
Figure 12B:
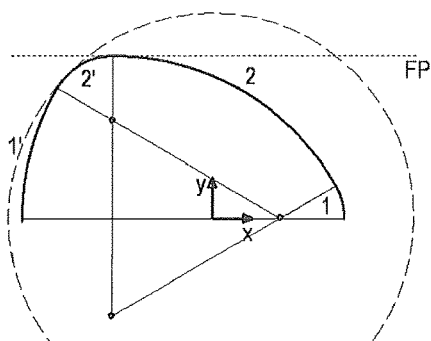

FIG. 12: FIGS. 12a to 12b show in each case half of a preferred screw profile of a screw element used according to the invention, which is in each case made up of 4 circular arcs. The dimensionless outer screw radius amounts to RA=0.63. In FIGS. 12a and 12b, the dimensionless flight depth in each case amounts to H=0.26. The further geometric variables, which exactly describe the screw profiles, may be obtained from the figures. The intermesh zone is sealed as in FIG. 11 by way of the circular arc 2', which is tangent to the outer screw radius RA at one point. In comparison to FIG. 11 the channel zone in FIG. 12 is characterized in that the radius of the circular arc 1 is greater than 0. The screw profile therefore does not comprise a kink at this location. In FIGS. 12a and 12b the minimum dimensionless distance of the flank zone of the channel zone from the outer screw radius RA is, at 0.1849 or 0.2184 respectively, greater than half the dimensionless flight depth H/2=0.13. The tangent point of the circular arc 2' with the outer screw radius RA is obtained by calculating the point of intersection of a straight line, which passes through the coordinate origin and the center point of the circular arc 2', with said circular arc 2'. The tangent point of the circular arc 2 with the screw core radius RI is obtained by calculating the point of intersection of a straight line, which passes through the coordinate origin and the center point of the circular arc 2, with said circular arc 2.

FIGS. 1 to 4 show linear sealing of the intermesh zone. FIGS. 5 to 12 show punctiform sealing of the intermesh zone, wherein the screw profile has a kink in FIGS. 5, 7, 9 and 10 and does not have a kink in FIGS. 6, 8, 11 and 12. As a person skilled in the art will recognize, it is thus possible, with the screw profiles used according to the invention, to adapt the thermal and mechanical stresses to which the viscous fluids to be processed are subjected purposefully to working and processing requirements.

FIGS. 1 to 12 show halves of screw profiles of a screw element used according to the invention consisting of at most 8 circular arcs. However, the invention is in no way limited to 8 circular arcs. Instead, as many circular arcs as desired may be used to generate screw profiles used according to the invention.

Figure 13A:
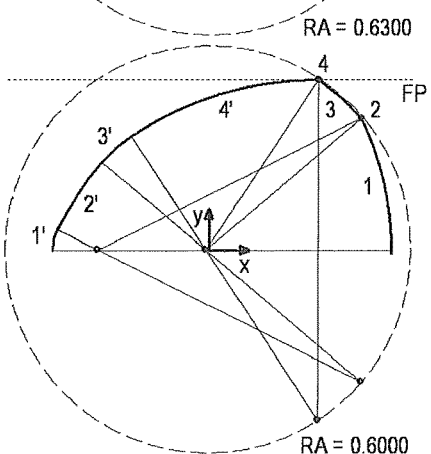
Figure 13B:
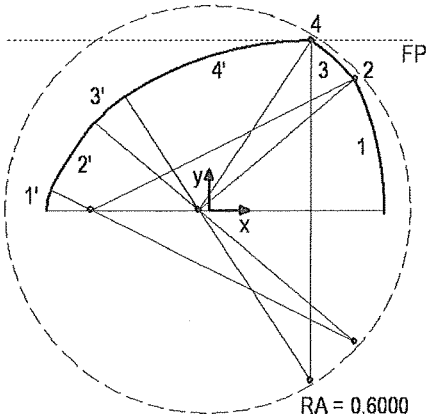
Figure 14A:
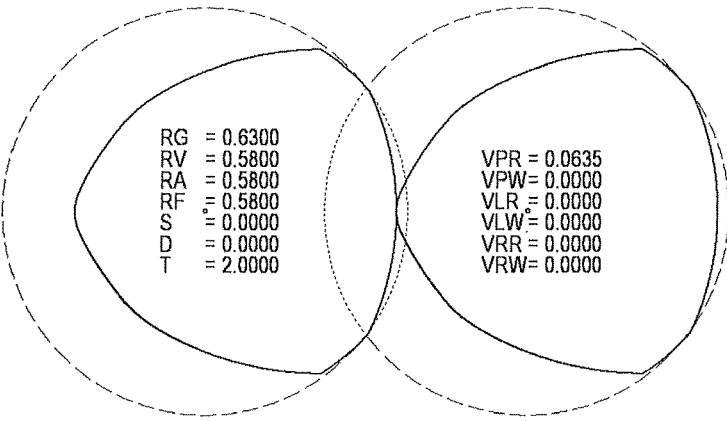
Figure 14B:
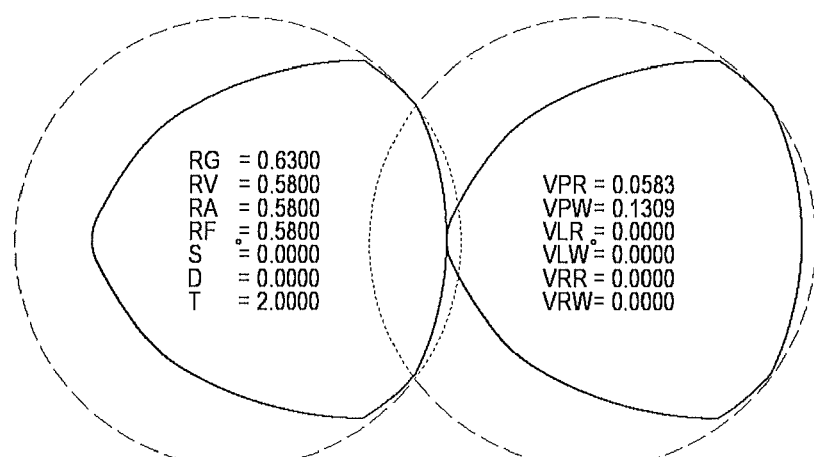
Figure 14C:
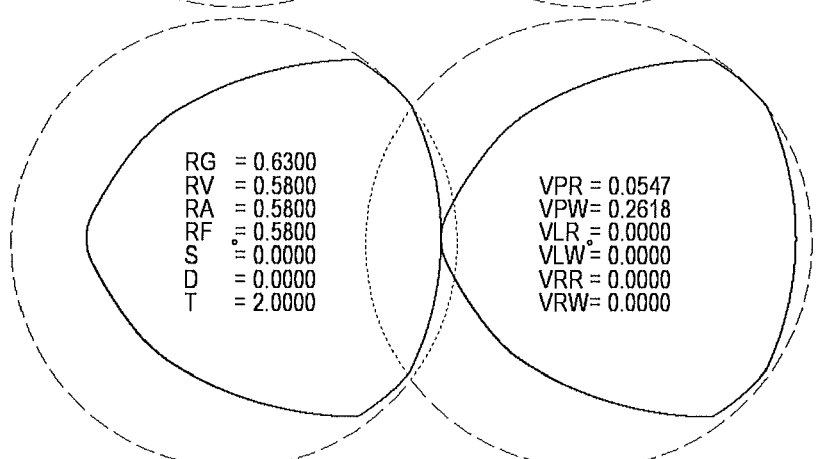
Figure 14D:
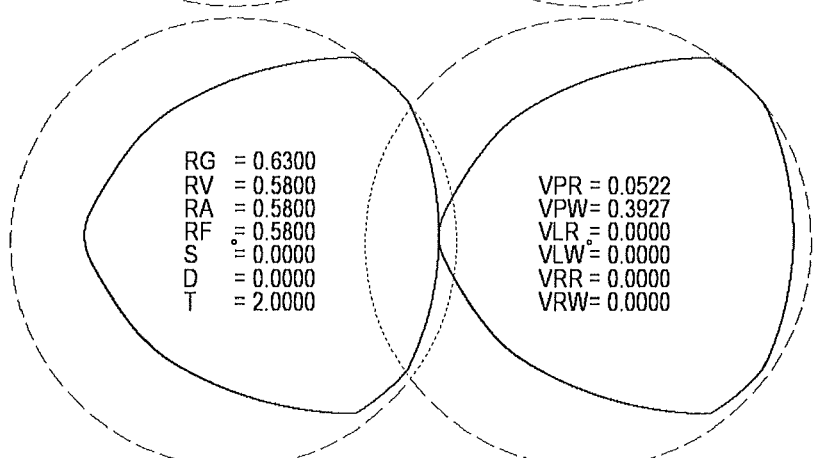
Figure 15A:
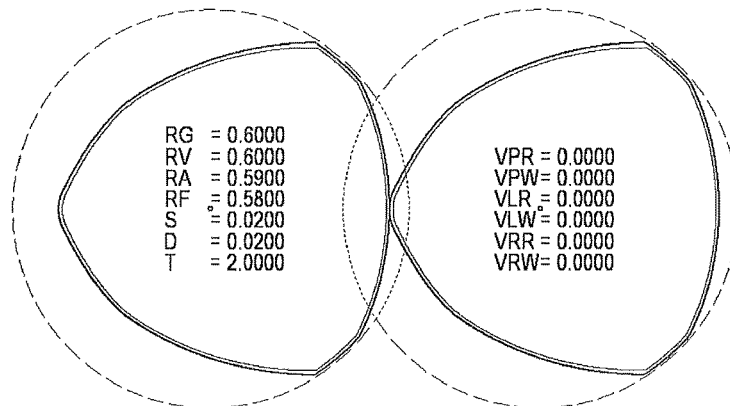
Figure 15B:
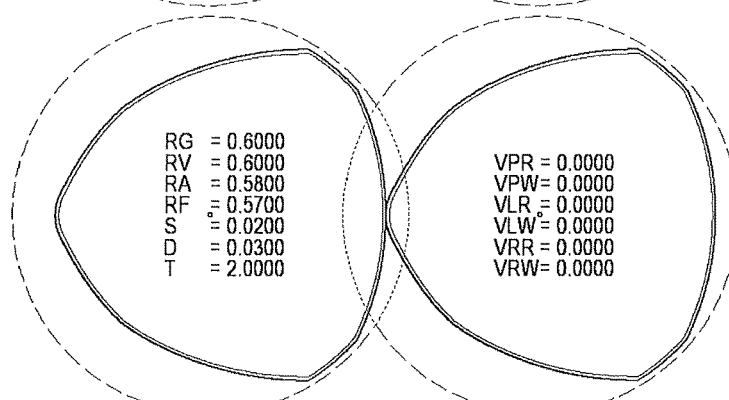
Figure 15C:
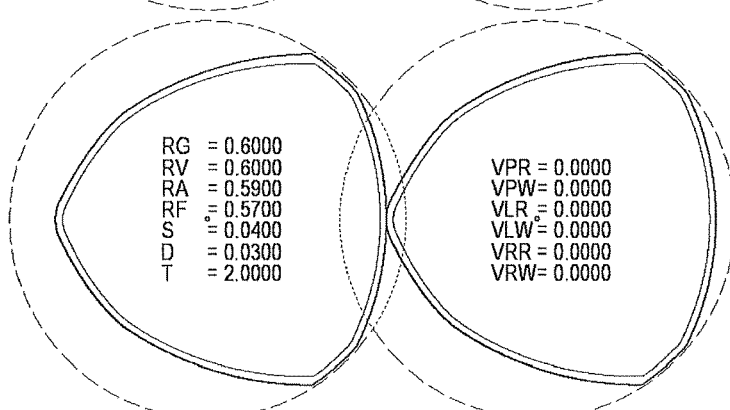
Figure 15D:
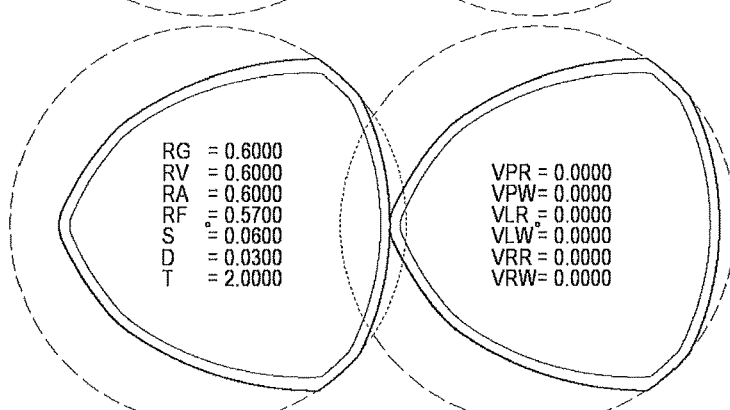
Figure 16A:
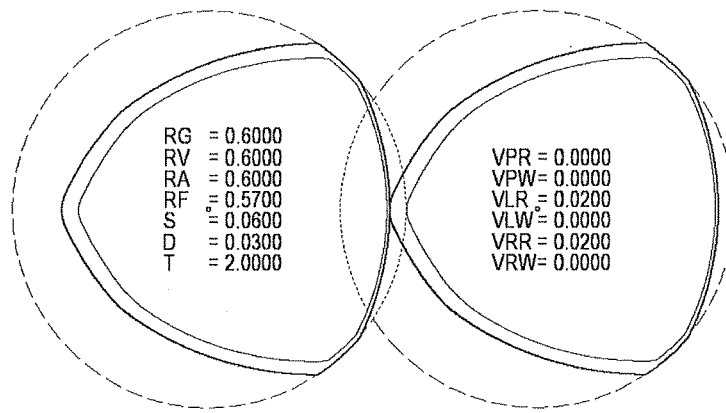
Figure 16B:
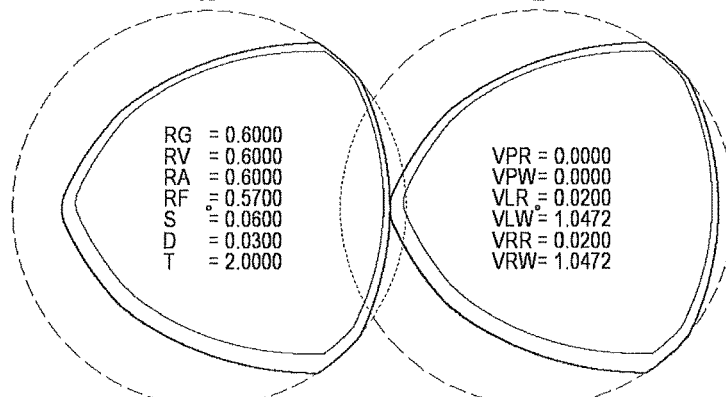
Figure 16C:
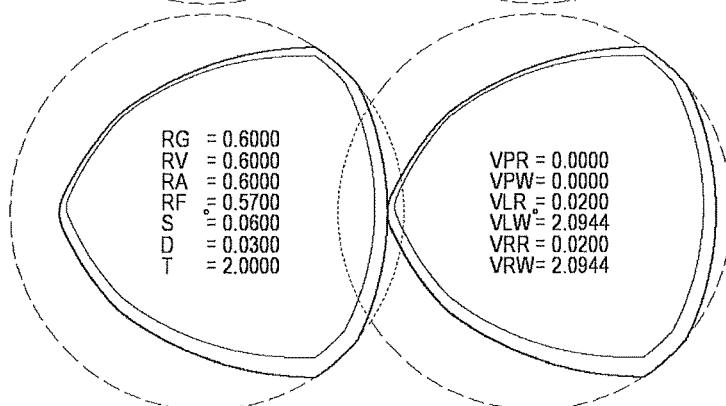
Figure 16D:
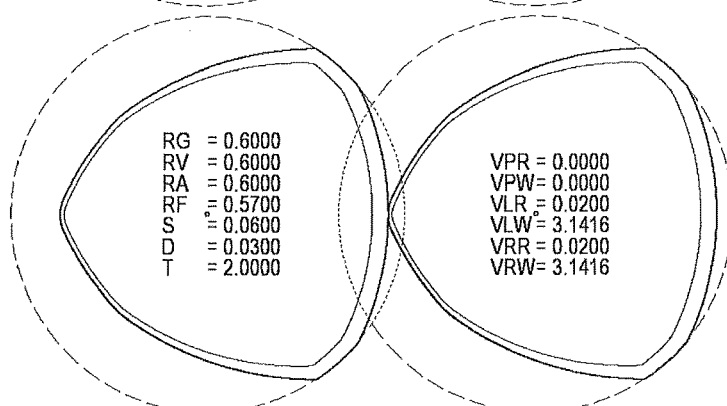

FIG. 13: All the single-flighted screw profiles may be displaced along the x axis to a certain extent in the positive or negative x direction without losing their self-cleaning effect, since, as a result of the displacement along the x axis, the condition of contacting the straight line FP at one point still remains fulfilled. FIG. 13 shows such displacements. FIGS. 13a to 13b show in each case half of a preferred screw profile of a screw element used according to the invention, which is in each case made up of 8 circular arcs. The dimensionless outer screw radius of the undisplaced screw profile amounts to RA=0.6. In FIGS. 13a and 13b, the dimensionless flight depth of the undisplaced screw profile in each case amounts to H=0.2. The further geometric variables, which exactly describe the screw profiles, may be obtained from the figures. In FIGS. 13a and 13b the entire screw profile is displaced leftwards by an amount of 0.01 or 0.03 times the centerline distance. It will be noted that the radii and angles of the individual circular arcs are not altered by the displacement. The degree of linear sealing of the intermesh zone by the circular arc 3 is thereby adjustable. In general, the degree of linear or punctiform sealing of the intermesh zone is adjustable by displacement of the screw profile of a screw element used according to the invention. In particular, the mechanical and thermal stress to which the viscous fluids are subjected in the area of the seal may be purposefully adjusted. A screw profile of a screw element used according to the invention is preferably displaced by an amount of 0 to 0.05 times the centerline distance, particularly preferably by an amount of 0 to 0.025 times the centerline distance.

A screw profile displaced in the x direction may in a second step be displaced in a positive or negative y direction, without consequently losing the self-cleaning of the screw profiles. In this way asymmetric sealing of the intermesh zone is achieved. For example the degree of sealing of the intermesh zone may be dependent in the tip zones on the direction of rotation of the screw elements. The maximum distance of the tip zones of the sealing zone of the screw profiles from the barrel is preferably in the range of 0 to 0.05 times the centerline distance, particularly preferably in the range of 0 to 0.025 times the centerline distance.

FIGS. 14 to 16 show the generating and generated screw profile inside a figure-of-eight-shaped screw barrel. Inside the two screw profiles numerical values are given for the following screw variables:

RG: radius of the two barrel bores
RV: virtual barrel radius, which is less than or equal to the barrel radius RG
RA: outer screw radius of the closely intermeshing, self-cleaning screw profiles
RF: outer screw radius of the screw profiles to be manufactured
S: clearance between the two screw profiles to be manufactured
D: clearance between the screw profiles to be manufactured and the barrel
T: pitch of a conveying, mixing or transition element
VPR: magnitude of the displacement of the smooth, closely intermeshing, self-cleaning screw profiles, if they are arranged eccentrically
VPW: angle of displacement (indication of direction) of the smooth, closely intermeshing, self-cleaning screw profiles, if they are arranged eccentrically
VLR: magnitude of the displacement of the screw profile to be manufactured of the left-hand screw within the clearances
VLW: angle of displacement of the screw profile to be manufactured of the left-hand screw within the clearances
VRR: magnitude of the displacement of the screw profile to be manufactured of the right-hand screw within the clearances
VRW: angle of displacement of the screw profile to be manufactured of the right-hand screw within the clearances The screw barrel, which is obtained from two mutually interpenetrating bores with in each case the radius RG and the distance A=1, is illustrated by a thin, dashed line. Where the two barrel bores interpenetrate, the two bores are distinguished by thin, dotted lines. The center points of the two barrel bores are identical to the two points of rotation of the screw profiles and are distinguished in each case by a small circle. The closely intermeshing, self-cleaning screw profiles are distinguished by a thick, continuous line. The screw profiles in manufacture are illustrated by a thin, continuous line.

It is known to a person skilled in the art that the following relationship applies between the outer screw radius RA of the closely intermeshing, self-cleaning screw profile, the virtual barrel radius RV, the clearance S between the two screw profiles to be manufactured and the clearance D between the screw profiles to be manufactured and the screw barrel: RA=RV−D+S/2.

It is further known to a person skilled in the art that the following relationship applies between the outer screw radius RF of the screw profile to be manufactured, the virtual barrel radius RV and the clearance D between the screw profiles to be manufactured and the screw barrel: RF=RV−D.

Typically the virtual barrel radius RV is equal to the stated barrel radius RG. If the virtual barrel radius RV is selected to be smaller than the barrel radius RG, an additional clearance arises between the screw profiles and the barrel. This clearance may be used to displace the generating and the generated screw profile eccentrically while maintaining self-cleaning. The eccentricity is unambiguously characterized by the magnitude of the displacement VPR and the direction of displacement in the form of an angle VPW.

FIG. 14: FIGS. 14a to 14d show preferred embodiments of eccentric positioning of the screw profiles of screw elements according to the invention. The geometric parameters may be taken from the individual figures. Eccentrically positioned, single-flighted, closely intermeshing, self-cleaning screw profiles are distinguished in that the distance from the screw profiles to the barrel is identical for the left- and right-hand screws irrespective of the direction of displacement. The screw profiles in FIG. 14a are displaced so far along the connecting line of the two points of rotation of the screw profiles that in each case one point of the tip zones of the sealing zone of the screw profiles touches the barrel, such that sealing of the intermesh zone is achieved. The screw profiles in FIGS. 14b to 14d are in each case displaced so far that only one point of a tip zone of the sealing zone of the screw profiles touches the barrel. The magnitude of the displacement needed for this purpose depends on the direction of displacement. Eccentric positions may additionally be selected for the screw profiles in which no point of the tip zones of the sealing zone of the screw profiles touches the barrel. In general, the degree of linear or punctiform sealing of the intermesh zone is adjustable by eccentric positioning of the screw profile of a screw element used according to the invention. In particular, the mechanical and thermal stress to which the viscous fluids are subjected in the area of the seal may be purposefully adjusted. For example the degree of sealing of the intermesh zone may be dependent in the tip zones on the direction of rotation of the screw elements. The maximum distance of the tip zones of the sealing zone of the screw profiles from the barrel is preferably in the range of 0 to 0.05 times the centerline distance, particularly preferably in the range of 0 to 0.025 times the centerline distance.

FIG. 15: As is known to a person skilled in the art, in practice all screw elements need a degree of clearance, both relative to one another and relative to the barrel. FIGS. 15a to 15d show different clearance strategies. The geometric parameters may be taken from the individual figures. FIG. 15a shows a clearance strategy in which the clearance between the screw profiles to be manufactured and between the screw profiles to be manufactured and the barrel is of equal size. FIG. 15b shows a clearance strategy in which the clearance between the screw profiles to be manufactured is smaller than the clearance between the screw profiles to be manufactured and the barrel. FIG. 15c shows a clearance strategy in which the clearance between the screw profiles to be manufactured is larger than the clearance between the screw profiles to be manufactured and the barrel. FIG. 15d shows a further embodiment according to FIG. 15c with particularly large clearances. For the clearance between the screw profiles to be manufactured, typical clearances occurring in practice lie in the range from 0.002 to 0.1. For the clearance between the screw profiles to be manufactured and the barrel, typical clearances occurring in practice lie in the range from 0.002 to 0.1. Typical clearances occurring in practice are constant over the circumference of the screw profile. It is however admissible to vary both the clearance between the screw profiles to be manufactured and the clearance between the screw profiles to be manufactured and the barrel over the circumference of the screw profiles.

FIG. 16: It is additionally possible to displace the screw profiles to be manufactured within the clearances. FIGS. 16a to 16d show a selection of possible displacements. The geometric parameters may be taken from the individual figures. In FIGS. 16a to 16d the magnitude of the displacement for in each case both screw profiles to be manufactured amounts to VLR=VRR=0.02. In FIGS. 16a to 16d the direction of displacement for in each case both screw profiles to be manufactured varies stepwise between VLW=VRW=0 and VLW=VRW=π. It is admissible to displace the two screw profiles to be manufactured mutually independently in different directions and by different amounts. This provides a person skilled in the art with the further option of adjusting the degree of sealing of the intermediate zone by the two tip zones of the sealing zone of a screw profile used according to the invention. In particular, the mechanical and thermal stress to which the viscous fluids are subjected in the area of the seal may be purposefully adjusted.

Figure 17A:
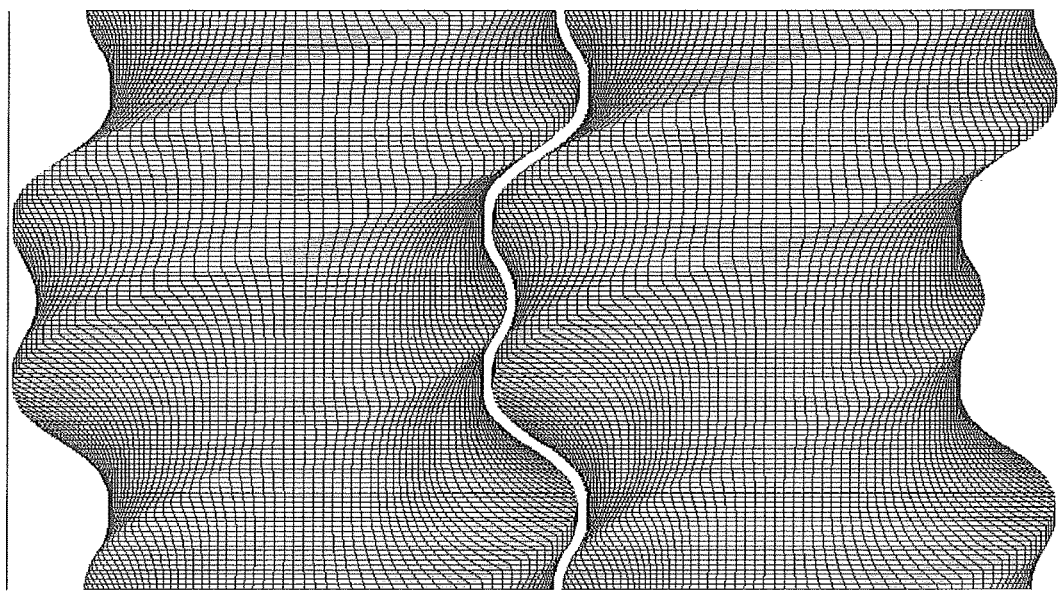

FIG. 17a shows by way of example a pair of single-flighted conveying elements used according to the invention, whose screw profile, like in FIGS. 1 and 2, is made up of 8 circular arcs. The barrel radius amounts to RG=0.6. The clearance between the two conveying elements amounts to S=0.02. The clearance between the two conveying elements and the barrel amounts to D=0.01. The pitch of the conveying elements amounts to T=1.2. The length of the conveying elements amounts to 1.2, which corresponds to rotation of the screw profiles by an angle of 2π. The barrel is illustrated by thin, continuous lines to the left and right of the two conveying elements. A possible computational grid is further illustrated on the surfaces of the two conveying elements, which grid may be used for calculating flow in twin- and multi-screw extruders.

Figure 17B:
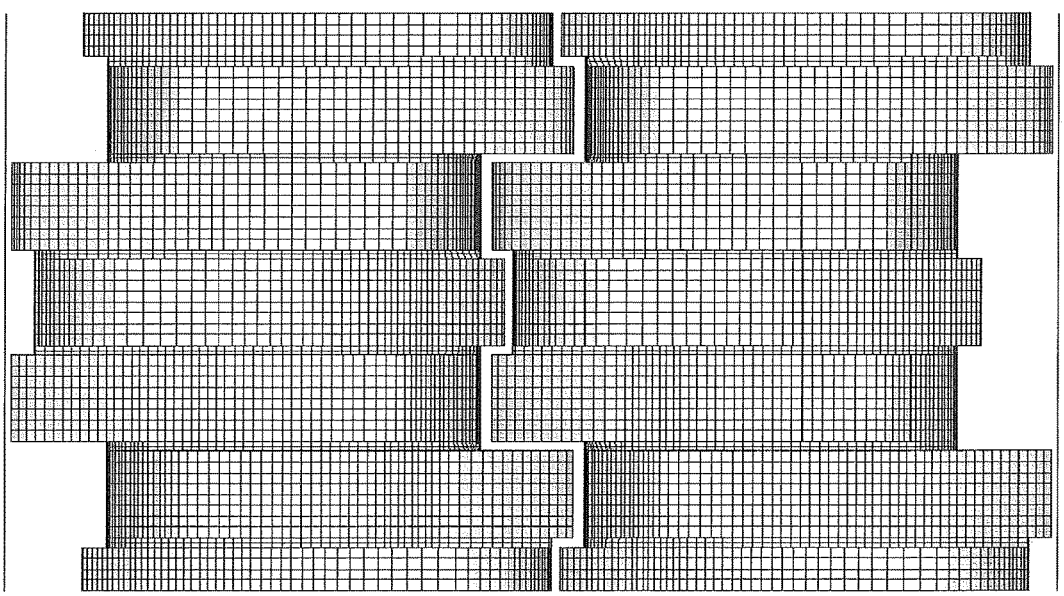
Figure 18A:
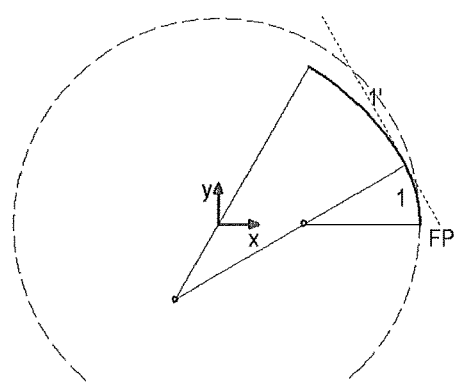
Figure 18B:
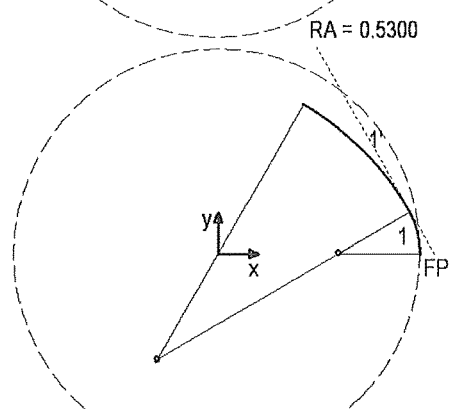
Figure 18C:
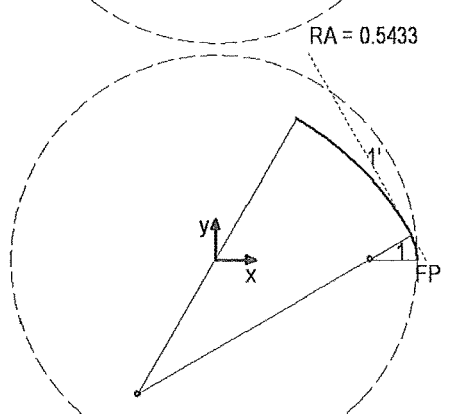
Figure 18D:
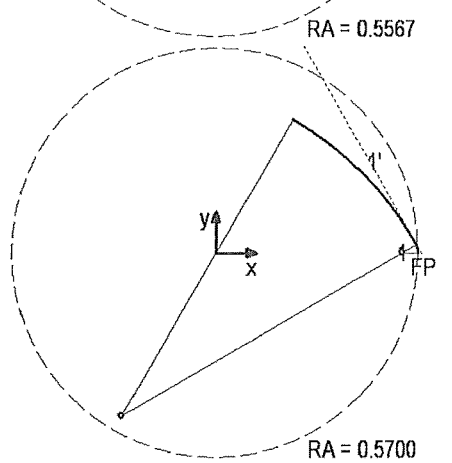

FIG. 17b shows by way of example a pair of single-flighted kneading elements used according to the invention, whose screw profile, like in FIGS. 1 and 2, is made up of 8 circular arcs. The barrel radius amounts to RG=0.6. The clearance between the kneading disks of the two kneading elements amounts to S=0.02. The clearance between the kneading disks of the two kneading elements and the barrel amounts to D=0.01. The kneading element consists of 7 kneading disks, which are in each case offset right-handedly by an angle of π/3 relative to one another. The first and last kneading disks have a length of 0.09. The middle kneading disks have a length of 0.18. The groove between the kneading disks has a length of 0.02. The barrel is shown by thin, continuous lines to the left and right of the two kneading elements. A possible computational grid is further illustrated on the surfaces of the two kneading elements, which grid may be used for calculating flow in twin- and multi-screw extruders.

FIGS. 1 to 17 show screw profiles and screw elements, in which the dimensionless outer screw radius RA has the values 0.55, 0.58, 0.59, 0.6, 0.63 and 0.67. The screw profiles of screw elements according to the invention are not limited to these discrete values of the dimensionless outer screw radius. In the process according to the invention single-flighted screw profiles according to the invention may be used which have a dimensionless outer screw radius in the range from RA=0.51 and RA=0.707, preferably in the range from RA=0.52 to RA=0.7.

Surprisingly, triple-flighted screw profiles, which are positioned eccentrically substantially in the direction of a grooved zone of a triple-flighted screw profile, also lead to a sequence of sealing zone—transition zone—channel zone—transition zone and thus to screw elements used according to the invention.

FIGS. 18 to 20 describe centrally positioned screw profiles with the number of flights being 3. In FIGS. 18 to 20 one sixth of a screw profile with 3 flights is always shown.

FIG. 18: FIGS. 18a to 18d show preferred 2-circle screw profiles of a triple-flighted screw profile. FIGS. 18a to 18d differ in the outer screw radius RA. In FIGS. 18a to 18d the radius R_1 of the 1st circular arc is dependent on the outer screw radius RA. In FIGS. 18a to 18d the 1st circular arc has in each case the angle $\alpha\_1=\pi/6$.

FIG. 19: FIGS. 19a to 19d show preferred 4-circle screw profiles of a triple-flighted screw profile. FIGS. 19a to 19d differ in the outer screw radius RA. In FIGS. 19a to 19d the 1st circular arc has in each case the radius R_1=RA. In FIGS. 19a to 19d the 2nd circular arc has in each case the radius R_2=0. In FIGS. 19a to 19d the angle $\alpha\_1$ of the 1st circular arc is dependent on the outer screw radius RA. In FIGS. 19a to 19d the radius $\alpha\_2$ of the 2nd circular arc is dependent on the outer screw radius RA.

Figures 20A, 20B, 20C, 20D:
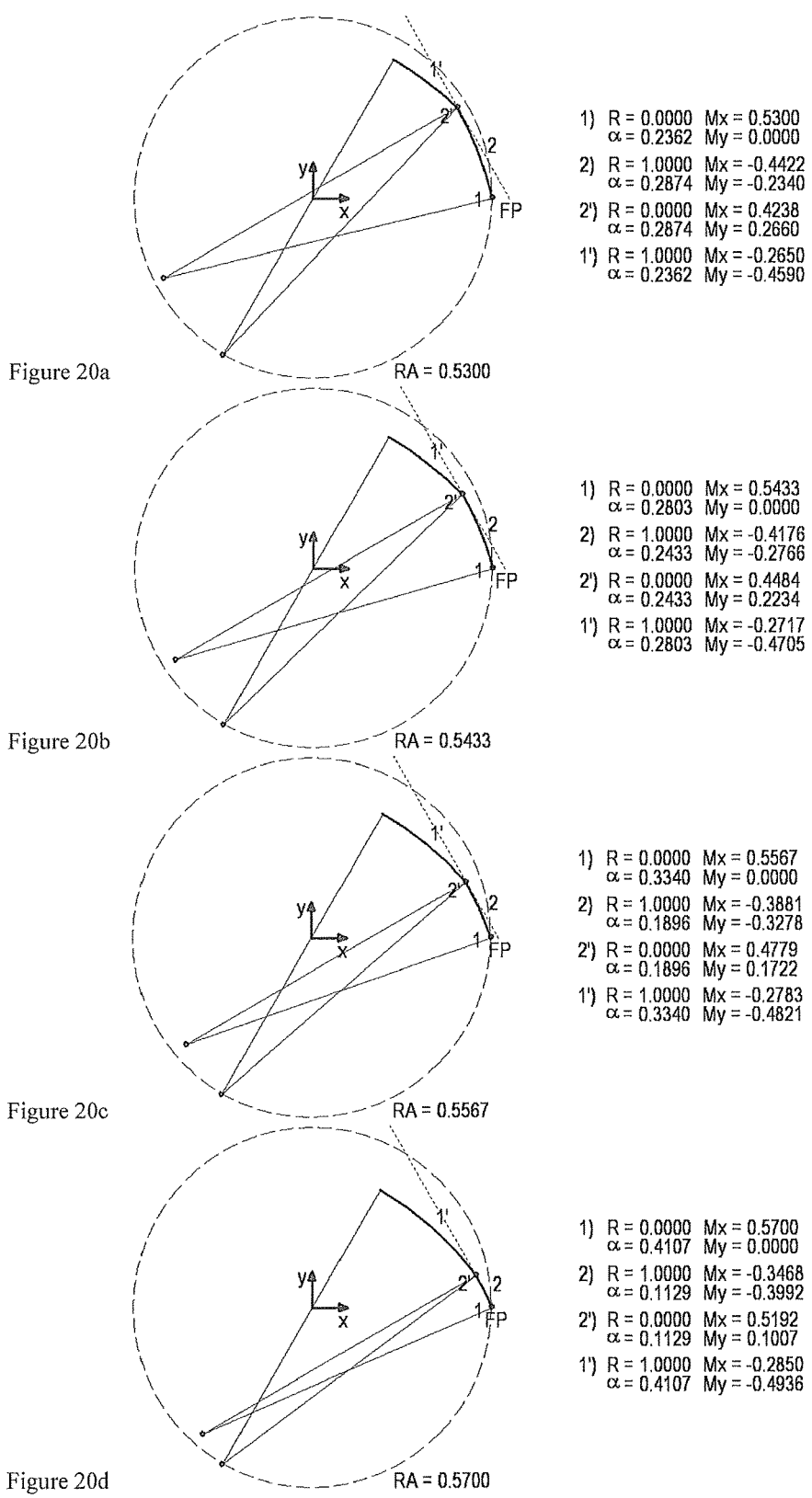

FIG. 20: FIGS. 20a to 20d show further preferred 4-circle-screw profiles of a triple-flighted screw profile. FIGS. 20a to 20d differ in the outer screw radius RA. In FIGS. 20a to 20d the 1st circular arc has in each case the radius R_1=0. In FIGS. 20a to 20d the 2nd circular arc has in each case the radius R_2=A=1. In FIGS. 20a to 20d the angle $\alpha\_1$ of the 1st circular arc is dependent on the outer screw radius RA. In FIGS. 20a to 20d the radius $\alpha\_2$ of the 2nd circular arc is dependent on the outer screw radius RA.

FIGS. 18 to 20 show sixths of triple-flighted screw profiles consisting of at most 4 circular arcs. However, triple-flighted screw profiles are in no way limited to 4 circular arcs. Instead, as many circular arcs as desired may be used to generate triple-flighted screw profiles.

Figure 21A:
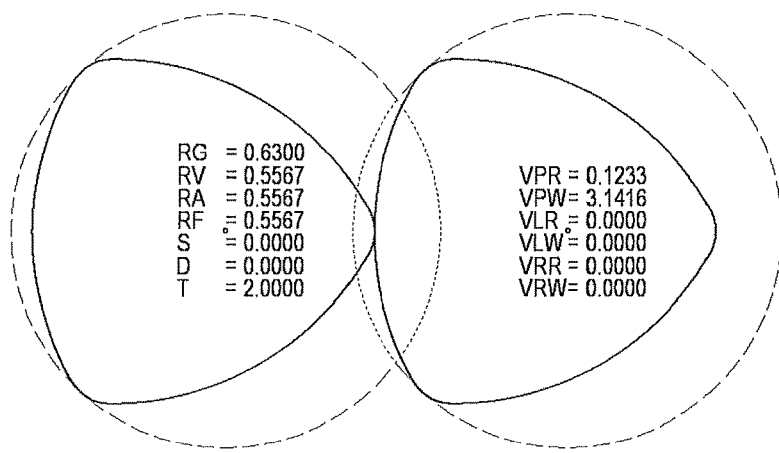
Figure 21B:
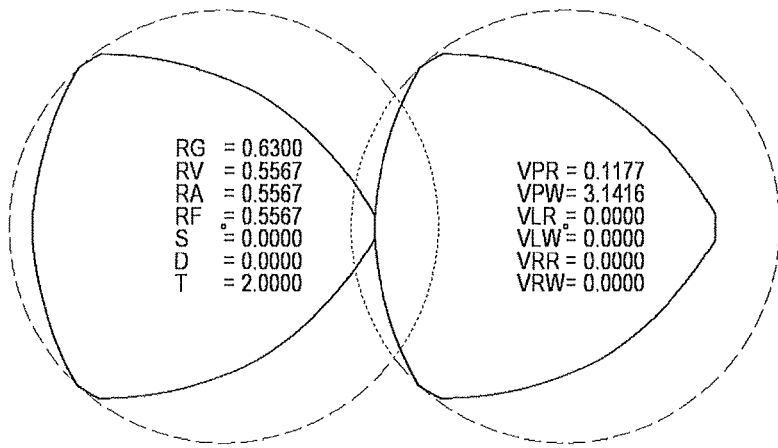
Figure 21C:
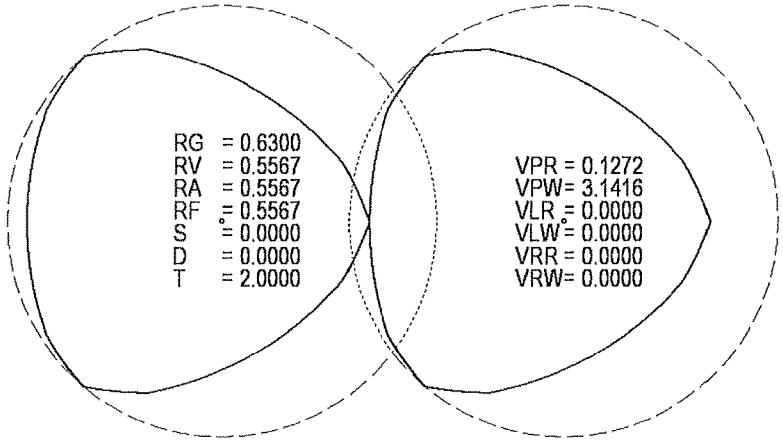

FIG. 21: FIGS. 21a to 21c show preferred embodiments of eccentric positioning of triple-flighted screw profiles. FIG. 21a shows eccentric positioning of a triple-flighted screw profile according to FIG. 18c. FIG. 21b shows eccentric positioning of a triple-flighted screw profile according to FIG. 19c. FIG. 21c shows eccentric positioning of a triple-flighted screw profile according to FIG. 20c. The virtual barrel radius amounts to RV=0.5567 and is less than the barrel radius RG (RG=0.63). The further geometric parameters may be taken from the individual figures. Eccentrically positioned, triple-flighted, closely intermeshing, self-cleaning screw profiles are distinguished in that the minimum distance from the screw profiles to the barrel is identical for the left- and right-hand screws irrespective of the direction of displacement. The triple-flighted screw profiles in FIGS. 21a to 21c are positioned in each case so eccentrically that in each case one point of the tip zones of the sealing zone of the screw profiles touches the barrel, such that sealing of the intermesh zone is achieved. The eccentrically positioned triple-flighted screw profile leads to a screw profile used according to the invention with a sequence of sealing zone—transition zone—channel zone—transition zone. Sealing thus proceeds by way of two of the three tips of a triple-flighted screw element.

The triple-flighted screw profiles are displaced out of the central position towards one of their grooved zones. In FIGS. 21a to 21c displacement took place along the connecting line of the two points of rotation of the screw profiles. The magnitude of the displacement with which sealing of the intermesh zone is achieved depends on the selected screw profile.

Figure 22A:
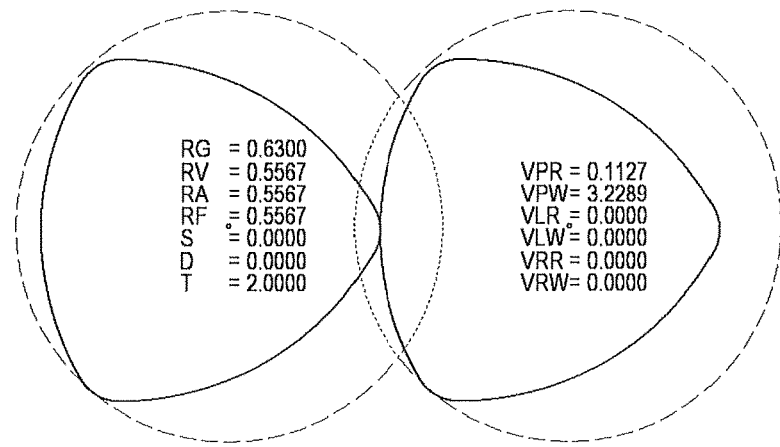
Figure 22B:
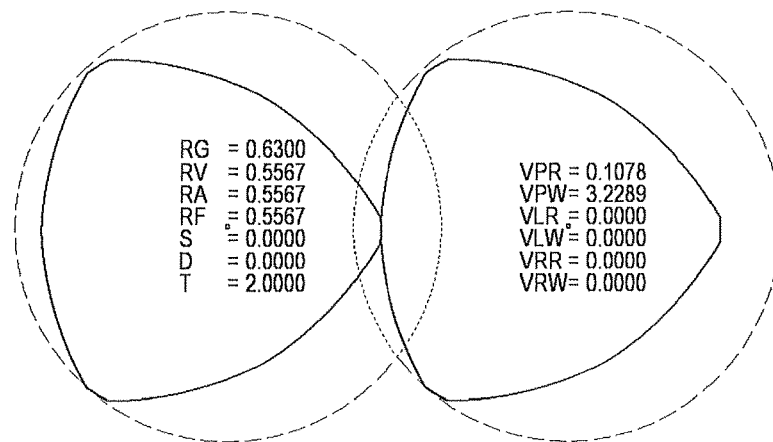
Figure 22C:
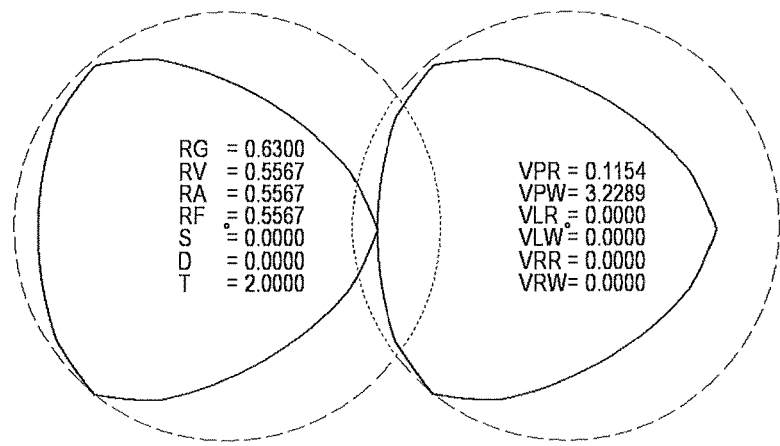

FIG. 22: FIGS. 22a to 22c show further preferred embodiments of eccentric positioning of triple-flighted screw profiles. FIG. 22a shows eccentric positioning of a triple-flighted screw profile according to FIG. 18c. FIG. 22b shows eccentric positioning of a triple-flighted screw profile according to FIG. 19c. FIG. 22c shows eccentric positioning of a triple-flighted screw profile according to FIG. 20c. The virtual barrel radius amounts to RV=0.5567 and is less than the barrel radius RG (RG=0.63). The further geometric parameters may be taken from the individual figures. The screw profiles in FIGS. 22a to 22c are positioned in each case so eccentrically that only one point of a tip zone of the sealing zone of the screw profiles touches the barrel. The magnitude of the displacement needed for this purpose depends on the direction of displacement.

Eccentric positions may additionally be selected for the screw profiles in which no point of the tip zones of the sealing zone of the screw profiles touches the barrel. In general, the degree of linear or punctiform sealing of the intermesh zone is adjustable by eccentric positioning of the screw profile of a screw element used according to the invention. In particular, the mechanical and thermal stress to which the viscous fluids are subjected in the area of the seal may be purposefully adjusted. For example the degree of sealing of the intermesh zone may be dependent in the tip zones on the direction of rotation of the screw elements. The maximum distance of the tip zones of the sealing zone of the screw profiles from the barrel is preferably in the range of 0 to 0.05 times the centerline distance, particularly preferably in the range of 0 to 0.025 times the centerline distance.

As is known to a person skilled in the art, in practice all screw elements need a degree of clearance, both relative to one another and relative to the barrel. For the eccentrically positioned triple-flighted screw profiles and resultant screw elements, the above-mentioned clearance strategies and the above-mentioned clearance magnitudes according to FIG. 15 apply. It is additionally possible to displace the screw profiles to be manufactured within the clearances. In this regard, the statements according to FIG. 16 apply.

FIGS. 21 to 22 show eccentrically positioned triple-flighted screw profiles, in which one sixth of the screw profile consists of at most 4 circular arcs. However, the invention is not limited to eccentrically positioned triple-flighted screw profiles, in which one sixth of the screw profile consists of at most 4 circular arcs. Instead, as many circular arcs as desired may be used to generate screw profiles used according to the invention.

Figure 19A:
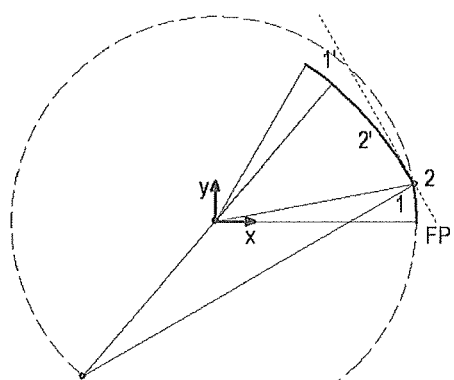
Figure 19B:
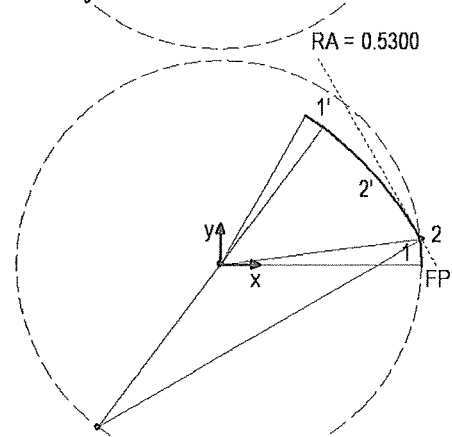
Figure 19C:
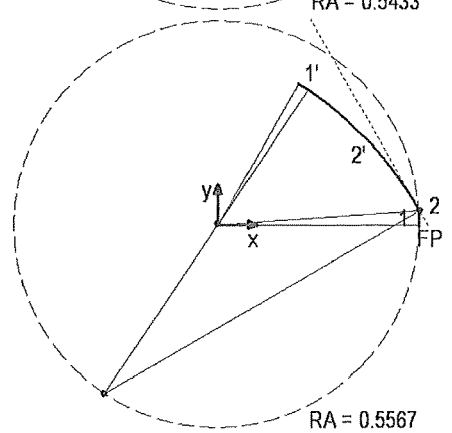
Figure 19D:
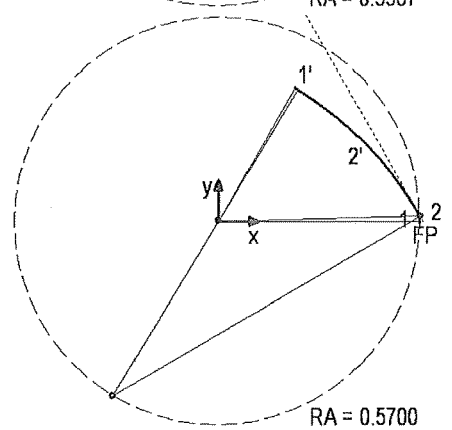
Figure 23A:
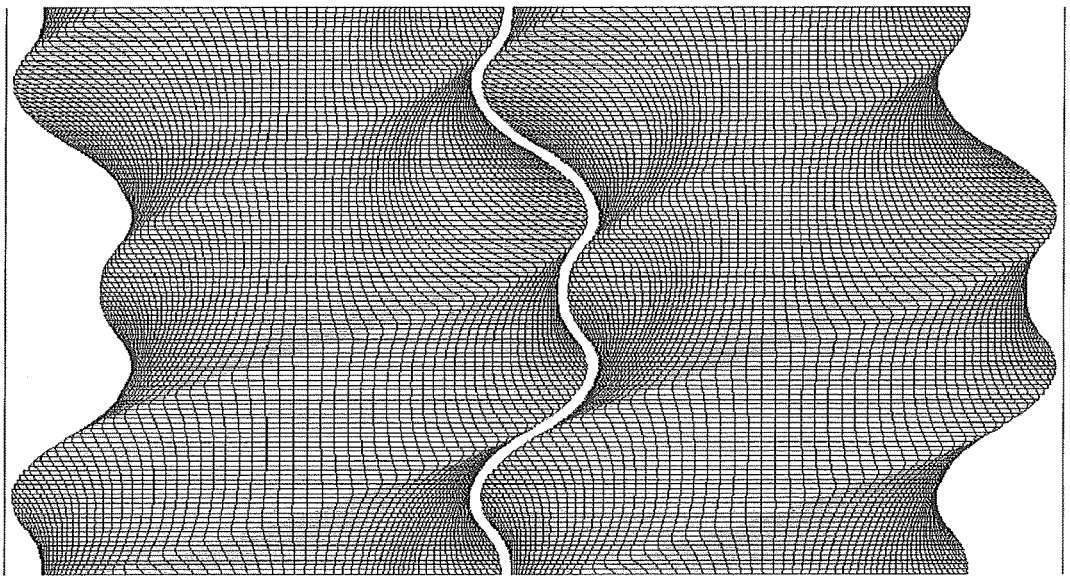

FIG. 23a shows by way of example a pair of eccentric triple-flighted conveying elements used according to the invention, which are based on the screw profile according to FIG. 19c. The barrel radius amounts to RG=0.63 and the virtual barrel radius to RV=0.5567. The clearance between the two conveying elements amounts to S=0.02. The clearance between the two conveying elements and the barrel amounts to D=0.01. The pitch of the conveying elements amounts to T=1.2. The length of the conveying elements amounts to 1.2, which corresponds to rotation of the screw profiles by an angle of $2\pi$. The barrel is illustrated by thin, continuous lines to the left and right of the two conveying elements. A possible computational grid is further illustrated on the surfaces of the two conveying elements, which grid may be used for calculating flow in twin- and multi-screw extruders.

Figure 23B:
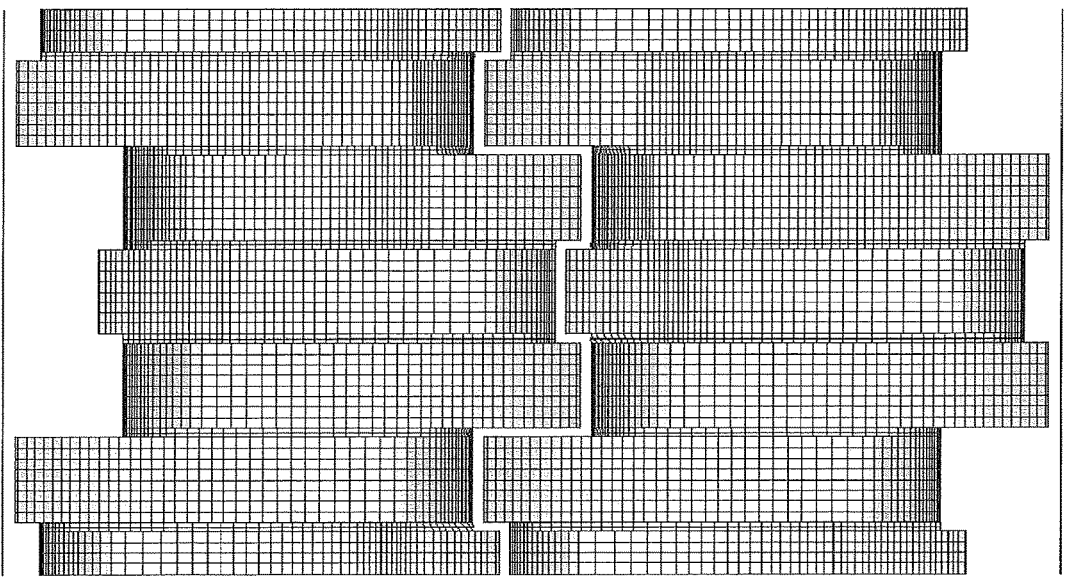

FIG. 23b shows by way of example a pair of eccentric triple-flighted kneading elements used according to the invention, which are based on the screw profile according to FIG. 19c. The barrel radius amounts to RG=0.63 and the virtual barrel radius to RV=0.5567. The clearance between the kneading disks of the two kneading elements amounts to S=0.02. The clearance between the kneading disks of the two kneading elements and the barrel amounts to D=0.01. The kneading element consists of 7 kneading disks, which are in each case offset right-handedly by an angle of $\pi/3$ relative to one another. The first and last kneading disks have a length of 0.09. The middle kneading disks have a length of 0.18. The groove between the kneading disks has a length of 0.02. The barrel is shown by thin, continuous lines to the left and right of the two kneading elements. A possible computational grid is further illustrated on the surfaces of the two kneading elements, which grid may be used for calculating flow in twin- and multi-screw extruders.

FIGS. 18 to 20 show triple-flighted screw profiles, in which the dimensionless outer screw radius RA has the values 0.53, 0.5433, 0.5567 and 0.57. Triple-flighted screw profiles are not limited to these discrete values of the dimensionless outer screw radius. Instead, triple-flighted screw profiles with a dimensionless outer screw radius in the range from RA=0.505 to RA=0.577, preferably in the range from RA=0.51 to RA=0.57 are used.

FIGS. 21 to 23 show eccentrically positioned triple-flighted screw profiles and screw elements, in which the dimensionless barrel radius RG is equal to 0.63 and the virtual barrel radius RV is equal to 0.5567. The eccentrically positioned triple-flighted screw profiles of screw elements according to the invention are not limited to this discrete value of the barrel radius or of the virtual barrel radius. In the process according to the invention eccentrically positioned triple-flighted screw profiles are positioned in a barrel with a radius RG in the range from 0.51 to 0.707, preferably in the range from 0.52 to 0.7, wherein the virtual barrel radius has a radius RV in the range from 0.505 to 0.577, preferably in the range from 0.51 to 0.57.

FIGS. 24a to 24f show the transition from a pair of double-flighted screw profiles to a pair of single-flighted screw profiles. All these figures have the same structure, which is described in detail below. The generating screw profile is illustrated by the left-hand screw profile. The generated screw profile is illustrated by the right-hand screw profile. The two screw profiles consist of 16 circular arcs. The circular arcs of the generating and generated screw profile are distinguished by thick, continuous lines, which are provided with the respective numbers of the circular arcs. As a result of the plurality of circular arcs and as a result of the generation of figures using computer software, it may be that the numbers of individual circular arcs overlap and are therefore not very legible, see for example circular arcs 3', 4' and circular arcs 5', 6', 7' in FIG. 24a. Despite the sometimes poor legibility of individual numbers, the structure of the profiles is nevertheless clear from the context in conjunction with this description.

The center points of the circular arcs are illustrated by small circles. The center points of the circular arcs are connected by thin, continuous lines both with the starting point and with the end point of the associated circular arc. The outer screw radius is in each case of approximately equal magnitude for the generating and the generated screw profile. In the region of the screw barrel the outer screw radius is distinguished by a thin dashed line, and in the intermesh zone by a thin dotted line.

Figure 24A:
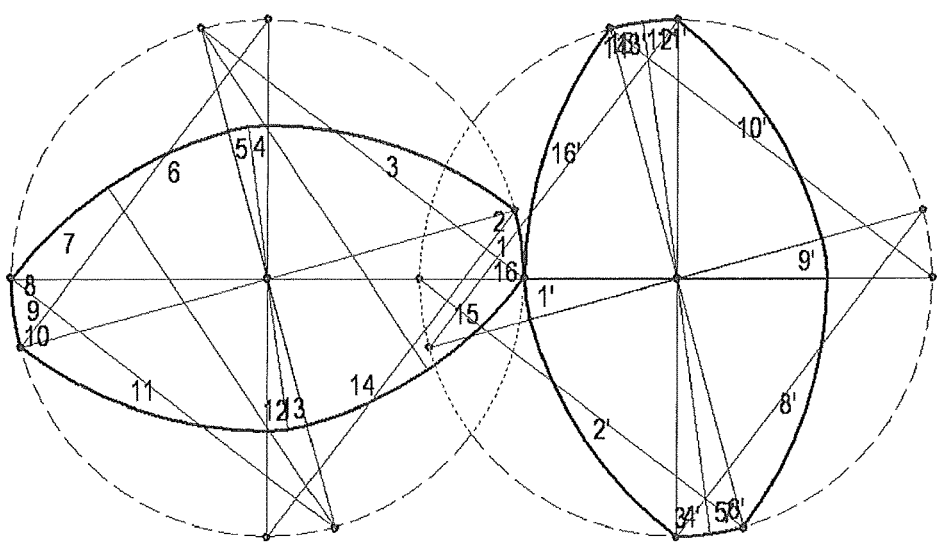

FIG. 24a shows a pair of double-flighted screw profiles, with which the transition is started. The generating and the generated screw profiles are symmetrical to one another. Circular arcs 1 and 9 of the generating screw profile touch the outer screw radius over their entire length. Circular arcs 4, 5 and 12, 13 of the generating screw profile touch the core radius over their entire length. Circular arcs 4', 5' and 12', 13' of the generated screw profile touch the outer screw radius over their entire length. Circular arcs 1' and 9' of the generated screw profile touch the core radius over their entire length.

Figure 24B:
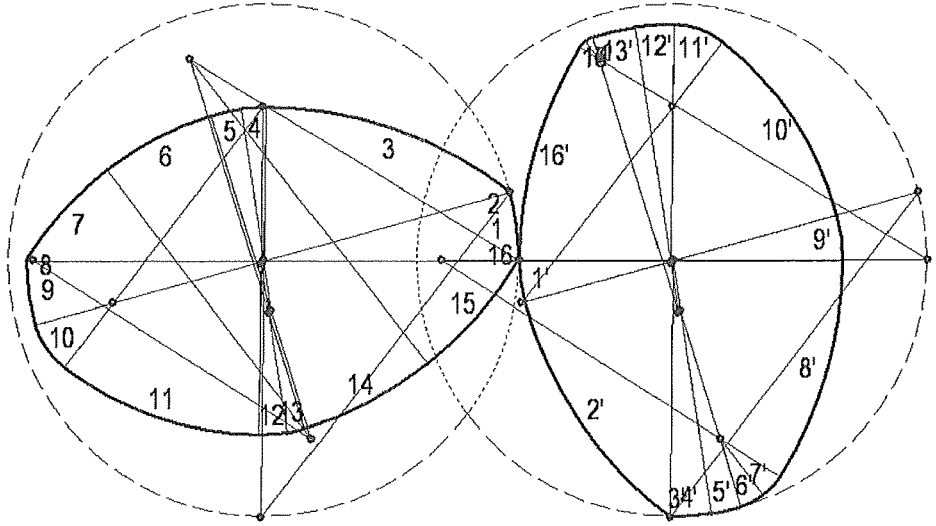
Figure 24C:
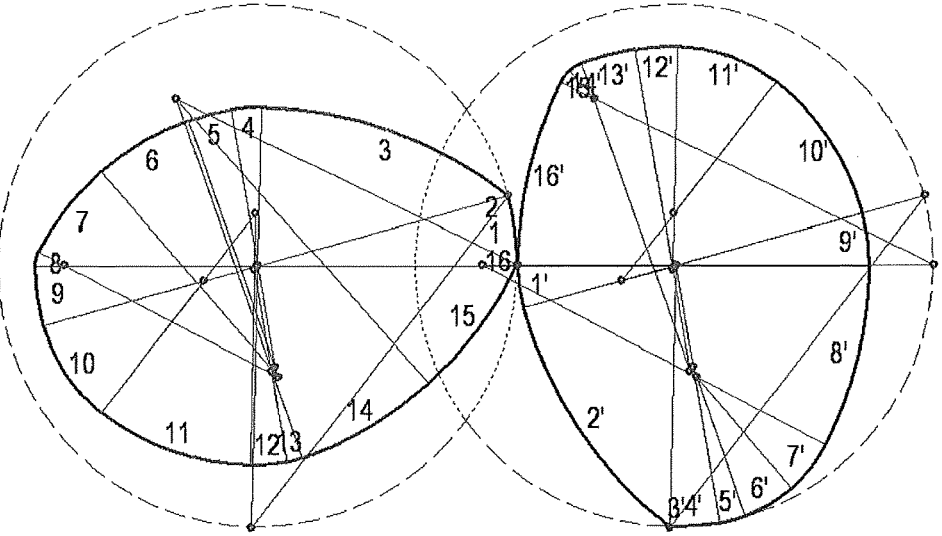
Figure 24D:
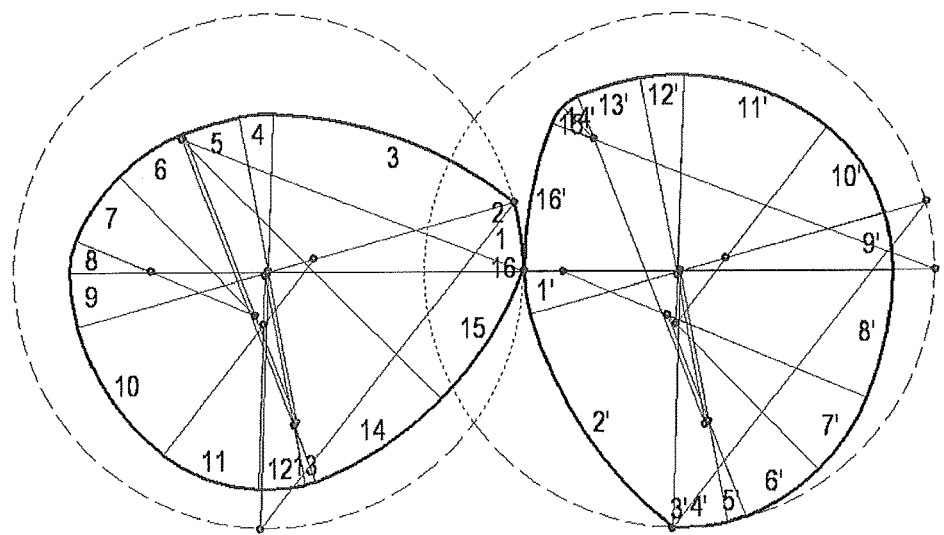
Figure 24E:
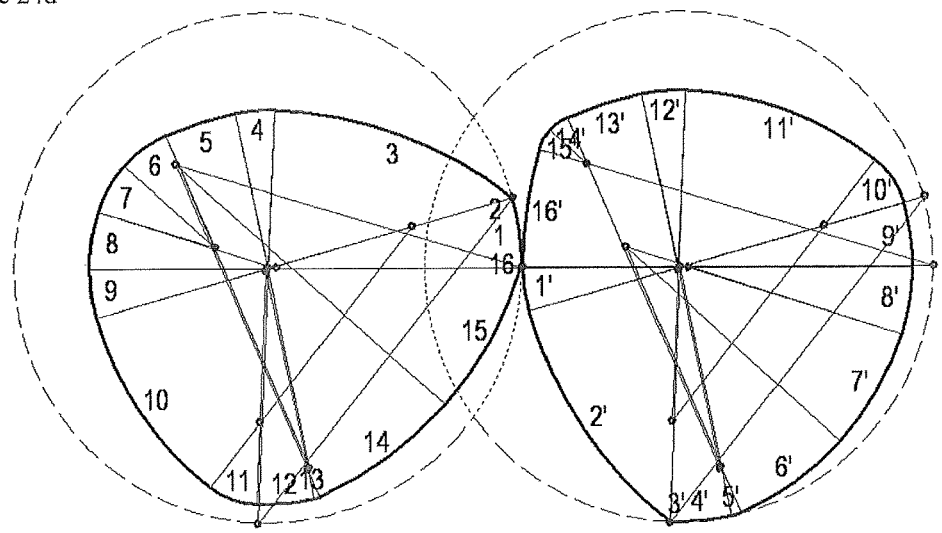
Figure 24F:
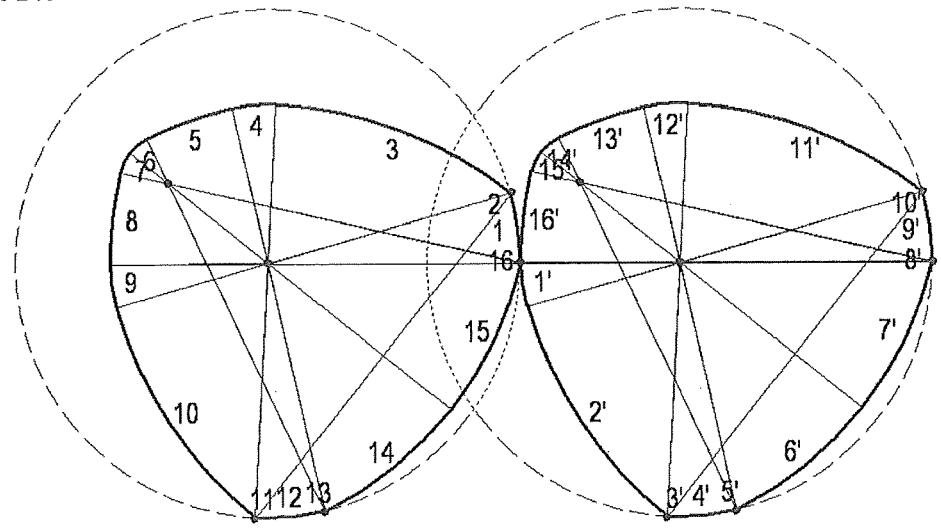

FIG. 24f shows a pair of single-flighted screw profiles, with which the transition ends. The generating and the generated screw profiles are symmetrical to one another. Circular arcs 1 and 12 of the generating screw profile touch the outer screw radius over their entire length. Circular arcs 4 and 9 of the generating screw profile touch the core radius over their entire length. Circular arcs 4' and 9' of the generated screw profile touch the outer screw radius over their entire length. Circular arcs 1' and 12' of the generated screw profile touch the core radius over their entire length.

FIG. 24b shows a pair of transition profiles, in which the transition from the double-flighted screw profiles to the single-flighted screw profiles is 20% complete. FIG. 24c shows a pair of transition profiles, in which the transition is 40% complete. FIG. 24d shows a pair of transition profiles, in which the transition is 60% complete. FIG. 24e shows a pair of transition profiles, in which the transition is 80% complete.

FIG. 25 shows in cross-section half of a screw profile of a screw element used according to the invention.

The transition proceeds in such a manner that the circular arc 1 of the generating screw profile always touches the dimensionless outer screw radius RA over its entire length, whereby the associated circular arc 1' of the generated screw profile touches the dimensionless core radius RI' over its entire length. The transition proceeds in such a manner that the circular arc 4' of the generated screw profile always touches the dimensionless outer screw radius RA' over its entire length, whereby the associated circular arc 4 of the generating screw profile touches the dimensionless core radius RI. Because a circular arc of the generating and of the generated screw profiles always lies on or touches the outer screw radius, cleaning of the inner surface of the barrel is ensured during the entire transition. It is additionally apparent from FIGS. 24b to 24e that the generating and the generated screw profiles are asymmetric. A pair of transition elements always consists of a first transition element, which is based on the generating transition profiles, and of a second transition element, which is based on the generated transition profiles.

FIG. 24 shows transition profiles in which the dimensionless outer screw radius of the generating screw profile and the dimensionless outer screw radius of the generated screw profile are in the range from RA=0.6146 to RA=0.6288. In the process according to the invention, screw profiles may be used which have a dimensionless outer screw radius of the screw profile between an RA of greater than 0 and an RA of less than or equal to 1, preferably in the range from RA=0.52 to RA=0.707.

Figure 26:
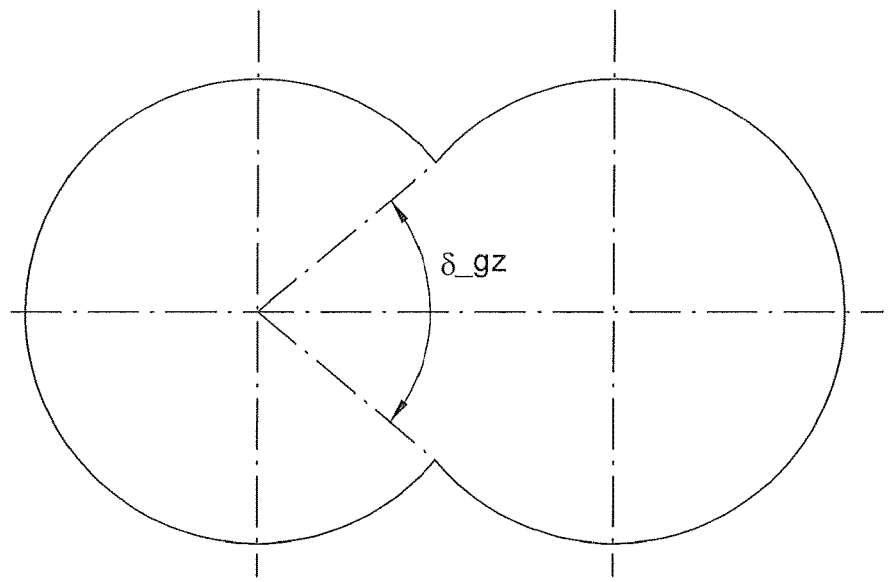

FIG. 26 shows a figure-of-eight-shaped screw barrel with two bores. The zone in which two barrel bores interpenetrate is known as the intermesh zone. The two points of intersection of two barrel bores are known as barrel intermeshes. The aperture angle δ_gz between the two barrel intermeshes is additionally shown.

Figure 27:
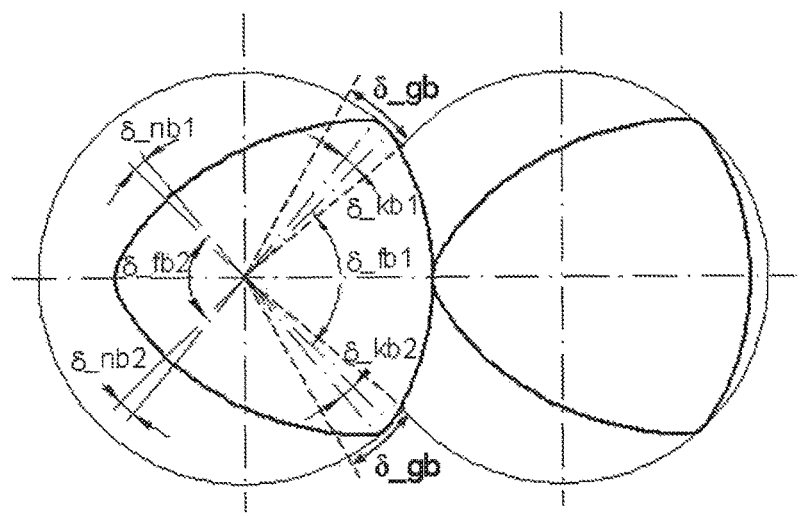

FIG. 27 shows the angles δ_fb1, δ_fb2, δ_nb1, δ_nb2, δ_kb1, δ_kb2 and δ_gb with reference to a screw profile used according to the invention.

Figure 28:
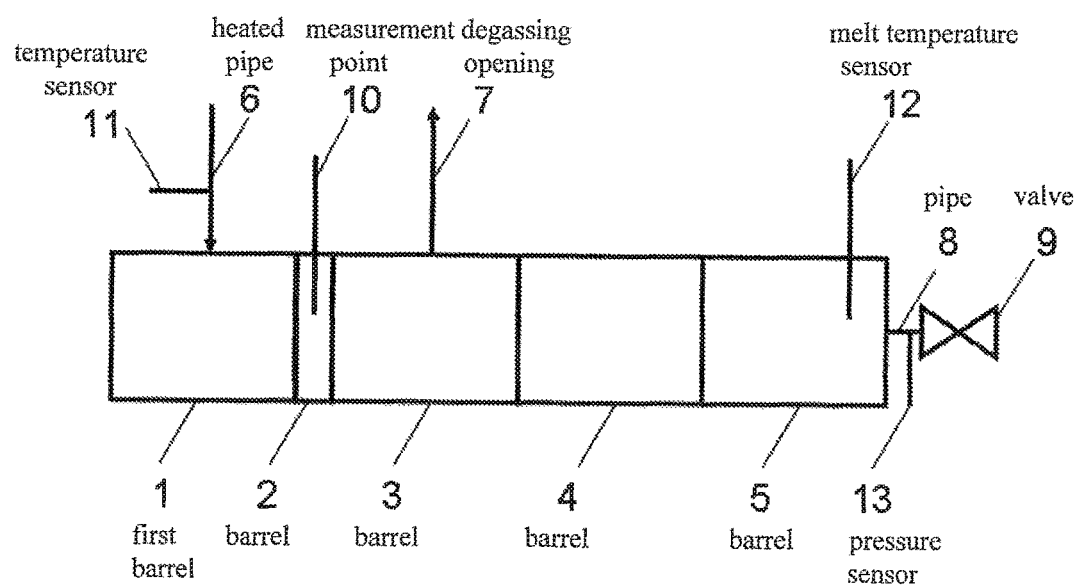

FIG. 28 shows a twin-screw extruder. The extruder comprises a structure consisting of 5 barrel parts (1-5), in which are arranged co-rotating, intermeshing screws. The machine is a ZSK 40Sc with a 40 mm barrel diameter from Coperion Werner & Pfleiderer. The polymer melt is fed into the first barrel (1) by way of a heated pipe (6). Barrel (2) contains a measurement point (10) for a melt temperature sensor. Barrel (3) contains a degassing opening (7). Barrel (4) is closed and barrel (5) is a flange, which converts the cross-section from the figure-of-eight-shaped bore of the twin-screw extruder to a pipe (8). A melt temperature sensor (12) is mounted in the flange. The flange is followed by a valve (9) for throttling purposes. The internal diameter of valve (9) and line (8) amounts in each case to 15 mm, the valve length to 95 mm and the line length to 120 mm Number (13) is a pressure sensor and number (11) a temperature sensor in the melt line.

Figure 29:
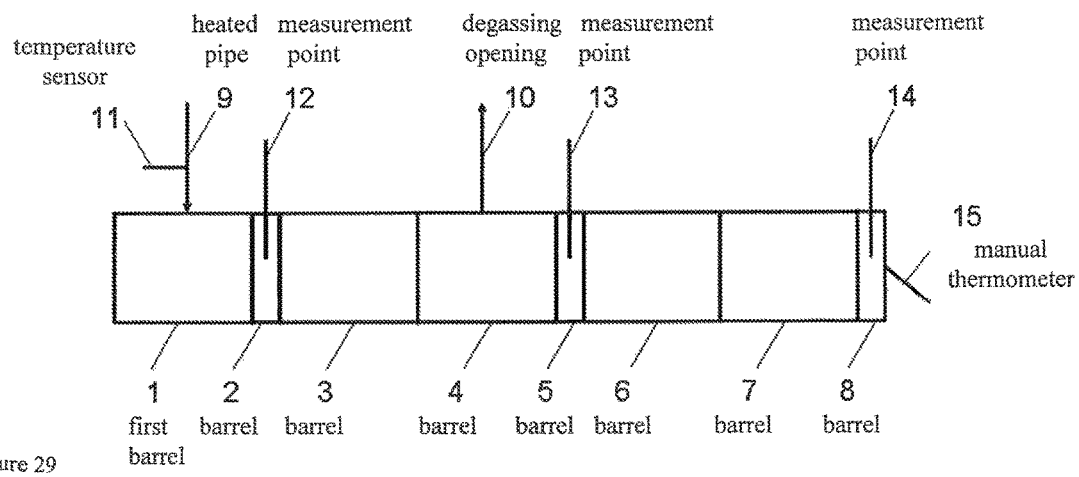

FIG. 29 shows a twin-screw extruder. The extruder comprises a structure consisting of 8 barrel parts (1-8), in which are arranged co-rotating, intermeshing screws. The machine is a ZSK 40Sc with a 40 mm barrel diameter from Coperion Werner & Pfleiderer. The polymer melt is fed into the first barrel (1) by way of a heated pipe (9). A melt temperature sensor (11) is located in the pipe. Barrel (2) contains a measurement point (12) for a melt temperature sensor. Barrel (3) is closed and barrel (4) contains a degassing opening (10). Barrel (5) contains a measurement point (13) for a melt temperature sensor. Barrels (6) and (7) are closed and barrel (8) contains a measurement point (14) for a melt temperature sensor. The barrel (8) is open at the end, such that the figure-of-eight-shaped bore of the barrel is visible. A manual thermometer (15) serves to measure the melt temperature.

Figure 30:
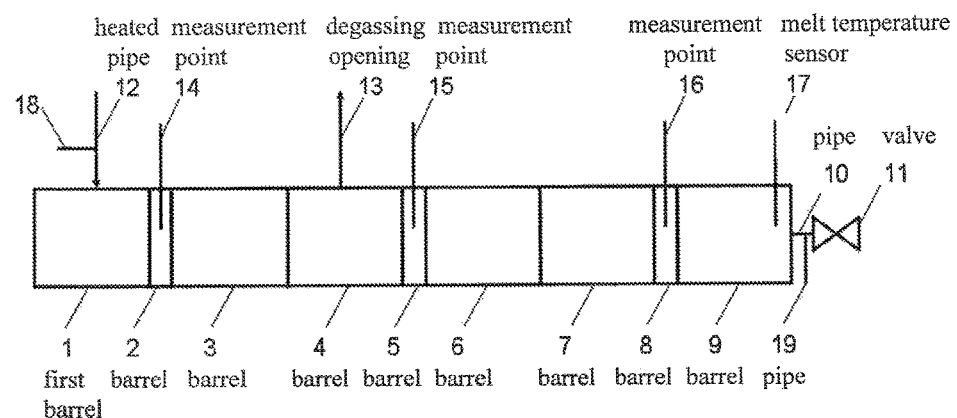

FIG. 30 shows a twin-screw extruder. The extruder comprises a structure consisting of 9 barrel parts (1-9), in which are arranged co-rotating, intermeshing screws. The machine is a ZSK 40Sc with a 40 mm barrel diameter from Coperion Werner & Pfleiderer. The polymer melt is fed into the first barrel (1) by way of a heated pipe (12). A melt temperature sensor (18) is located in the pipe. Barrel (2) contains a measurement point (14) for a melt temperature sensor. Barrel (3) is closed and barrel (4) contains a degassing opening (13). Barrel (5) contains a measurement point (15) for a melt temperature sensor. Barrels (6) and (7) are closed and barrel (8) contains a measurement point (16) for a melt temperature sensor. Barrel (9) is a flange, which converts the cross-section from the figure-of-eight-shaped bore of the twin-screw extruder to a pipe (10) (round). A melt temperature sensor (17) is mounted in the flange. The flange is followed by a valve (11) for throttling purposes. The internal diameter of valve (11) and line (10) amounts in each case to 15 mm, the valve length to 95 mm and the line length to 120 mm. A pressure sensor (19) is fitted in the pipe (19).

Figure 31:
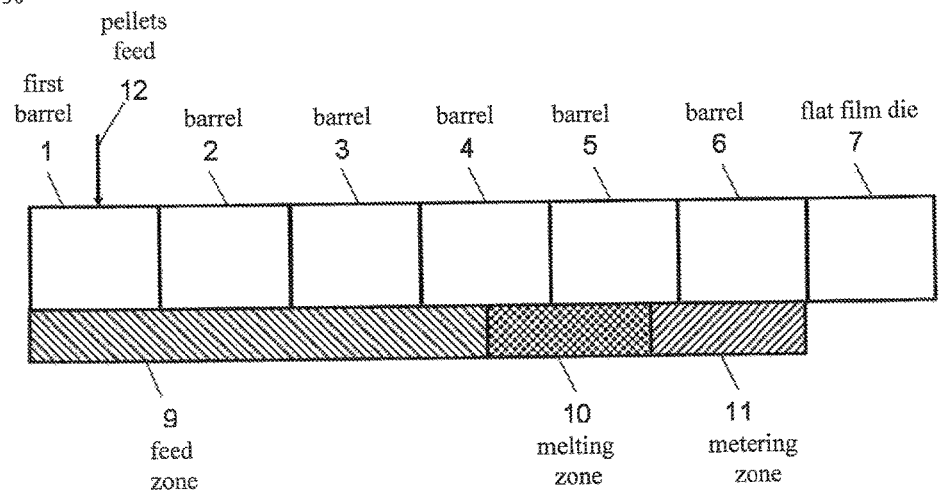

FIG. 31 shows a twin-screw extruder with a structure consisting of 6 barrels (1-6), in which are arranged co-rotating, intermeshing screws. The machine is a ZSK 32Mc with a 32 mm barrel diameter from Coperion Werner & Pfleiderer. The pellets are fed (12) into the first barrel (1). The other barrels (2-6) are closed and at the end there is a flat film die (7).

The two screws (not shown) are provided symmetrically with screw elements. In the feed zone (9) the screws are provided with double-flighted conveying elements with a pitch of 42 mm and 63.5 mm. The feed zone extends as far as the middle of barrel (4), then the melting zone (10) starts. The melting zone (10) extends as far as the end of the fifth barrel (5) and consists of triple-flighted kneading blocks and transition kneading blocks providing a transition from double- to triple-flighted or vice versa. The metering zone (11) follows.

Figure 32:
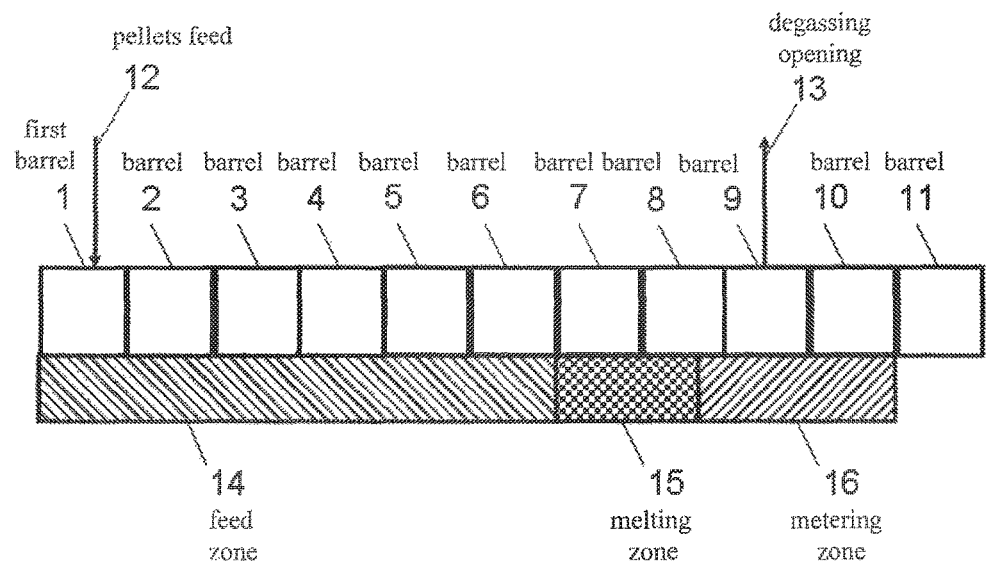

FIG. 32 shows a twin-screw extruder with a structure consisting of 11 barrels (1-11), in which are arranged co-rotating, intermeshing screws. The machine is a ZSK 32Mc with a 32 mm barrel diameter from Coperion Werner & Pfleiderer. The pellets are fed (12) into the first barrel (1). The other barrels (2, 3, 4, 5, 6, 7, 8, 10) are closed with the exception of barrel (9), where there is a degassing opening (13). A four-hole die (11) is mounted at the end.

The two screws (not shown) are provided symmetrically with screw elements. At the start in the feed zone (14) the screws are provided with double-flighted conveying elements. The feed zone (14) extends as far as the start of the barrel (7), then the melting zone (15) starts. The melting zone (15) extends as far as the middle of the barrel (8) and consists of triple-flighted kneading blocks and transition kneading blocks providing a transition from double- to triple-flighted or vice versa. The metering zone (16) or pressure build-up zone starts in the middle of the barrel (9) after the melting zone.

Figure 33:
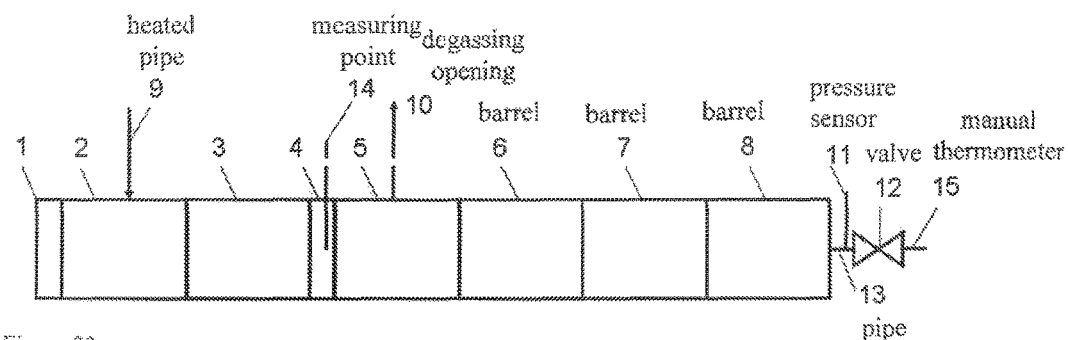

FIG. 33 shows a twin-screw extruder. The extruder comprises a structure consisting of seven barrels (1-7), in which are arranged co-rotating, intermeshing screws. The machine is a ZSK 40Sc with a 40 mm barrel diameter from Coperion Werner & Pfleiderer. The polymer melt is fed into the second barrel (2) by way of a heated pipe (9). Barrel (3) is closed and barrel (4) contains a measurement point (14) for a melt temperature sensor. Barrel (5) contains a degassing opening (10). Barrels (6) and (7) are closed. Barrel (8) is a flange, which converts the cross-section from the figure-of-eight-shaped bore of the twin-screw extruder to a pipe (13) (round). The flange is followed by a valve (12) for throttling purposes. The internal diameter of valve and line amounts to 15 mm for a valve length of 95 mm and a line length of 120 mm. A pressure sensor (11) is installed in the pipe (13). A manual thermometer (15) serves to measure the melt temperature at the outlet.

EXAMPLES

Examples 1-11 present tests on a ZSK 40 Sc from Coperion Werner & Pfleiderer and a ZSK 32 Mc from Coperion Werner & Pfleiderer. The ZSK 32 Mc has a centerline distance of 26.2 mm and a barrel diameter of 31.8 mm. The ZSK 40 Sc has a centerline distance of 33.4 mm and a barrel diameter of 40.3 mm. The aperture angle between the two barrel intermeshes $\delta\_gz$ amounts in the ZSK 32 Mc to approx. 69° and in the ZSK 40 Sc to approx. 68°. The double-flighted conveying elements used in the examples with an Erdmenger screw profile according to the prior art have a tip angle of approx. 20° on the ZSK 32 Mc and a tip angle of approx. 21° on the ZSK 40 Sc. The single-flighted conveying elements used in the examples with an Erdmenger screw profile according to the prior art have a tip angle of approx. 110° on the ZSK 40 Sc. The conveying elements used according to the invention and in the examples have a sealing angle of approx, 106° on the ZSK 32 Mc, consisting of a tip angle $\delta\_kb1$ of approx. 9', a flank angle $\delta\_fb1$ of approx. 88° and a tip angle $\delta\_kb2$ of approx. 9°, and a channel angle of approx. 110°, consisting of a groove angle $\delta\_nb1$ of approx. 12°, a flank angle $\delta\_fb2$ of approx. 86° and a groove angle $\delta\_kb2$ of approx. 12°. The conveying elements used according to the invention and in the examples have a sealing angle of approx, 104° on the ZSK 40 Sc, consisting of a tip angle $\delta\_kb1$ of approx. 3°, a flank angle $\delta\_fb1$ of approx. 98° and a tip angle $\delta\_kb2$ of approx. 3°, and a channel angle of approx. 110°, consisting of a groove angle $\delta\_nb1$ of approx. 8°, a flank angle $\delta\_fb2$ of approx. 94° and a groove angle $\delta\_kb2$ of approx. 8°.

Intermediate plates are introduced at a number of locations on the ZSK40 Sc, which serve to accommodate the measurement systems (see for example FIG. 29, intermediate plate (2)). These intermediate plates are likewise designated by the term barrel below for the purpose of simplification.

Comparative Example 1

The twin-screw extruder (FIG. 28) comprises a structure consisting of 5 barrel parts, in which are arranged co-rotating, intermeshing screws. The machine is a ZSK 40Sc with a 40 mm barrel diameter from Coperion Werner & Pfleiderer. The polymer melt is fed into the first barrel (1) by way of a heated pipe (6). Barrel (2) contains a measurement point (10) for a melt temperature sensor. Barrel (3) contains a degassing opening (7). Barrel (4) is closed and barrel (5) is a flange, which converts the cross-section from the figure-of-eight-shaped bore of the twin-screw extruder to a pipe (8). The flange is followed by a valve (9) for throttling purposes. The internal diameter of valve (9) and line (8) amounts in each case to 15 mm, the valve length to 95 mm and the line length to 120 mm.

The two screws (not shown) are provided symmetrically with screw elements. At the start the screws are provided in each case with double-flighted conveying elements with a pitch of 25 mm and a length of 25 mm. There then follow two double-flighted conveying elements with the pitch 60 mm and length 60 mm. A bush then follows with a length of 30 mm and a diameter of 26 mm, which in the installed state is arranged under the melt temperature sensor (10). The screw is then provided with 8 double-flighted conveying elements with the pitch 40 mm and length 40 mm and one conveying element with the pitch 40 mm and length 20 mm.

At a rotational speed of the screws of 250 rpm and a throughput of 80 kg/h of Makrolon® 2805 (manufacturer: Bayer MaterialScience AG), the temperature (12) of the melt was measured at the end of the extruder in the flange (5) at various pressures adjusted by means of the pressure sensor (13) upstream of the valve (9). The inlet temperature of the melt into the twin-screw extruder was also measured (11). The extruder barrels (1, 2, 3, 4, 5), lines (6, 8) and the valve (9) were heated to 290° C. The results are shown in Table 1.

TABLE 1

| Pressure upstream of valve | 20.6 bar | 40.4 bar | 60.1 bar | 79.8 bar |
|---|---|---|---|---|
| Inlet temperature (11) | 320° C. | 320° C. | 319° C. | 319° C. |
| Outlet temperature (12) | 334° C. | 338° C. | 342° C. | 346° C. |
| Outlet-inlet temperature differential | 14° C. | 18° C. | 23° C. | 27° C. |

Example 2

The extruder was of the same structure as in Example 1. In comparison with Example 1, the make-up of the screw downstream of the bush was changed as follows: the 8 double-flighted conveying elements with a pitch of 40 mm and length of 40 mm and the one conveying element with a pitch of 40 mm and a length of 20 mm were replaced by conveying elements according to the invention. The conveying elements have a pitch of 30 mm and a length of 30 mm and 11 units were placed on the screw. At a rotational speed of the screws of 250 rpm and a throughput of 80 kg/h of Makrolon® 2805 (manufacturer: Bayer MaterialScience AG), the temperature (12) of the melt was measured at the end of the extruder in the flange (5) at various pressures upstream of the valve (9). The inlet temperature (11) of the melt into the twin-screw extruder was also measured. The extruder barrels (1, 2, 3, 4, 5), lines (6, 8) and the valve (9) were heated to 290° C.

The increase between the melt inlet and melt outlet temperature is distinctly lower when screw elements according to the invention are used in comparison with conventional double-flighted elements from Example 1, as is shown by the results in Table 2.

TABLE 2

| Pressure upstream of valve | 20.3 bar | 40.1 bar | 60.2 bar | 80.1 bar |
|---|---|---|---|---|
| Inlet temperature (11) | 321° C. | 321° C. | 322° C. | 322° C. |
| Outlet temperature (12) | 328° C. | 331° C. | 334° C. | 336° C. |
| Outlet-inlet temperature differential | 7° C. | 10° C. | 12° C. | 14° C. |

Example 3

The extruder was of the same structure as in Example 1. In comparison with Example 1, the make-up of the screw downstream of the bush was changed as follows: the 8 double-flighted conveying elements with a pitch of 40 mm and length of 40 mm and the one conveying element with a pitch of 40 mm and a length of 20 mm were replaced by screw elements according to the invention and conventional single-flighted elements. Both types of elements have a pitch of 30 mm and length of 30 mm and 5 units of the screw elements according to the invention followed by 6 conventional single-flighted elements with a pitch of 30 mm and a length of 30 mm were placed on the screw. At a rotational speed of the screws of 250 rpm and a throughput of 80 kg/h of Makrolon® 2805 (manufacturer: Bayer MaterialScience AG), the temperature (12) of the melt was measured at the end of the extruder in the flange (5) at various pressures upstream of the valve (9). The inlet temperature (11) of the melt into the twin-screw extruder was also measured. The extruder barrels (1, 2, 3, 4, 5), lines (6, 8) and the valve (9) were heated to 290° C.

The example compares conventional single-flighted conveying elements with the conveying elements according to the invention. The results in Table 3 reveal distinctly higher temperatures in the case of conventional single-flighted elements.

TABLE 3

| Pressure upstream of valve | 20.7 bar | 39.8 bar | 60.2 bar | 79.9 bar |
|---|---|---|---|---|
| Inlet temperature (11) | 320° C. | 320° C. | 320° C. | 320° C. |
| Outlet temperature (12) | 334° C. | 337° C. | 340° C. | 342° C. |
| Outlet-inlet temperature differential | 14° C. | 17° C. | 20° C. | 22° C. |

Comparative Example 4

The twin-screw extruder (FIG. 29) comprises a structure consisting of 8 barrel parts, in which are arranged co-rotating, intermeshing screws. The machine is a ZSK 40Sc with a 40 mm barrel diameter from Coperion Werner & Pfleiderer. The polymer melt is fed into the first barrel (1) by way of a heated pipe (9). Barrel (2) contains a measurement point (12) for a melt temperature sensor. Barrel (3) is closed and barrel (4) contains a degassing opening (10). Barrel (5) contains a measurement point (13) for a melt temperature sensor. Barrels (6) and (7) are closed and barrel (8) contains a measurement point (14) for a melt temperature sensor. The barrel (8) is open at the end, such that the figure-of-eight-shaped bore of the barrel is visible.

The two screws (not shown) are provided symmetrically with screw elements. At the start the screws are provided in each case with double-flighted conveying elements with a pitch of 25 mm and a length of 25 mm. There then follow two double-flighted conveying elements with the pitch 60 mm and length 60 mm. A bush then follows with a length of 30 mm and a diameter of 26 mm, which in the installed state is arranged under the melt temperature sensor (12). The screw is then provided with 5 double-flighted conveying elements with the pitch 60 mm and length 60 mm and one conveying element with the pitch 60 mm and length 30 mm. A bush then follows with a length of 35 mm and a diameter of 26 mm, which in the installed state is arranged under the melt temperature sensor (13). The screw is then provided with 8 double-flighted conveying elements with a pitch of 40 mm and length of 40 mm.

At various rotational speeds of the screws and a throughput of 80 kg/h of Makrolon® 2805 (manufacturer: Bayer MaterialScience AG), the temperature (measurement point (14)) of the melt was measured at the end of the extruder. The temperature was additionally measured with a manual thermometer (15) which was held in the melt at the open outlet. The inlet temperature (measurement point (11)) of the melt into the twin-screw extruder was also measured. The extruder barrels (1, 2, 3, 4, 5, 6, 7, 8) and line (9) were heated to 290° C. The results are shown in Table 4.

TABLE 4

| Rotational speed rpm | 100 | 150 | 200 | 250 | 300 | 350 |
|---|---|---|---|---|---|---|
| Inlet temperature (11) | 319° C. | 319° C. | 318° C. | 318° C. | 318° C. | 317° C. |
| Outlet temperature (15) | 324° C. | 334° C. | 339° C. | 348° C. | 350° C. | 349° C. |
| Outlet-inlet temperature differential | 5° C. | 15° C. | 21° C. | 30° C. | 32° C. | 32° C. |

Example 5

The twin-screw extruder (FIG. 29) comprises a structure consisting of 8 barrel parts, in which are arranged co-rotating, intermeshing screws. The machine is a ZSK 40Sc with a 40 mm barrel diameter from Coperion Werner & Pfleiderer. The polymer melt is fed into the first barrel (1) by way of a heated pipe (9). Barrel (2) contains a measurement point (12) for a melt temperature sensor. Barrel (3) is closed and barrel (4) contains a degassing opening (10). Barrel (5) contains a measurement point (13) for a melt temperature sensor. Barrels (6) and (7) are closed and barrel (8) contains a measurement point (14) for a melt temperature sensor. The barrel (8) is open at the end, such that the figure-of-eight-shaped bore of the barrel is visible.

The two screws (not shown) are provided symmetrically with screw elements. At the start the screws are provided in each case with double-flighted conveying elements with a pitch of 25 mm and a length of 25 mm. There then follow two double-flighted conveying elements with the pitch 60 mm and length 60 mm. A bush then follows with a length of 30 mm and a diameter of 26 mm, which in the installed state is arranged under the melt temperature sensor (12). The screw is then provided with 5 double-flighted conveying elements with the pitch 60 mm and length 60 mm and one conveying element with the pitch 60 mm and length 30 mm. A bush then follows with a length of 35 mm and a diameter of 26 mm, which in the installed state is arranged under the melt temperature sensor (13). The screw is then provided with 11 conveying elements according to the invention with a pitch of 30 mm and length of 30 mm.

At various rotational speeds of the screws and a throughput of 80 kg/h of Makroion® 2805 (manufacturer: Bayer MaterialScience AG), the temperature (measurement point (14)) of the melt was measured at the end of the extruder. The temperature was additionally measured with a manual thermometer (15) which was held in the melt at the open outlet. The inlet temperature (measurement point (11)) of the melt into the twin-screw extruder was also measured. The extruder barrels (1, 2, 3, 4, 5, 6, 7, 8) and line (9) were heated to 290° C. The results in Table 5 reveal distinctly lower temperatures and temperature differentials between the inlet (11) and outlet (15) than in Table 4 in Example 4.

TABLE 5

| Rotational speed rpm | 100 | 150 | 200 | 250 | 300 | 350 |
|---|---|---|---|---|---|---|
| Inlet temperature (11) | 321° C. | 318° C. | 318° C. | 319° C. | 319° C. | 318° C. |
| Outlet temperature (15) | 321° C. | 331° C. | 333° C. | 329° C. | 342° C. | 351° C. |
| Outlet-inlet temperature differential | 0° C. | 13° C. | 15° C. | 10° C. | 23° C. | 33° C. |

Example 6

The twin-screw extruder (FIG. 29) comprises a structure consisting of 8 barrel parts, in which are arranged co-rotating, intermeshing screws. The machine is a ZSK 40Sc with a 40 mm barrel diameter from Coperion Werner & Pfleiderer. The polymer melt is fed into the first barrel (1) by way of a heated pipe (9). Barrel (2) contains a measurement point (12) for a melt temperature sensor. Barrel (3) is closed and barrel (4) contains a degassing opening (10). Barrel (5) contains a measurement point (13) for a melt temperature sensor. Barrels (6) and (7) are closed and barrel (8) contains a measurement point (14) for a melt temperature sensor. The barrel (8) is open at the end, such that the figure-of-eight-shaped bore of the barrel is visible.

The two screws (not shown) are provided symmetrically with screw elements. At the start the screws are provided in each case with double-flighted conveying elements with a pitch of 25 mm and a length of 25 mm. There then follow two double-flighted conveying elements with the pitch 60 mm and length 60 mm. A bush then follows with a length of 30 mm and a diameter of 26 mm, which in the installed state is arranged under the melt temperature sensor (12). The screw is then provided with 5 double-flighted conveying elements with the pitch 60 mm and length 60 mm and one conveying element with the pitch 60 mm and length 30 mm. A bush then follows with a length of 35 mm and a diameter of 26 mm, which in the installed state is arranged under the melt temperature sensor (13). The screw is then provided with 5 conveying elements according to the invention with a pitch of 30 mm and length of 30 mm. The screw was then provided with 6 conventional single-flighted conveying elements with a length of 30 mm and a pitch of 30 mm.

At various rotational speeds of the screws and a throughput of 80 kg/h of Makrolon® 2805 (manufacturer: Bayer MaterialScience AG), the temperature (measurement point (14)) of the melt was measured at the end of the extruder. The temperature was additionally measured with a manual thermometer (15) which was held in the melt at the open outlet. The inlet temperature (measurement point (11)) of the melt into the twin-screw extruder was also measured. The extruder barrels (1, 2, 3, 4, 5, 6, 7, 8) and line (9) were heated to 290° C. The results in Table 6 reveal distinctly higher temperatures and temperature differentials between the inlet (11) and outlet (15) than in the process according to the invention in Table 5 in Example 5.

TABLE 6

| Rotational speed rpm | 100 | 150 | 200 | 250 | 350 |
|---|---|---|---|---|---|
| Inlet temperature (11) | 317° C. | 317° C. | 318° C. | 317° C. | 318° C. |
| Outlet temperature (15) | 321° C. | 330° C. | 338° C. | 345° C. | 350° C. |
| Outlet-inlet temperature differential | 4° C. | 13° C. | 20° C. | 28° C. | 31° C. |

Comparative Example 7

The twin-screw extruder (FIG. 30) comprises a structure consisting of 9 barrel parts, in which are arranged co-rotating, intermeshing screws. The machine is a ZSK 40Sc with a 40 mm barrel diameter from Coperion Werner & Pfleiderer. The polymer melt is fed into the first barrel (1) by way of a heated pipe (12). Barrel (2) contains a measurement point (14) for a melt temperature sensor. Barrel (3) is closed and barrel (4) contains a degassing opening (13). Barrel (5) contains a measurement point (15) for a melt temperature sensor. Barrels (6) and (7) are closed and barrel (8) contains a measurement point (16) for a melt temperature sensor. Barrel (9) is a flange, which converts the cross-section from the figure-of-eight-shaped bore of the twin-screw extruder to a pipe (10) (round). The flange is followed by a valve (11) for throttling purposes. The internal diameter of valve (11) and line (10) amounts in each case to 15 mm, the valve length to 95 mm and the line length to 120 mm.

The two screws (not shown) are provided symmetrically with screw elements. At the start the screws are provided in each case with double-flighted conveying elements with a pitch of 25 mm and a length of 25 mm. There then follow two double-flighted conveying elements with the pitch 60 mm and length 60 mm. A bush then follows with a length of 30 mm and a diameter of 26 mm, which in the installed state is arranged under the melt temperature sensor (14). The screw is then provided with 5 double-flighted conveying elements with the pitch 60 mm and length 60 mm and one conveying element with the pitch 60 mm and length 30 mm. A bush then follows with a length of 35 mm and a diameter of 26 mm, which in the installed state is arranged under the melt temperature sensor (15). The screw is then provided with 8 double-flighted conveying elements of a pitch of 40 mm and length of 40 mm.

At various rotational speeds of the screws and a throughput of 80 kg/h of Bayblend® T45 (manufacturer: Bayer MaterialScience AG), the temperature (measurement point (17)) of the melt was measured at the end of the extruder.

The inlet temperature (measurement point (18)) of the melt into the twin-screw extruder was also measured. The extruder barrels (1, 2, 3, 4, 5, 6, 7, 8, 9), line (10, 12) and the valve (11) were heated to 240° C. The valve (11) is completely opened. The results are shown in Table 7.

TABLE 7

| Rotational speed rpm | 150 | 250 | 350 |
|---|---|---|---|
| Inlet temperature (18) | 274° C. | 274° C. | 274° C. |
| Outlet temperature (17) | 285° C. | 292° C. | 300° C. |
| Outlet-inlet temperature differential | 11° C. | 18° C. | 26° C. |

Example 8

The twin-screw extruder (FIG. 30) comprises a structure consisting of 9 barrel parts, in which are arranged co-rotating, intermeshing screws. The machine is a ZSK 40Sc with a 40 mm barrel diameter from Coperion Werner & Pfleiderer. The polymer melt is fed into the first barrel (1) by way of a heated pipe (12). Barrel (2) contains a measurement point (14) for a melt temperature sensor. Barrel (3) is closed and barrel (4) contains a degassing opening (13). Barrel (5) contains a measurement point (15) for a melt temperature sensor. Barrels (6) and (7) are closed and barrel (8) contains a measurement point (16) for a melt temperature sensor. Barrel (9) is a flange, which converts the cross-section from the figure-of-eight-shaped bore of the twin-screw extruder to a pipe (10) (round). The flange is followed by a valve (11) for throttling purposes. The internal diameter of valve (11) and line (10) amounts in each case to 15 mm, the valve length to 95 mm and the line length to 120 mm.

The two screws (not shown) are provided symmetrically with screw elements. At the start the screws are provided in each case with double-flighted conveying elements with a pitch of 25 mm and a length of 25 mm. There then follow two double-flighted conveying elements with the pitch 60 mm and length 60 mm. A bush then follows with a length of 30 mm and a diameter of 26 mm, which in the installed state is arranged under the melt temperature sensor (14). The screw is then provided with 5 double-flighted conveying elements with the pitch 60 mm and length 60 mm and one conveying element with the pitch 60 mm and length 30 mm. A bush then follows with a length of 35 mm and a diameter of 26 mm, which in the installed state is arranged under the melt temperature sensor (15). The screw is then provided with 11 conveying elements according to the invention of a pitch of 30 mm and length of 30 mm.

At various rotational speeds of the screws and a throughput of 80 kg/h of Bayblend® T45 (manufacturer: Bayer MaterialScience AG), the temperature (measurement point (17)) of the melt was measured at the end of the extruder. The inlet temperature (measurement point (18)) of the melt into the twin-screw extruder was also measured. The extruder barrels (1, 2, 3, 4, 5, 6, 7, 8, 9), line (10, 12) and the valve (11) were heated to 240° C. The valve (11) is completely opened. The results are shown in Table 8 and reveal lower temperatures than in Table 7 in Example 7.

TABLE 8

| Rotational speed rpm | 150 | 250 | 350 |
|---|---|---|---|
| Inlet temperature (18) | 275° C. | 275° C. | 273° C. |
| Outlet temperature (17) | 281° C. | 291° C. | 297° C. |

TABLE 8-continued

| Rotational speed rpm | 150 | 250 | 350 |
|---|---|---|---|
| Outlet-inlet temperature differential | 6° C. | 16° C. | 24° C. |

Comparative Example 9

The twin-screw extruder (FIG. 30) comprises a structure consisting of 9 barrel parts, in which are arranged co-rotating, intermeshing screws. The machine is a ZSK 40Sc with a 40 mm barrel diameter from Coperion Werner & Pfleiderer. The polymer melt is fed into the first barrel (1) by way of a heated pipe (12). Barrel (2) contains a measurement point (14) for a melt temperature sensor. Barrel (3) is closed and barrel (4) contains a degassing opening (13). Barrel (5) contains a measurement point (15) for a melt temperature sensor. Barrels (6) and (7) are closed and barrel (8) contains a measurement point (16) for a melt temperature sensor. Barrel (9) is a flange, which converts the cross-section from the figure-of-eight-shaped bore of the twin-screw extruder to a pipe (10) (round). The flange is followed by a valve (11) for throttling purposes. The internal diameter of valve (11) and line (10) amounts in each case to 15 mm, the valve length to 95 mm and the line length to 120 mm.

The two screws (not shown) are provided symmetrically with screw elements. At the start the screws are provided in each case with double-flighted conveying elements with a pitch of 25 mm and a length of 25 mm. There then follow two double-flighted conveying elements with the pitch 60 mm and length 60 mm. A bush then follows with a length of 30 mm and a diameter of 26 mm, which in the installed state is arranged under the melt temperature sensor (14). The screw is then provided with 5 double-flighted conveying elements with the pitch 60 mm and length 60 mm and one conveying element with the pitch 60 mm and length 30 mm. A bush then follows with a length of 35 mm and a diameter of 26 mm, which in the installed state is arranged under the melt temperature sensor (15). The screw is then provided with 8 double-flighted conveying elements of a pitch of 40 mm and length of 40 mm.

At a rotational speed of the screws of 250 rpm and a throughput of 80 kg/h of Bayblend® T45 (manufacturer: Bayer MaterialScience AG), the temperature (measurement point (17)) of the melt was measured at the end of the extruder in the flange (9) at various pressures (pressure measurement sensor (19)) upstream of the valve (11). The inlet temperature (measurement point (18)) of the melt into the twin-screw extruder was also measured. The extruder barrels (1, 2, 3, 4, 5, 6, 7, 8, 9), line (10, 12) and the valve (11) were heated to 240° C. The results are shown in Table 9.

TABLE 9

| Pressure upstream of valve in bar | 13 | 40 | 70 |
|---|---|---|---|
| Inlet temperature (18) | 273° C. | 274° C. | 273° C. |
| Outlet temperature (17) | 291° C. | 296° C. | 301° C. |
| Outlet-inlet temperature differential | 18° C. | 22° C. | 28° C. |

Example 10

The twin-screw extruder (FIG. 30) comprises a structure consisting of 9 barrel parts, in which are arranged co-rotating, intermeshing screws. The machine is a ZSK 40Sc with a 40 mm barrel diameter from Coperion Werner & Pfleiderer. The polymer melt is fed into the first barrel (1) by way of a heated pipe (12). Barrel (2) contains a measurement point (14) for a melt temperature sensor. Barrel (3) is closed and barrel (4) contains a degassing opening (13). Barrel (5) contains a measurement point (15) for a melt temperature sensor. Barrels (6) and (7) are closed and barrel (8) contains a measurement point (16) for a melt temperature sensor. Barrel (9) is a flange, which converts the cross-section from the figure-of-eight-shaped bore of the twin-screw extruder to a pipe (10) (round). The flange is followed by a valve (11) for throttling purposes. The internal diameter of valve (11) and line (10) amounts in each case to 15 mm, the valve length to 95 mm and the line length to 120 mm.

The two screws (not shown) are provided symmetrically with screw elements. At the start the screws are provided in each case with double-flighted conveying elements with a pitch of 25 mm and a length of 25 mm. There then follow two double-flighted conveying elements with the pitch 60 mm and length 60 mm. A bush then follows with a length of 30 mm and a diameter of 26 mm, which in the installed state is arranged under the melt temperature sensor (14). The screw is then provided with 5 double-flighted conveying elements with the pitch 60 mm and length 60 mm and one conveying element with the pitch 60 mm and length 30 mm. A bush then follows with a length of 35 mm and a diameter of 26 mm, which in the installed state is arranged under the melt temperature sensor (15). The screw is then provided with 11 conveying elements according to the invention of a pitch of 30 mm and length of 30 mm.

At a rotational speed of the screws of 250 rpm and a throughput of 80 kg/h of Bayblend® T45 (manufacturer: Bayer MaterialScience AG), the temperature (measurement point (17)) of the melt was measured at the end of the extruder in the flange (9) at various pressures (pressure measurement sensor (19)) upstream of the valve (11). The inlet temperature (measurement point (18)) of the melt into the twin-screw extruder was also measured. The extruder barrels (1, 2, 3, 4, 5, 6, 7, 8, 9), line (10, 12) and the valve (11) were heated to 240° C. The results are shown in Table 10 and reveal lower temperatures than in Table 9 in Example 9.

TABLE 10

| Pressure upstream of valve in bar | 20.4 | 39.8 | 70.3 |
|---|---|---|---|
| Inlet temperature (18) | 275° C. | 275° C. | 275° C. |
| Outlet temperature (17) | 289° C. | 292° C. | 298° C. |
| Outlet-inlet temperature differential | 14° C. | 17° C. | 23° C. |

Example 11

The twin-screw extruder (FIG. 30) comprises a structure consisting of 9 barrel parts, in which are arranged co-rotating, intermeshing screws. The machine is a ZSK 40Sc with a 40 mm barrel diameter from Coperion Werner & Pfleiderer. The polymer melt is fed into the first barrel (1) by way of a heated pipe (12). Barrel (2) contains a measurement point (14) for a melt temperature sensor. Barrel (3) is closed and barrel (4) contains a degassing opening (13). Barrel (5) contains a measurement point (15) for a melt temperature sensor. Barrels (6) and (7) are closed and barrel (8) contains a measurement point (16) for a melt temperature sensor. Barrel (9) is a flange, which converts the cross-section from the figure-of-eight-shaped bore of the twin-screw extruder to a pipe (10) (round). The flange is followed by a valve (11) for throttling purposes. The internal diameter of valve (11) and line (10) amounts in each case to 15 mm, the valve length to 95 mm and the line length to 120 mm.

The two screws (not shown) are provided symmetrically with screw elements. At the start the screws are provided in each case with double-flighted conveying elements with a pitch of 25 mm and a length of 25 mm. There then follow two double-flighted conveying elements with the pitch 60 mm and length 60 mm. A bush then follows with a length of 30 mm and a diameter of 26 mm, which in the installed state is arranged under the melt temperature sensor (14). The screw is then provided with 5 double-flighted conveying elements with the pitch 60 mm and length 60 mm and one conveying element with the pitch 60 mm and length 30 mm. A bush then follows with a length of 35 mm and a diameter of 26 mm, which in the installed state is arranged under the melt temperature sensor (15). The screw is then provided with 5 conveying elements according to the invention of a pitch of 30 mm and length of 30 mm. There then follow 6 conventional single-flighted conveying elements of pitch 30 mm and length 30 mm.

At a rotational speed of the screws of 250 rpm and a throughput of 80 kg/h of Bayblend® T45 (manufacturer: Bayer MaterialScience AG), the temperature (measurement point (17)) of the melt was measured at the end of the extruder in the flange (9) at various pressures (pressure measurement sensor (19)) upstream of the valve (11). The inlet temperature (measurement point (18)) of the melt into the twin-screw extruder was also measured. The extruder barrels (1, 2, 3, 4, 5, 6, 7, 8, 9), line (10, 12) and the valve (11) were heated to 240° C. The results are shown in Table 11 and reveal higher temperatures than in Table 10 in Example 10.

TABLE 11

| Pressure upstream of valve in bar | 20.1 | 40.1 | 70.6 |
|---|---|---|---|
| Inlet temperature (18) | 278° C. | 278° C. | 278° C. |
| Outlet temperature (17) | 296° C. | 302° C. | 303° C. |
| Outlet-inlet temperature differential | 18° C. | 24° C. | 25° C. |

In Examples 12 and 13, melting was performed on a ZSK 32Mc (Coperion Werner & Pfleiderer) with a mixture of Makrolon® 3108 (manufacturer: Bayer MaterialScience AG) and ODS® 2015 (manufacturer: Bayer MaterialScience AG). The Makrolon® 3108 was colored purple with 1% of colored Makrolex® 420. The experiments were carried out with the structure in FIG. 31. The ratio of Makrolon® 3108 and ODS® 2015 amounts to 25%:75% (%=mass %).

The extruder has a length of 24 L/D. The extruder consists of a feed zone (9) provided with conveying elements, a melting zone (10) occupied with kneading blocks and a metering zone (11), the configuration of which was varied. The pellets were predried. The die (7) at the extruder outlet is a flat film die with a slot height of 1 mm and a width of 140 mm.

The polymer film emerging from the die was photographed by a CCD camera and backlit with a light source. The camera has 1280×960 pixels and a resolution of 29 µm/pixel. An image of the polymer film was taken every second and a total of 180 images were taken per test.

If the most highly viscous Makrolon® 3108 is not completely melted, dark purple blemishes in the polymer film are recorded by the camera. The edge of the polymer film is recognized by the camera and the area of the polymer film in the image calculated. The ratio of said area to the area of dark purple blemishes is calculated. This serves as a measure of a screw configuration's melting performance. The greater the proportion of unmelted pellets, the poorer is the screw make-up.

Comparative Example 12

The twin-screw extruder (FIG. 31) has a structure of 6 barrels (1-6) in which are arranged co-rotating, intermeshing screws. The machine is a ZSK 32Mc with a 32 mm barrel diameter from Coperion Werner & Pfleiderer. The pellets are fed (12) into the first barrel (1). The other barrels (2-6) are closed and at the end there is a flat film die (7).

The two screws (not shown) are provided symmetrically with screw elements. In the feed zone (9) the screws are provided with double-flighted conveying elements with a pitch of 42 mm and 63.5 mm. The feed zone extends as far as the middle of barrel (4), then the melting zone (10) starts. The melting zone (10) extends as far as the end of the fifth barrel (5) and consists of triple-flighted kneading blocks and transition kneading blocks providing a transition from double- to triple-flighted or vice versa. Flow was restricted at the end of the melting zone by a ZME element and/or left-handed kneading blocks.

The metering zone (11) or pressure build-up zone begins at the end of the fifth barrel. It consists of a double-flighted conveying element with length 28 mm and pitch 28 mm. There then follow two conveying elements with a length of 42 mm and a pitch of 42 mm. There then follows a screw tip with pitch 28 mm and length 42 mm.

At a throughput of 130 kg/h and a rotational speed of the screws of 400 rpm, unmelted pellets occupy 4.53% of the polymer film area (see Table 12).

Example 13

The structure is the same as in the reference example. Only the metering zone or pressure build-up zone was provided with screw elements according to the invention.

The conveying zone (11) begins at the end of the fifth barrel. It now consists of five screw elements according to the invention of length 28 mm and pitch 28 mm.

Exactly the same operating conditions were established as in the reference test. It was surprisingly found that the proportion of unmelted pellets drops to 1.89%. The screw elements according to the invention thus unambiguously exhibit an improvement during melting in comparison with the current prior art.

TABLE 12

| Screw make-up | Throughput in kg/h | Rotational speed in rpm | Particle area in % |
| --- | --- | --- | --- |
| Comparative Example 12 | 130 | 400 | 4.53 |
| Example 13 | 130 | 400 | 1.89 |

Examples 14 and 15 relating to compounding were carried out on a ZSK 32Mc (Coperion Werner & Pfleiderer). The experiments were carried out with the structure in FIG. 32. The composition consists of 40.17 mass % component A, 47.60 mass % component B, 8.90 mass % component C and 3.33 mass % component D Component A Linear polycarbonate based on bisphenol A with a relative solution viscosity of $\eta_{rel}$=1.275 measured in $CH_2Cl_2$ as solvent at 25° C. and in a concentration of 0.5 g/100 ml.

Component B

ABS polymer produced by emulsion polymerization of 50 wt. %, relative to the ABS polymer, of a mixture of 27 wt. % acrylonitrile and 73 wt. % styrene in the presence of 50 wt. %, relative to the ABS polymer, of a particulate cross-linked polybutadiene rubber (average particle diameter $d_{50}$=0.35 μm).

Component C

Styrene-acrylonitrile copolymer with a styrene-acrylonitrile weight ratio of 72:28 and an intrinsic viscosity of 0.55 dl/g (measurement in dimethylformamide at 20° C.).

Component D

Component D consists of additives such as mold release agent and heat stabilizer.

The extruder has a length of 40 L/D and consists of a feed zone (14) provided with conveying elements, a melting zone (15) occupied with kneading blocks and a metering zone (16), the configuration of which was varied, upstream of a die (11). The pellets were predried. The die (11) at the outlet of the extruder is a four-hole die. Downstream of the die (11), the Bayblend was drawn through a water bath and pelletized.

Samples of the pellets were taken at the established operating point. 50 pellets were analysed under a microscope. The cylindrical pellets were illuminated at the end face and observed under the microscope from the opposite side. Depending on the screw make-up and operating point, unmelted polycarbonate zones, through which light shines, may be visible in the otherwise opaque pellet. These zones are known as windows. The number of windows relative to the sample of 50 pellets is a measure of melting. Ideally, there are no windows.

Comparative Example 14

The twin-screw extruder (FIG. 32) comprises a structure consisting of 11 barrels, in which are arranged co-rotating, intermeshing screws. The machine is a ZSK 32Mc with a 32 mm barrel diameter from Coperion Werner & Pfleiderer. The pellets are fed (12) into the first barrel (1). The other barrels (2, 3, 4, 5, 6, 7, 8, 10) are closed with the exception of barrel (9), where there is a degassing opening (13). A four-hole die (11) is mounted at the end.

The two screws (not shown) are provided symmetrically with screw elements. At the start in the feed zone (14) the screws are provided with double-flighted conveying elements. The feed zone (14) extends as far as the start of the barrel (7), then the melting zone (15) starts. The melting zone (15) extends as far as the middle of the barrel (8) and consists of triple-flighted kneading blocks and transition kneading blocks providing a transition from double- to triple-flighted or vice versa. Flow was restricted at the end of the melting zone by ZME element and/or left-handed kneading blocks.

The metering zone (16) or pressure build-up zone starts in the middle of the barrel (9) after the melting zone. It consists of a double-flighted conveying element with length 28 mm and pitch 28 mm. There then follow two ZME elements with a length of 13 mm and a pitch of 13.5 mm. There then follow three double-flighted conveying elements with pitch 42 mm and length 42 mm. Then there are three double-flighted conveying elements with pitch 28 mm and length 28 mm, followed by conveying elements with pitch 28 mm and length 14 mm. Finally, there is the screw tip with a length of 42 mm and a pitch of 28 mm.

At a throughput of 145 kg/h and a rotational speed of 600 rpm of the screws, 100 windows were visible in 50 pellets (see Table 13). At a throughput of 160 kg/h and a rotational speed of 600 rpm of the screws, 211 windows were visible in 50 pellets.

Example 15

The twin-screw extruder (FIG. 32) comprises a structure consisting of 11 barrels, in which are arranged co-rotating, intermeshing screws. The machine is a ZSK 32Mc with a 32 mm barrel diameter from Coperion Werner & Pfleiderer. The pellets are fed (12) into the first barrel (1). The other barrels (2, 3, 4, 5, 6, 7, 8, 10) are closed with the exception of barrel (9), where there is a degassing opening (13). A four-hole die (11) is mounted at the end.

The two screws (not shown) are provided symmetrically with screw elements. At the start in the feed zone (14) the screws are provided with double-flighted conveying elements. The feed zone (14) extends as far as the start of the barrel (7), then the melting zone (15) starts. The melting zone (15) extends as far as the middle of the barrel (8) and consists of triple-flighted kneading blocks and transition kneading blocks providing a transition from double- to triple-flighted or vice versa. Flow was restricted at the end of the melting zone by ZME element and/or left-handed kneading blocks.

The metering zone (16) or pressure build-up zone starts in the middle of the barrel (8) after the melting zone. It consists of a screw element according to the invention of length 28 mm and pitch 28 mm. There then follow two ZME elements with a length of 13 mm and a pitch of 13.5 mm. There then follow 10 screw elements according to the invention with pitch 28 mm and length 28 mm.

Exactly the same operating conditions were established as in the reference test. It was surprisingly found that the number of windows can be distinctly reduced with the novel screw elements (see Table 13). The screw elements according to the invention thus unambiguously exhibit an improvement during melting of Bayblend® T45 in comparison with the current prior art.

TABLE 13

| Screw make-up | Throughput in kg/h | Rotational speed in rpm | Number of windows |
|---|---|---|---|
| Comparative Example 14 | 160 | 600 | 211 |
| Example 15 | 160 | 600 | 58 |
| Comparative Example 14 | 145 | 600 | 100 |
| Example 15 | 145 | 600 | 18 |

Examples 16-19 relating to polymer conveying were carried out on a ZSK 40Sc (Coperion Werner & Pfleiderer). The experiments were carried out with the structure in FIG. 33.

The twin-screw extruder (FIG. 33) comprises a structure consisting of seven barrels (1-7), in which are arranged co-rotating, intermeshing screws. The machine has a barrel diameter of 40 mm. The polymer melt is fed into the second barrel (2) by way of a heated pipe (9). Barrel (3) is closed and barrel (4) contains a measurement point (14) for a melt temperature sensor. Barrel (5) contains a degassing opening (10). Barrels (6) and (7) are closed. Barrel (8) is a flange, which converts the cross-section from the figure-of-eight-shaped bore of the twin-screw extruder to a pipe (13) (round). The flange is followed by a valve (12) for throttling purposes. The internal diameter of valve and line amounts to 15 mm for a valve length of 95 mm and a line length of 120 mm. Upstream of the valve (12), the pressure is measured by means of the sensor (11). The outlet temperature of the melt is measured with a manual thermometer which is held in the opening of the valve (12).

Comparative Example 16

The twin-screw extruder (FIG. 33) comprises a structure consisting of seven barrels, in which are arranged co-rotating, intermeshing screws. The machine is a ZSK 40Sc with a 40 mm barrel diameter from Coperion Werner & Pfleiderer. The polymer melt is fed into the second barrel (2) by way of a heated pipe (9). Barrel (3) is closed and barrel (4) contains a measurement point (14) for a melt temperature sensor. Barrel (5) contains a degassing opening (10). Barrels (6) and (7) are closed. Barrel (8) is a flange, which converts the cross-section from the figure-of-eight-shaped bore of the twin-screw extruder to a pipe (13) (round). The flange is followed by a valve (12) for throttling purposes. The internal diameter of valve and line amounts to 15 mm for a valve length of 95 mm and a line length of 120 mm.

The two screws (not shown) are provided symmetrically with screw elements. At the start the screws are provided in each case with three double-flighted conveying elements with a pitch of 25 mm and a length of 25 mm. There then follow five double-flighted conveying elements with the pitch 60 mm and length 60 mm. A bush then follows with a length of 30 mm and a diameter of 26 mm, which in the installed state is arranged under the melt temperature sensor (14). Downstream of the bush is located a ZME element with a length of 20 mm and a pitch of 10 mm. The screw is then provided with two double-flighted conveying elements with the pitch 60 mm and length 60 mm and one conveying element with the pitch 60 mm and length 30 mm.

The screw is then provided with eight double-flighted conveying elements with a pitch of 40 mm and length of 40 mm.

At a rotational speed of the screws of 250 rpm and a throughput of 80 kg/h, the increase in temperature was measured at various pressures (pressure measurement sensor (11)) upstream of the valve (12). The following materials were handled: Polypropylen®, Polystyrol®, Pocan®. The temperature (measurement point 14) of the melt in the twin-screw extruder was measured. The temperature was additionally measured with a manual thermometer (15) at the outlet of the tube. The thermometer was held in the melt in the tube. Table 14 shows the increase in temperature from (14) to (15).

TABLE 14

| | Increase in temperature in K | | | |
|---|---|---|---|---|
| | Pressure upstream of valve in bar | | | |
| Material | 20 | 35 | 50 | 65 |
| BASF Polystyrol ® 454C 2 Kg | 20 | 24 | 26 | 30 |
| Basell, Polypropylen Metocene ® HM 562S | 18 | 21 | 25 | 29 |
| BASF, Polystyrol ® 158K | 17 | 21 | 26 | 31 |
| Lanxess, Pocan ® B 1600 | 13 | 18 | 21 | 22 |

Example 17

The twin-screw extruder (FIG. 33) comprises a structure consisting of seven barrels, in which are arranged co-rotating, intermeshing screws. The machine is a ZSK 40Sc with a 40 mm barrel diameter from Coperion Werner & Pfleiderer. The polymer melt is fed into the second barrel (2) by way of a heated pipe (9). Barrel (3) is closed and barrel (4) contains a measurement point (14) for a melt temperature sensor. Barrel (5) contains a degassing opening (10). Barrels (6) and (7) are closed. Barrel (8) is a flange, which converts the cross-section from the figure-of-eight-shaped bore of the twin-screw extruder to a pipe (13) (round). The flange is followed by a valve (12) for throttling purposes. The internal diameter of valve and line amounts to 15 mm for a valve length of 95 mm and a line length of 120 mm.

The two screws (not shown) are provided symmetrically with screw elements. At the start the screws are provided in each case with three double-flighted conveying elements with a pitch of 25 mm and a length of 25 mm. There then follow five double-flighted conveying elements with the pitch 60 mm and length 60 mm. A bush then follows with a length of 30 mm and a diameter of 26 mm, which in the installed state is arranged under the melt temperature sensor (14). Downstream of the bush is located a ZME element with a length of 20 mm and a pitch of 10 mm. The screw is then provided with two double-flighted conveying elements with the pitch 60 mm and length 60 mm and one conveying element with the pitch 60 mm and length 30 mm.

The screw is then provided with 11 screw elements according to the invention with a pitch of 30 mm and length of 30 mm.

At a rotational speed of the screws of 250 rpm and a throughput of 80 kg/h, the increase in temperature was measured at various pressures (pressure measurement sensor (11)) upstream of the valve (12). The following materials were handled: Polypropylen®, Polystyrol®, Pocan®. The temperature (measurement point 14) of the melt in the twin-screw extruder was measured. The temperature was additionally measured with a manual thermometer (15) at the outlet of the tube. The thermometer was held in the melt in the tube. Table 15 shows the increase in temperature from (14) to (15). The novel development exhibits a lower increase in temperature for all products.

TABLE 15

Increase in temperature in K

| Material | Pressure upstream of valve in bar | | | |
|---|---|---|---|---|
| | 20 | 35 | 50 | 65 |
| BASF, Polystyrol ® 454C 2 Kg | 18 | 21 | 25 | 26 |
| Basell, Polypropylen Metocene ® HM 562S | 18 | 21 | 24 | 28 |
| BASF, Polystyrol ® 158K | 16 | 20 | 22 | 25 |
| Lanxess, Pocan ® B 1600 | — | 16 | 19 | 19 |

Comparative Example 18

The twin-screw extruder (FIG. 33) comprises a structure consisting of seven barrels, in which are arranged co-rotating, intermeshing screws. The machine is a ZSK 40Sc with a 40 mm barrel diameter from Coperion Werner & Pfleiderer. The polymer melt is fed into the second barrel (2) by way of a heated pipe (9). Barrel (3) is closed and barrel (4) contains a measurement point (14) for a melt temperature sensor. Barrel (5) contains a degassing opening (10). Barrels (6) and (7) are closed. Barrel (8) is a flange, which converts the cross-section from the figure-of-eight-shaped bore of the twin-screw extruder to a pipe (13) (round). The flange is followed by a valve (12) for throttling purposes. The internal diameter of valve and line amounts to 15 mm for a valve length of 95 mm and a line length of 120 mm.

The two screws (not shown) are provided symmetrically with screw elements. At the start the screws are provided in each case with three double-flighted conveying elements with a pitch of 25 mm and a length of 25 mm. There then follow five double-flighted conveying elements with the pitch 60 mm and length 60 mm. A bush then follows with a length of 30 mm and a diameter of 26 mm, which in the installed state is arranged under the melt temperature sensor (14). Downstream of the bush is located a ZME element with a length of 20 mm and a pitch of 10 mm. The screw is then provided with two double-flighted conveying elements with the pitch 60 mm and length 60 mm and one conveying element with the pitch 60 mm and length 30 mm.

The screw is then provided with eight double-flighted conveying elements with a pitch of 40 mm and length of 40 mm.

At various rotational speeds of the screws between 150 and 350 rpm and a throughput of 80 kg/h, the increase in temperature was measured with the valve (12) open. The following materials were handled: Ineos Lustran® DN 50, Polypropylen®, Polystyrol®. The temperature (measurement point 14) of the melt in the twin-screw extruder was measured. The temperature was additionally measured with a manual thermometer (15) at the outlet of the tube. The thermometer was held in the melt in the tube. Table 16 shows the increase in temperature from (14) to (15).

TABLE 16

Increase in temperature in K

| Material | Rotational speed of screws in rpm | | | | |
|---|---|---|---|---|---|
| | 350 | 300 | 250 | 200 | 150 |
| Ineos Lustran ® DN 50 | 18 | 18 | 15 | 12 | 11 |
| Basell, Polypropylen Metocene ® HM 562S | 17 | — | — | — | — |
| BASF, Polystyrol ® 158K | — | 19 | 16 | — | — |

Example 19

The twin-screw extruder (FIG. 33) comprises a structure consisting of seven barrels, in which are arranged co-rotating, intermeshing screws. The machine is a ZSK 40Sc with a 40 mm barrel diameter from Coperion Werner & Pfleiderer. The polymer melt is fed into the second barrel (2) by way of a heated pipe (9). Barrel (3) is closed and barrel (4) contains a measurement point (14) for a melt temperature sensor. Barrel (5) contains a degassing opening (10). Barrels (6) and (7) are closed. Barrel (8) is a flange, which converts the cross-section from the figure-of-eight-shaped bore of the twin-screw extruder to a pipe (13) (round). The flange is followed by a valve (12) for throttling purposes. The internal diameter of valve and line amounts to 15 mm for a valve length of 95 mm and a line length of 120 mm.

The two screws (not shown) are provided symmetrically with screw elements. At the start the screws are provided in each case with three double-flighted conveying elements with a pitch of 25 mm and a length of 25 mm. There then follow five double-flighted conveying elements with the pitch 60 mm and length 60 mm. A bush then follows with a length of 30 mm and a diameter of 26 mm, which in the installed state is arranged under the melt temperature sensor (13). Downstream of the bush is located a ZME element with a length of 20 mm and a pitch of 10 mm. The screw is then provided with two double-flighted conveying elements with the pitch 60 mm and length 60 mm and one conveying element with the pitch 60 mm and length 30 mm.

The screw is then provided with 11 screw elements according to the invention with a pitch of 28 mm and length of 28 mm.

At various rotational speeds of the screws between 150 and 350 rpm and a throughput of 80 kg/h, the increase in temperature was measured with the valve (12) open. The following materials were handled: Ineos Lustran® DN 50, Polypropylen®, Polystyrol®. The temperature (measurement point 14) of the melt in the twin-screw extruder was measured. The temperature was additionally measured with a manual thermometer (15) at the outlet of the tube. The thermometer was held in the melt in the tube. Table 17 shows the increase in temperature from (14) to (15). The increase in temperature with the screw elements according to the invention is lower than with the prior art.

TABLE 17

Increase in temperature in K

| Material | Rotational speed of screws in rpm | | | | |
|---|---|---|---|---|---|
| | 350 | 300 | 250 | 200 | 150 |
| Ineos Lustran ® DN 50 | 17 | 15 | 12 | 10 | 9 |
| Basell, Polypropylen Metocene ® HM 562S | 16 | — | — | — | — |
| BASF, Polystyrol ® 158K | — | 18 | 15 | — | — |

The invention claimed is:

1. A process for extruding plastic compositions comprising the steps of providing a twin- or multi-screw extruder, and conveying or kneading and/or mixing a plastic composition in said twin- or multi-screw extruder, said extruder comprising screw elements with screws co-rotating in pairs and being fully self-wiping in pairs, wherein each screw has one of a generating screw profile and a generated screw profile consisting of arcs with non-infinite radiuses, each of the generating and generated screw profiles being axisymmetrial referring to one axis which passes through the point of rotation of the respective screw profile, and each of the generating and generated screw profiles comprises one sealing zone, one or more transition zones, one channel zone, one or more tip zones, one or more flank zones, and one or more grooved zones, and each screw profile consisting of a sequence of the one sealing zone—one of the transition zones—the one channel zone—another of the transition zones, wherein each sealing zone is a sequence of one of the tip zones—one of the flank zones—another of the tip zones, each channel zone is a sequence of one of the grooved zones—one of the flank zones—another of the grooved zones, and each transition zone is one of the flank zones, wherein
each sealing zone of the screw elements is distinguished in that
    relative to the point of rotation of the screw profile, the flank zone has an angle δ_fb1 which is greater than or equal to half the aperture angle between the two barrel intermeshes (δ_fb1≥arc cos(0.5*a/ra))(wherein "a" is the centerline distance and "ra" is the outer screw radius"),
    relative to the point of rotation of the screw profile, one tip zone has an angle δ_kb1 which is less than or equal to the difference of the tip angle of a single-flighted Erdmenger screw profile minus the aperture angle between the two barrel intermeshes (δ_kb1≤π-4*arc cos(0.5*a/ra)),
    relative to the point of rotation of the screw profile, the other tip zone has an angle δ_kb2 which is less than or equal to the difference of the tip angle of a single-flighted Erdmenger screw profile minus the aperture angle between the two barrel intermeshes (δ_kb2≤π-4*arc cos(0.5*a/ra)),
and each channel zone is distinguished in that
    relative to the point of rotation of the screw profile, the flank zone has an angle δ_fb2 which is greater than or equal to half the aperture angle between the two barrel intermeshes(δ_fb2≥arc cos(0.5*a/ra)),
    relative to the point of rotation of the screw profile, one grooved zone has an angle δ_nb1 which is less than or equal to the difference of the tip angle of a single-flighted Erdmenger screw profile minus the aperture angle between the two barrel intermeshes (δ_nb1≤π-4*arc cos(0.5*a/ra)),
    relative to the point of rotation of the screw profile, the other grooved zone has an angle δ_nb2 which is less than or equal to the difference of the tip angle of a single-flighted Erdmenger screw profile minus the aperture angle between the two barrel intermeshes (δ_nb2≤π-4*arc cos(0.5*a/ra)).

2. The process as claimed in claim 1, wherein the sum of the angles of the tip and flank zones δ_kb1, δ_kb2 and δ_fb1 of the sealing zone is in the range from 0.75*δ_gz (the angle between two barrel intermeshes) to 2*δ_gb (the angle relative to the center point of the barrel bores) +δ_gz and the sum of the angles of the grooved and flank zones δ_nb1, δ_nb2 and δ_fb2 of the channel zone is in the range from 0.75*δ_gz to 2*δ_gb+δ_gz.

3. The process as claimed in claim 1, wherein the sum of the angles of the tip and flank zones δ_kb1, δ_kb2 and δ_fb1 of the sealing zone is in the range from δ_gz to δ_gb+δ_gz and the sum of the angles of the grooved and flank zones δ_13 nb1, δ_nb2 and δ_fb2 of the channel zone is in the range from δ_gz to δ_gb+δ_gz.

4. The process as claimed in claim 1, wherein the transition zone consists of a flank zone.

5. The process as claimed in claim 1, wherein the screw profiles bring about linear sealing of the intermesh zone.

6. The process as claimed in claim 1, wherein the screw profiles bring about punctiform sealing of the intermesh zone.

7. The process as claimed in claim 1, wherein the maximum distance of the tip zones of the sealing zone of the screw profiles from the barrel is in the range from 0 to 0.05 times the centerline distance.

8. The process as claimed in claim 1, wherein the maximum distance of the tip zones of the sealing zone of the screw profiles from the barrel is in the range from 0 to 0.025 times the centerline distance.

9. The process as claimed in claim 1, wherein the screw elements are configured as conveying elements or mixing elements by extending the screw profiles helically in the axial direction.

10. The process as claimed in claim 1, wherein the screw elements are configured as a kneading element by extending the screw profiles in portions in an offset manner in the axial direction.

11. The process as claimed in claim 1, wherein clearances in the range from 0.1 to 0.001 relative to the diameter of the screw profile are present between screw elements and barrel and/or between neighboring screw elements.

12. The process as claimed in claim 1, wherein the plastic compositions are thermoplastics or elastomers.

13. The process as claimed in claim 12, wherein the thermoplastics used are polycarbonate, polyamide, polyester, polylactide, polyether, thermoplastic polyurethane, polyacetal, fluoropolymer, polyether sulfones, polyolefin, polyimide, polyacrylate, polyphenylene oxide, polyphenylene sulfide, polyether ketone, polyarylether ketone, styrene polymers, styrene copolymers, polyvinyl chloride or a blend of at least two of the stated thermoplastics.

14. The process as claimed in claim 13, wherein polycarbonate or a blend containing polycarbonate is used as the thermoplastic.

15. The process as claimed in claim 14, wherein the elastomer used is styrene-butadiene rubber, natural rubber, butadiene rubber, isoprene rubber, ethylene-propylene-diene rubber, ethylene-propylene rubber, butadiene-acrylonitrile rubber, hydrogenated nitrile rubber, butyl rubber, halobutyl rubber, chloroprene rubber, ethylene-vinyl acetate rubber, polyurethane rubber, thermoplastic polyurethane, gutta percha, acrylate rubber, fluororubber, silicone rubber, sulfide rubber, chlorosulfonyl-polyethylene rubber or a combination of at least two of the stated elastomers.

16. The process as claimed in claim 1, wherein fillers or reinforcing materials or polymer additives or organic or inorganic pigments, or mixtures thereof, are added to the polymer.

17. A process for extruding plastic compositions comprising the steps of providing a twin- or multi-screw extruder, and conveying, kneading, and/or mixing a plastic composition in said twin- or multi-screw extruder, said extruder comprising screw elements with screws co-rotating in pairs and being fully self-wiping in pairs, wherein each screw has one of a generating screw profile and a generated screw profile consisting of arcs with non-infinite radiuses, each of the generating and generated screw profiles being axisymmetrial referring to one axis which passes through the point of rotation of the respective screw profile, and each of the generating and generated screw profiles comprises one sealing zone, one or more transition zones, one channel zone, one or more tip zones, one or more flank zones, and one or more grooved zones, and each screw profile consisting of a sequence of the one sealing zone—one of the transition zones—of the one channel zone—another of the transition zones, wherein each sealing zone is a sequence of one of the tip zones—one of the flank zones—another of the tip zones, each channel zone is a sequence of one of the grooved zones—one of the flank zones—another of the grooved zones, and each transition zone is one of the flank zones.

\* \* \* \* \*